US012600368B2

(12) United States Patent
Zahid et al.

(10) Patent No.: US 12,600,368 B2
(45) Date of Patent: Apr. 14, 2026

(54) ZONAL ARCHITECTURE FOR VEHICLE

(71) Applicant: TOYOTA MOTOR NORTH AMERICA, INC., Plano, TX (US)

(72) Inventors: Imad Zahid, Carrollton, TX (US); Joshua C. Batie, Frisco, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/614,541

(22) Filed: Mar. 22, 2024

(65) Prior Publication Data

US 2025/0296582 A1 Sep. 25, 2025

(51) Int. Cl.
*B60W 50/06* (2006.01)
*G07C 5/02* (2006.01)

(52) U.S. Cl.
CPC .............. *B60W 50/06* (2013.01); *G07C 5/02* (2013.01)

(58) Field of Classification Search
CPC ................................ B60W 50/06; G07C 5/02
See application file for complete search history.

(56) References Cited

U.S. PATENT DOCUMENTS

| | | | |
|---|---|---|---|
| 8,560,165 | B2 | 10/2013 | Salman et al. |
| 9,274,525 | B1 | 3/2016 | Ferguson et al. |
| 9,977,686 | B2 | 5/2018 | Tokunaga et al. |

| | | | |
|---|---|---|---|
| 10,262,471 | B2 | 4/2019 | Kislovskiy et al. |
| 10,304,330 | B1 | 5/2019 | Broz et al. |
| 10,423,934 | B1 | 9/2019 | Zanghi et al. |
| 10,526,992 | B2 | 1/2020 | Whitney et al. |
| 10,554,757 | B2 | 2/2020 | Koravadi et al. |
| 10,883,436 | B2 | 1/2021 | Wong et al. |
| 10,958,576 | B2 | 3/2021 | Joshi et al. |
| 11,120,277 | B2 | 9/2021 | Okada et al. |
| 11,120,538 | B2 | 9/2021 | Tariq et al. |
| 11,146,664 | B2 | 10/2021 | Liu et al. |

(Continued)

FOREIGN PATENT DOCUMENTS

| | | |
|---|---|---|
| AU | 2021202720 B2 | 12/2022 |
| CN | 108691678 A | 10/2018 |

(Continued)

OTHER PUBLICATIONS

Chow et al., "What is 'superfog' Deadly conditions behind Louisiana 158-vehicle pileup explained", NBC News, Oct. 24, 2023, https://www.nbcnews.com/science/science-news/super-fog-deadly-conditions-louisianas-158-vehicle-pileup-explained-rcna121935.

(Continued)

*Primary Examiner* — George C Jin

(57) ABSTRACT

An example operation includes one or more of dividing a vehicle into a plurality of zones based on operations performed by vehicle, assigning a different subset of electronic control units (ECUs) from among a plurality of ECUs of the vehicle to each zone based on functions performed by the plurality of ECUs with respect to the plurality of zones, determining an operation to perform for the vehicle, identifying a zone from among the plurality of zones for controlling the operation, and pooling data input by and output by a subset of ECUs included in the zone during the operation and storing the pooled data in a storage device.

17 Claims, 41 Drawing Sheets

250

(56) References Cited

U.S. PATENT DOCUMENTS

| | | | |
|---|---|---|---|
| 11,178,158 B2 | 11/2021 | Buffard et al. | |
| 11,417,107 B2 | 8/2022 | Kunze | |
| 11,513,523 B1 | 11/2022 | Schwalb | |
| 11,514,731 B2 | 11/2022 | Liu et al. | |
| 11,536,185 B2 | 12/2022 | Shimizu et al. | |
| 11,572,080 B2 | 2/2023 | Canady et al. | |
| 11,718,310 B2 | 8/2023 | Jung | |
| 11,775,870 B2 | 10/2023 | Zhou et al. | |
| 11,807,230 B2 | 11/2023 | Newman et al. | |
| 11,810,409 B2 | 11/2023 | Kadry et al. | |
| 11,860,639 B2 | 1/2024 | Chen | |
| 11,987,266 B2 * | 5/2024 | Watts | G06V 10/87 |
| 12,112,587 B1 | 10/2024 | Huynh et al. | |
| 2013/0231854 A1 | 9/2013 | Rovik et al. | |
| 2014/0350911 A1 * | 11/2014 | Tokunaga | B60W 50/00 |
| | | | 703/21 |
| 2016/0112216 A1 | 4/2016 | Sargent et al. | |
| 2018/0031384 A1 | 2/2018 | Lee et al. | |
| 2018/0304828 A1 * | 10/2018 | Kitani | B60W 50/00 |
| 2019/0340116 A1 * | 11/2019 | Miyauchi | G06F 11/203 |
| 2019/0384522 A1 * | 12/2019 | Yun | G06F 3/0635 |
| 2020/0189390 A1 | 6/2020 | Viswanathan | |
| 2020/0209846 A1 | 7/2020 | Chen | |
| 2020/0317216 A1 | 10/2020 | Konrardy et al. | |
| 2020/0320435 A1 | 10/2020 | Sequeira et al. | |
| 2020/0378779 A1 | 12/2020 | Yu | |
| 2021/0005031 A1 | 1/2021 | Brauer et al. | |
| 2021/0052206 A1 | 2/2021 | Kale et al. | |
| 2022/0048504 A1 | 2/2022 | Prasad Challa et al. | |
| 2022/0055631 A1 | 2/2022 | Bulusu et al. | |
| 2022/0094695 A1 | 3/2022 | Buffard et al. | |
| 2022/0114477 A1 | 4/2022 | Kou et al. | |
| 2022/0207924 A1 | 6/2022 | Majerus et al. | |
| 2022/0291175 A1 | 9/2022 | Chang et al. | |
| 2023/0128080 A1 | 4/2023 | Shire et al. | |
| 2023/0148321 A1 | 5/2023 | Hall et al. | |
| 2023/0162049 A1 | 5/2023 | Hall et al. | |
| 2023/0186653 A1 | 6/2023 | Sawai | |
| 2023/0192106 A1 | 6/2023 | Park et al. | |
| 2023/0227066 A1 | 7/2023 | Templer et al. | |
| 2023/0271628 A1 | 8/2023 | Watts et al. | |
| 2023/0290156 A1 | 9/2023 | Szczerba et al. | |
| 2023/0305719 A1 * | 9/2023 | Monta | G07C 5/0841 |
| 2023/0329612 A1 | 10/2023 | Copenspire-Ross et al. | |
| 2023/0386273 A1 | 11/2023 | Kamma et al. | |
| 2024/0409090 A1 | 12/2024 | Abroshan et al. | |

FOREIGN PATENT DOCUMENTS

| | | |
|---|---|---|
| CN | 109559540 A | 4/2019 |
| CN | 111817849 A | 10/2020 |
| CN | 113272744 A | 8/2021 |
| CN | 113460050 A | 10/2021 |
| KR | 20220001925 A | 1/2022 |
| WO | 2020139392 A1 | 7/2020 |

OTHER PUBLICATIONS

Gotsch, "5 Trends That Changed the Vehicle Repair Industry In 2022", CCC News & Insights, Dec. 7, 2022, https://www.cccis.com/news-and-insights/posts/5-trends-that-changed-the-auto-repair-industry-in-2022.

Hoffman, "How Capable Is Tesla's Autopilot Driver-Assist System? We Put It to the Test", Car And Driver, Apr. 30, 2021, How Capable Is Tesla's Autopilot Driver-Assist System? We Put It to the Test.

Martin, "The Most and Least Expensive Cars to Maintain", YourMechanic, Jun. 1, 2016, https://www.yourmechanic.com/article/the-most-and-least-expensive-cars-to-maintain-by-maddy-martin.

Mitchell, "How can self-driving cars 'see' in the rain, snow and fog?" WCNC Charlotte, Jan. 8, 2021, https://www.wcnc.com/article/weather/accuweather/self-driving-cars-radar-inclement-weather-rain-fog-snow/507-0438604e-ef32-4c0a-9634-99a6ec71fa12.

Payne, "Using AI to fix your car with ChatGPT | Asking AI to diagnose problems with your car project!", YouTube, Jan. 9, 2023 Las Vegashttps://www.youtube.com/watch?v=mqZf8ChG5Mw.

Unknown, "5 Reasons Why Regular Service Will Save You Money in the Long Run", Warrenton Auto Service, Aug. 4, 2020, https://warrentonauto.com/5-reasons-why-regular-service-will-save-you-money-in-the-long-run/.

Unknown, "Super Cruise—The Better Driver Assistant", DonohooChevrolet, Jan. 31, 2022, https://www.donohoochevrolet.com/blogs/3987/super-cruise-the-better-autopilot.

* cited by examiner

Figure 1B:
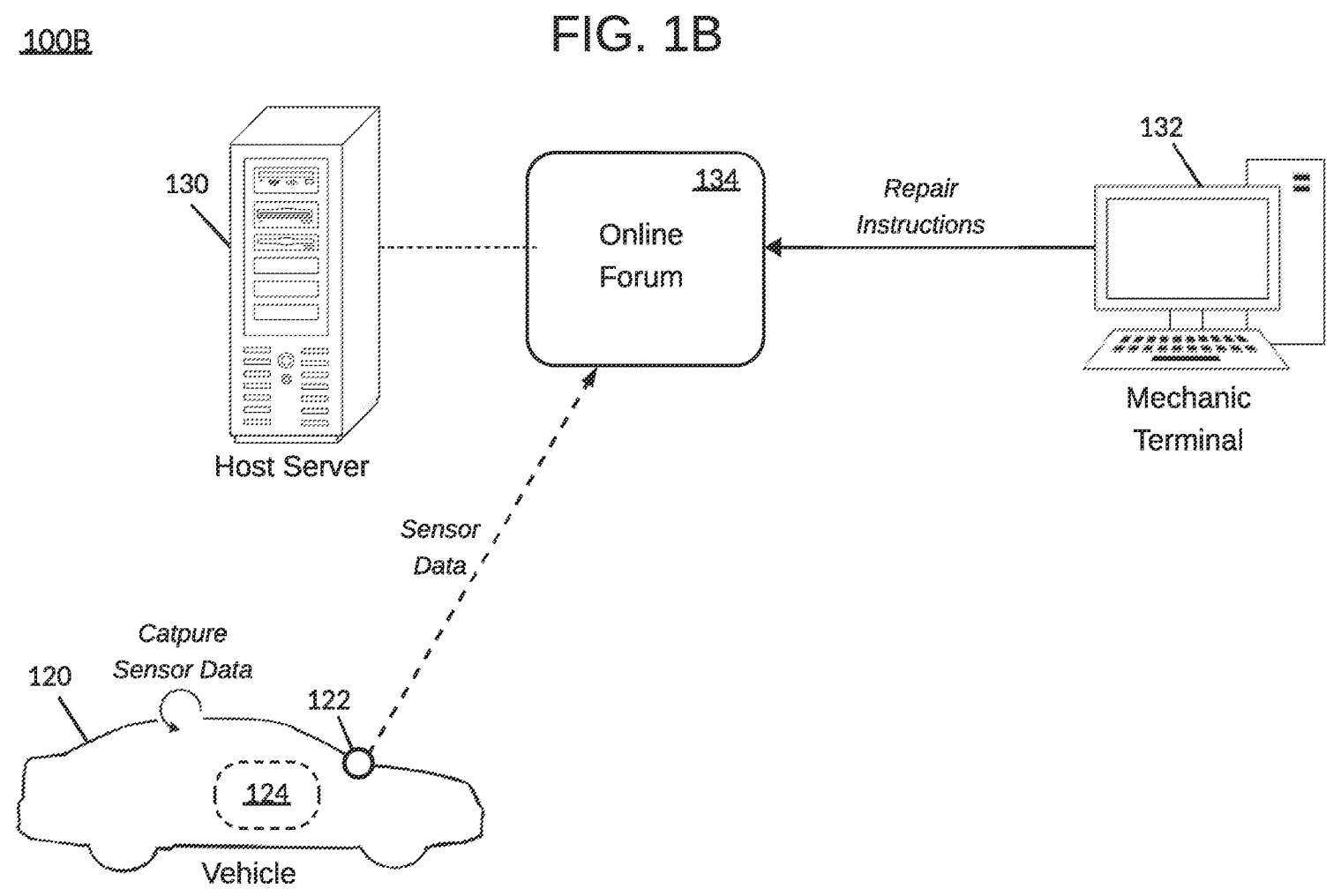

Mechanic Terminal

*Repair Instructions*

134

Online Forum

130

Host Server

122

*Sensor Data*

124

Vehicle

*Catpure Sensor Data*

Windshield

160

162

Generate
AR View

AI Model
164

Figure 1F:
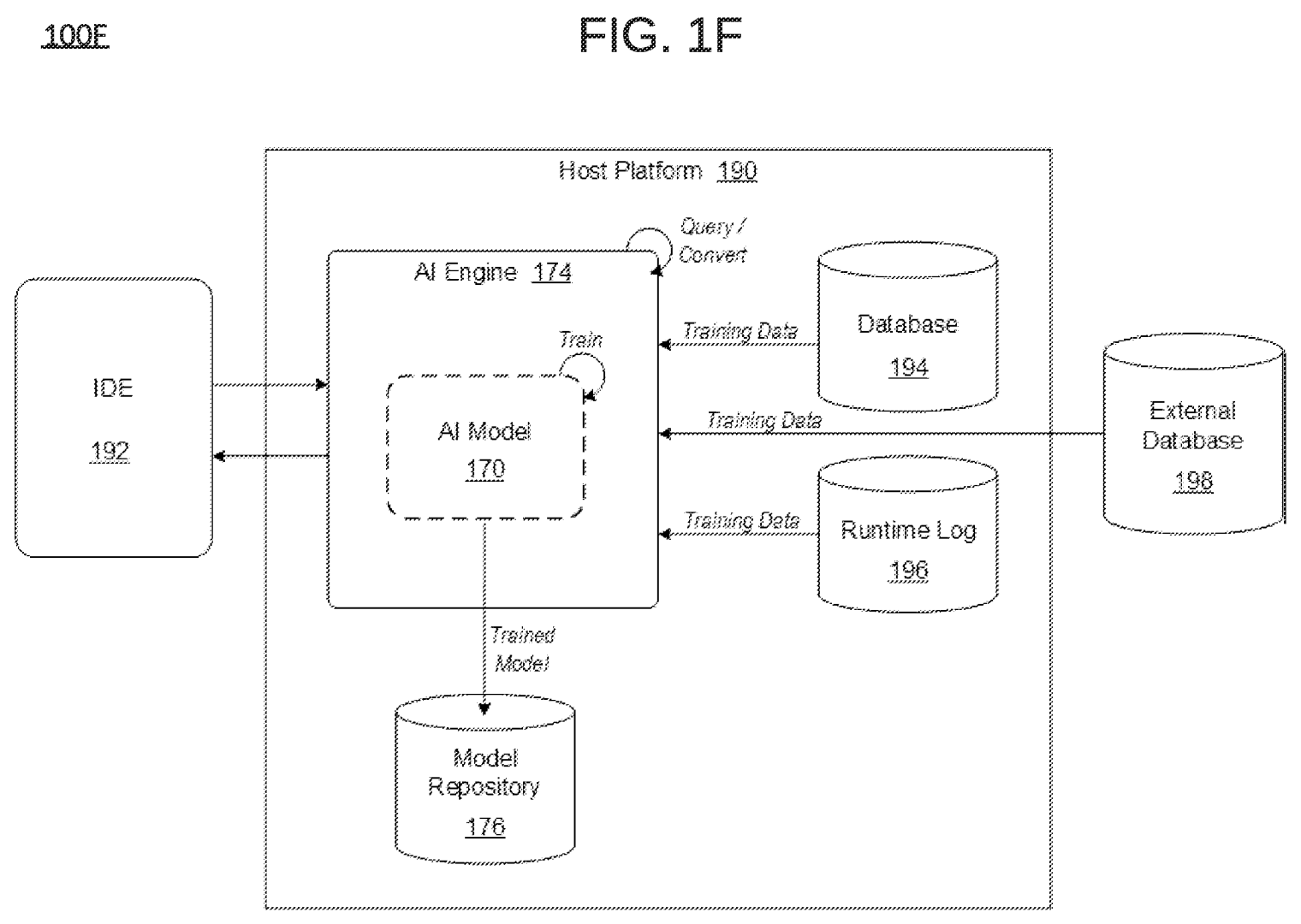

Host Platform 190

External Database 198

Database 194

Runtime Log 196

AI Engine 174

Query / Convert

Training Data

Training Data

Training Data

Train

AI Model 170

Trained Model

Model Repository 176

IDE 192

200

210

240

250

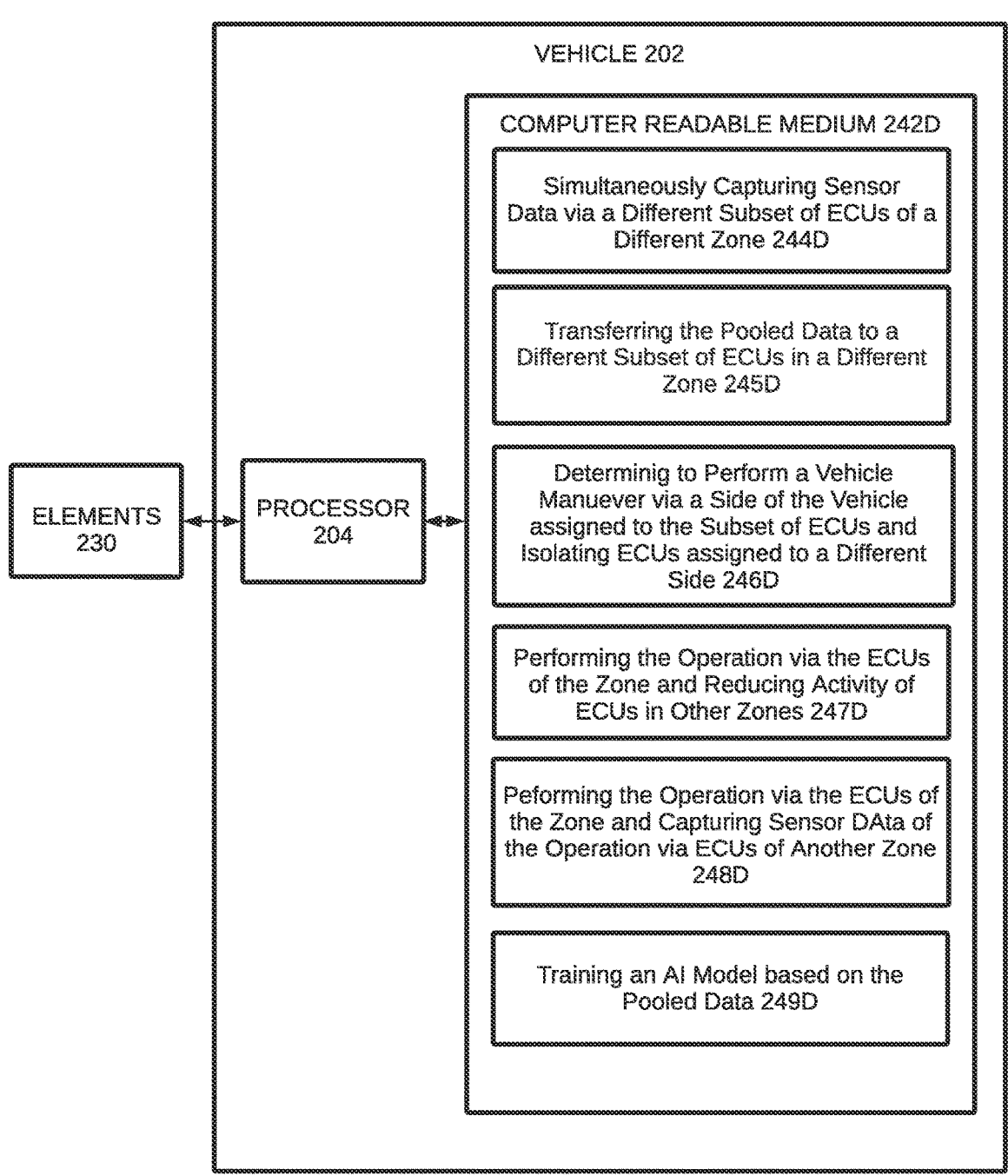

VEHICLE 202

COMPUTER READABLE MEDIUM 242D

Simultaneously Capturing Sensor Data via a Different Subset of ECUs of a Different Zone 244D Transferring the Pooled Data to a Different Subset of ECUs in a Different Zone 245D Determinig to Perform a Vehicle Manuever via a Side of the Vehicle assigned to the Subset of ECUs and Isolating ECUs assigned to a Different Side 246D Performing the Operation via the ECUs of the Zone and Reducing Activity of ECUs in Other Zones 247D Peforming the Operation via the ECUs of the Zone and Capturing Sensor DAta of the Operation via ECUs of Another Zone 248D Training an AI Model based on the Pooled Data 249D

ELEMENTS 230

PROCESSOR 204

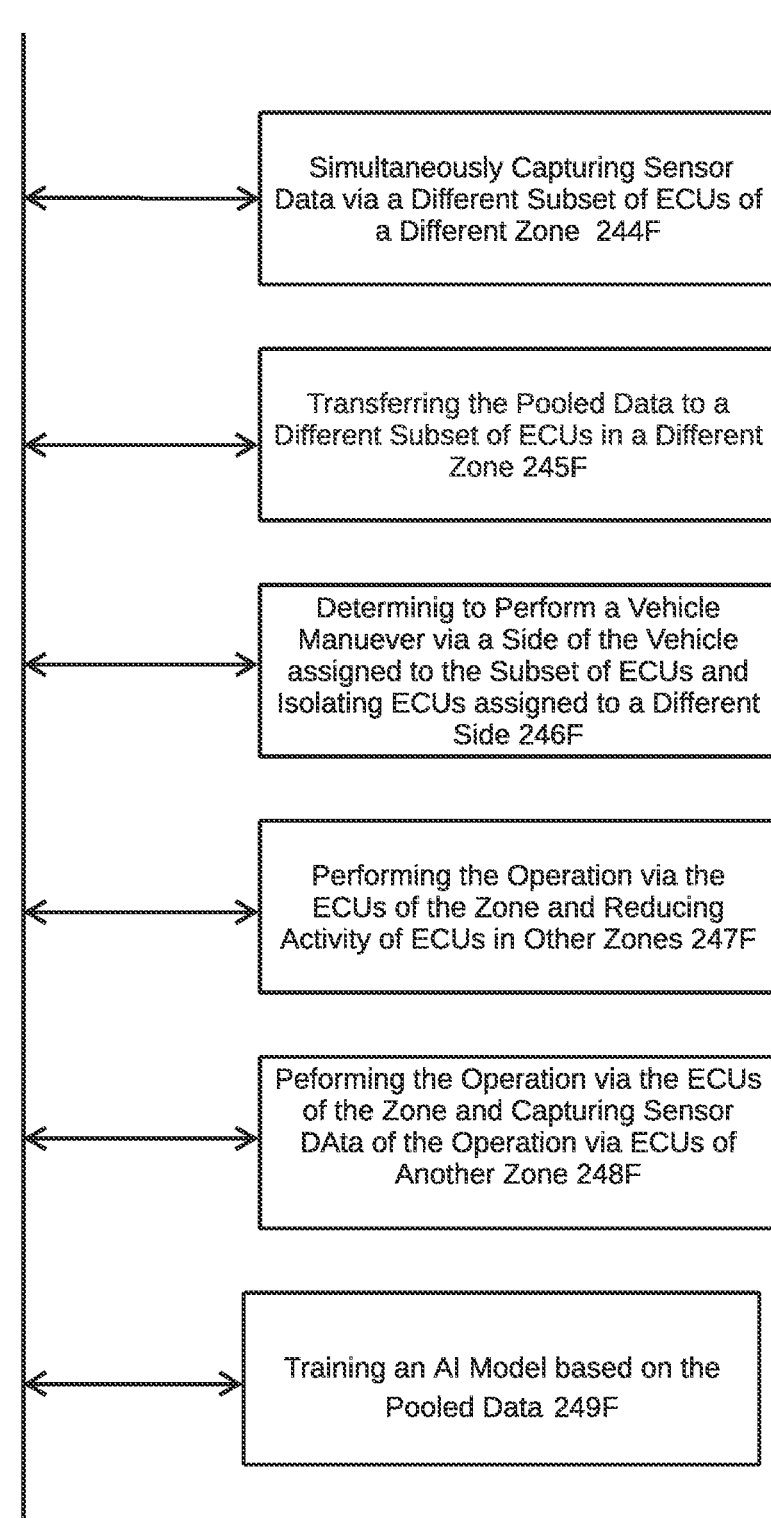

Simultaneously Capturing Sensor Data via a Different Subset of ECUs of a Different Zone 244F Transferring the Pooled Data to a Different Subset of ECUs in a Different Zone 245F Determinig to Perform a Vehicle Manuever via a Side of the Vehicle assigned to the Subset of ECUs and Isolating ECUs assigned to a Different Side 246F Performing the Operation via the ECUs of the Zone and Reducing Activity of ECUs in Other Zones 247F Peforming the Operation via the ECUs of the Zone and Capturing Sensor DAta of the Operation via ECUs of Another Zone 248F Training an AI Model based on the Pooled Data 249F

ASSETS
RECEIVED

512

ASSETS
TRANSFERRED $T_1$ | $T_2$ | $\cdots$ | $T_N$

TRANSACTION
MODULE

520

VEHICLE
PROCESSOR

526

525

$T_1$ | $T_2$ | $\cdots$ | $T_N$

DATABASE

530

500B

500F

New Data Block 530

Block Header  540

| Number | Previous Hash | Data Hash |
|--------|---------------|-----------|

Block Data 550
    - *N Transactions*

| Type, Version, Channel ID, Tx ID, . . . | |
|-----------------------------------------|---|
| Chaincode Data | Endorser Data |
| Read Set | Write Set |

563

| Paused Content Identifier |
|---------------------------|

Block Metadata 560

| Orderer Data | Signatures |
|--------------|------------|
| Last Config | Valid/Invalid Txs |

Figure 8A:
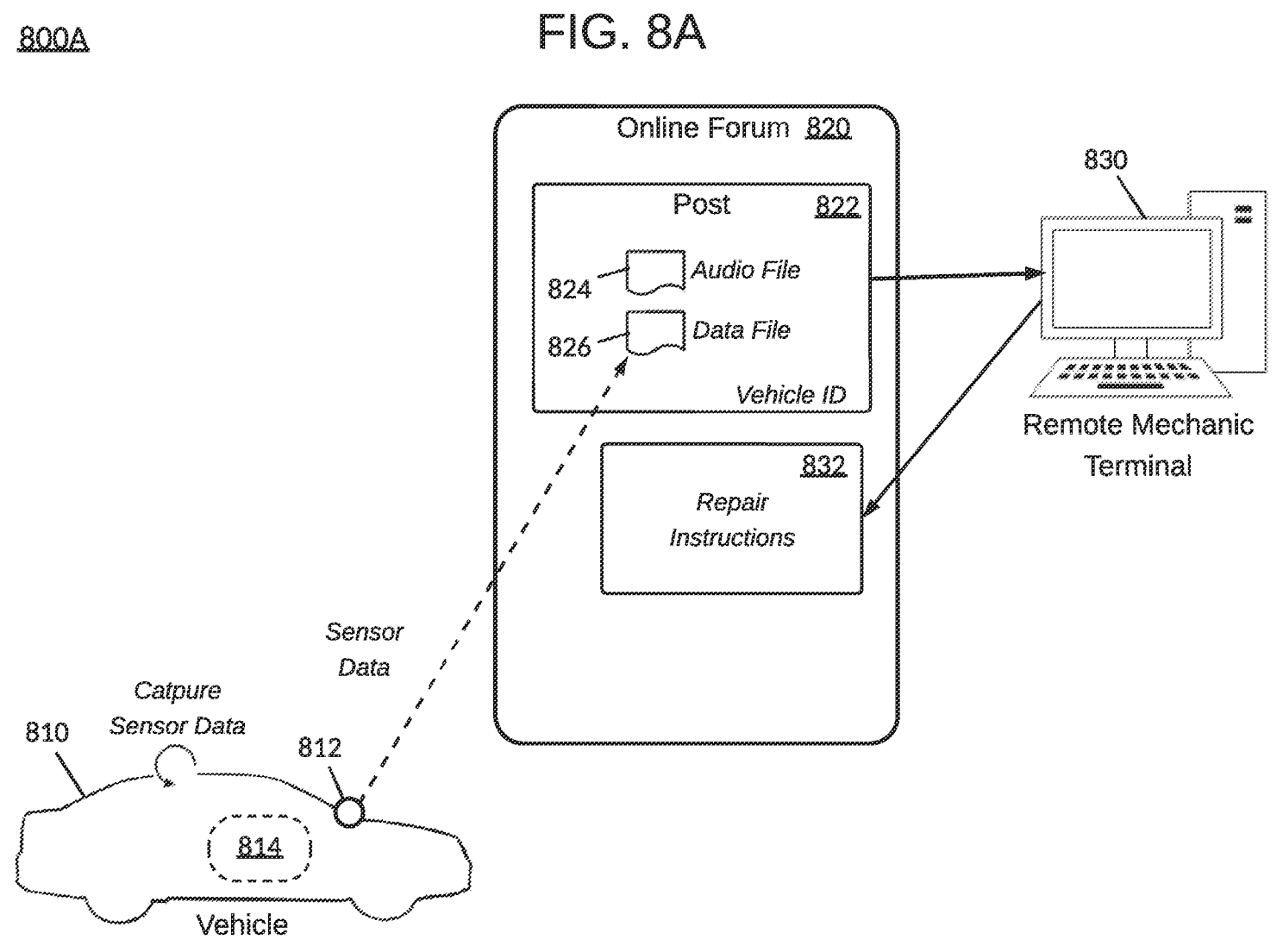

Online Forum 820

Post 822

Audio File 824

Data File 826

Vehicle ID

Repair Instructions 832

830

Remote Mechanic Terminal

Sensor Data

Capture Sensor Data

810

812

814

Vehicle

Figure 9B:
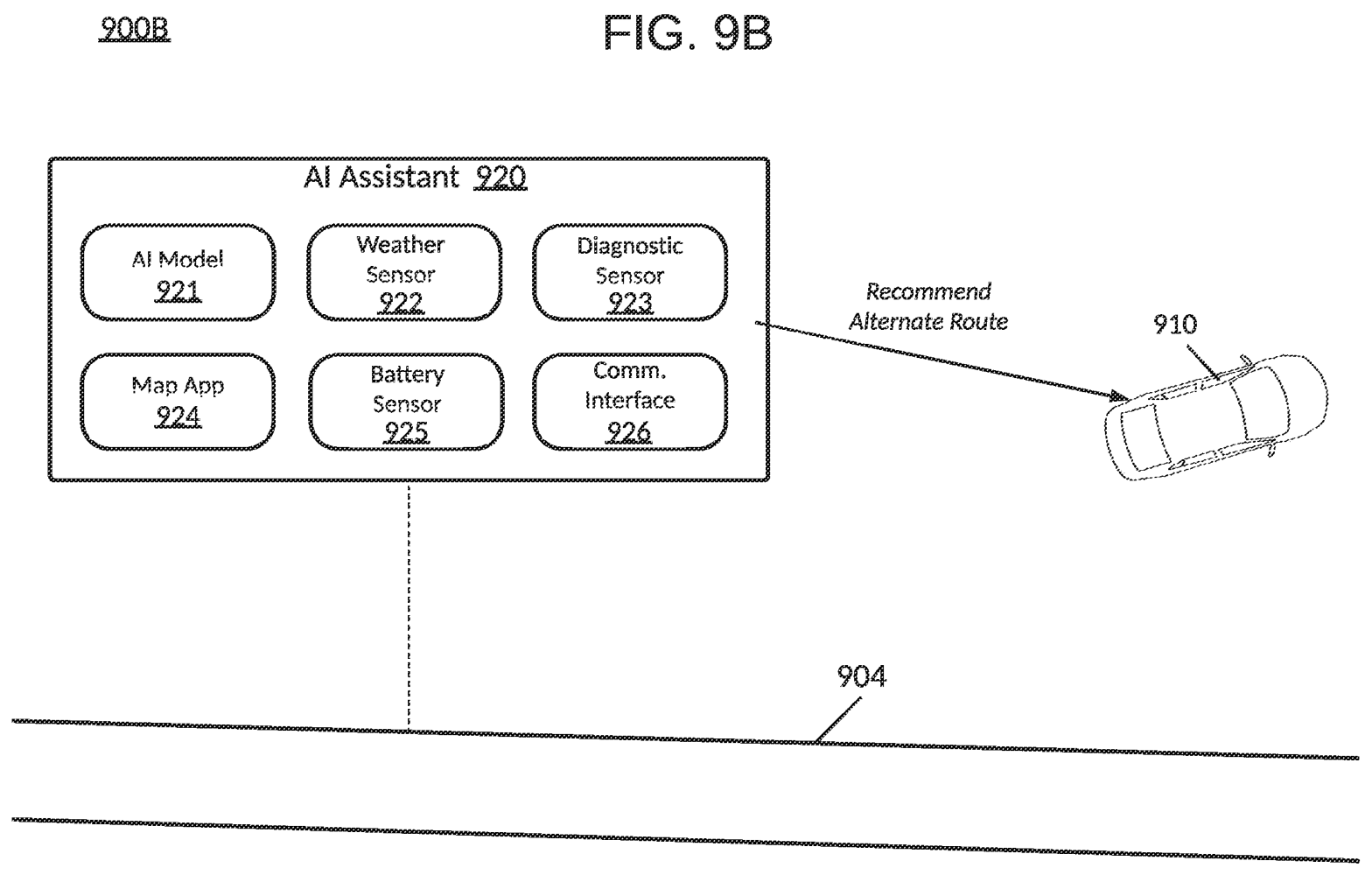

AI Assistant 920

AI Model 921

Weather Sensor 922

Diagnostic Sensor 923

Map App 924

Battery Sensor 925

Comm. Interface 926

Recommend Alternate Route

Figure 10A:
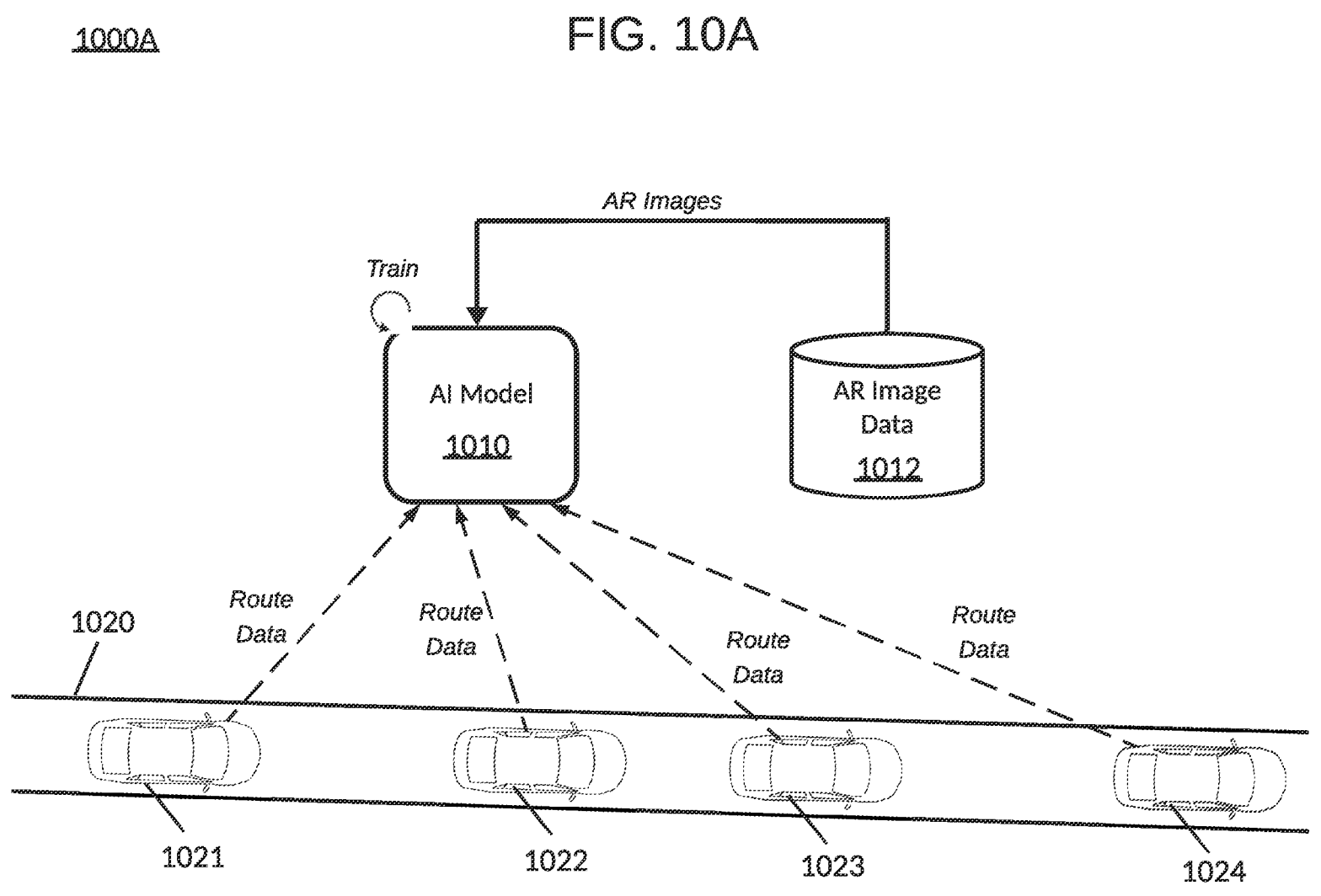

AR Image Data 1012

AR Images

AI Model 1010

Train

Route Data

Route Data

Route Data

Route Data

Figure 11B:
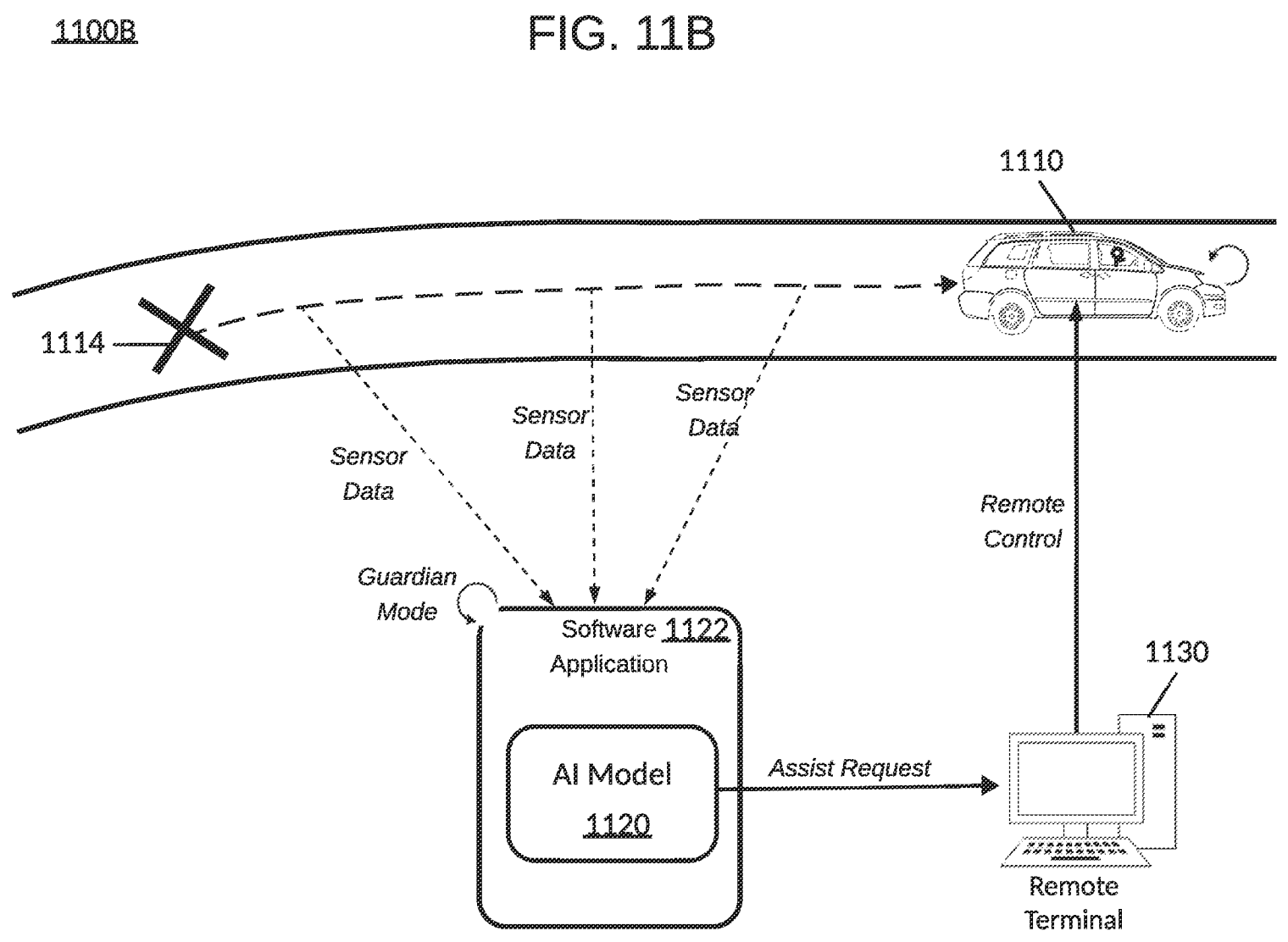

Sensor Data

Sensor Data

Sensor Data

1114

Guardian Mode

Software 1122
Application

AI Model
1120

Assist Request

Remote Control

1130

Remote Terminal

ZONAL ARCHITECTURE FOR VEHICLE

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of dividing a vehicle into a plurality of zones based on operations performed by vehicle, assigning a different subset of electronic control units (ECUs) from among a plurality of ECUs of the vehicle to each zone based on functions performed by the plurality of ECUs with respect to the plurality of zones, determining an operation to perform for the vehicle, identifying a zone from among the plurality of zones for controlling the operation, and pooling data input by and output by a subset of ECUs included in the zone during the operation and storing the pooled data in a storage device.

Another example embodiment provides an apparatus that includes a memory coupled to a processor, wherein the processor may one or more of divide a vehicle into a plurality of zones based on operations performed by vehicle, assign a different subset of electronic control units (ECUs) from among a plurality of ECUs of the vehicle to each zone based on functions performed by the plurality of ECUs with respect to the plurality of zones, determine an operation to perform for the vehicle, identify a zone from among the plurality of zones for controlling the operation, and pool data input by and output by a subset of ECUs included in the zone during the operation and storing the pooled data in a storage device.

A further example embodiment provides a computer readable storage medium comprising instructions, that when read by a processor, cause the processor to perform one or more of dividing a vehicle into a plurality of zones based on operations performed by vehicle, assigning a different subset of electronic control units (ECUs) from among a plurality of ECUs of the vehicle to each zone based on functions performed by the plurality of ECUs with respect to the plurality of zones, determining an operation to perform for the vehicle, identifying a zone from among the plurality of zones for controlling the operation, and pooling data input by and output by a subset of ECUs included in the zone during the operation and storing the pooled data in a storage device.

BRIEF DESCRIPTION OF THE DRAWINGS

Figure 1A:
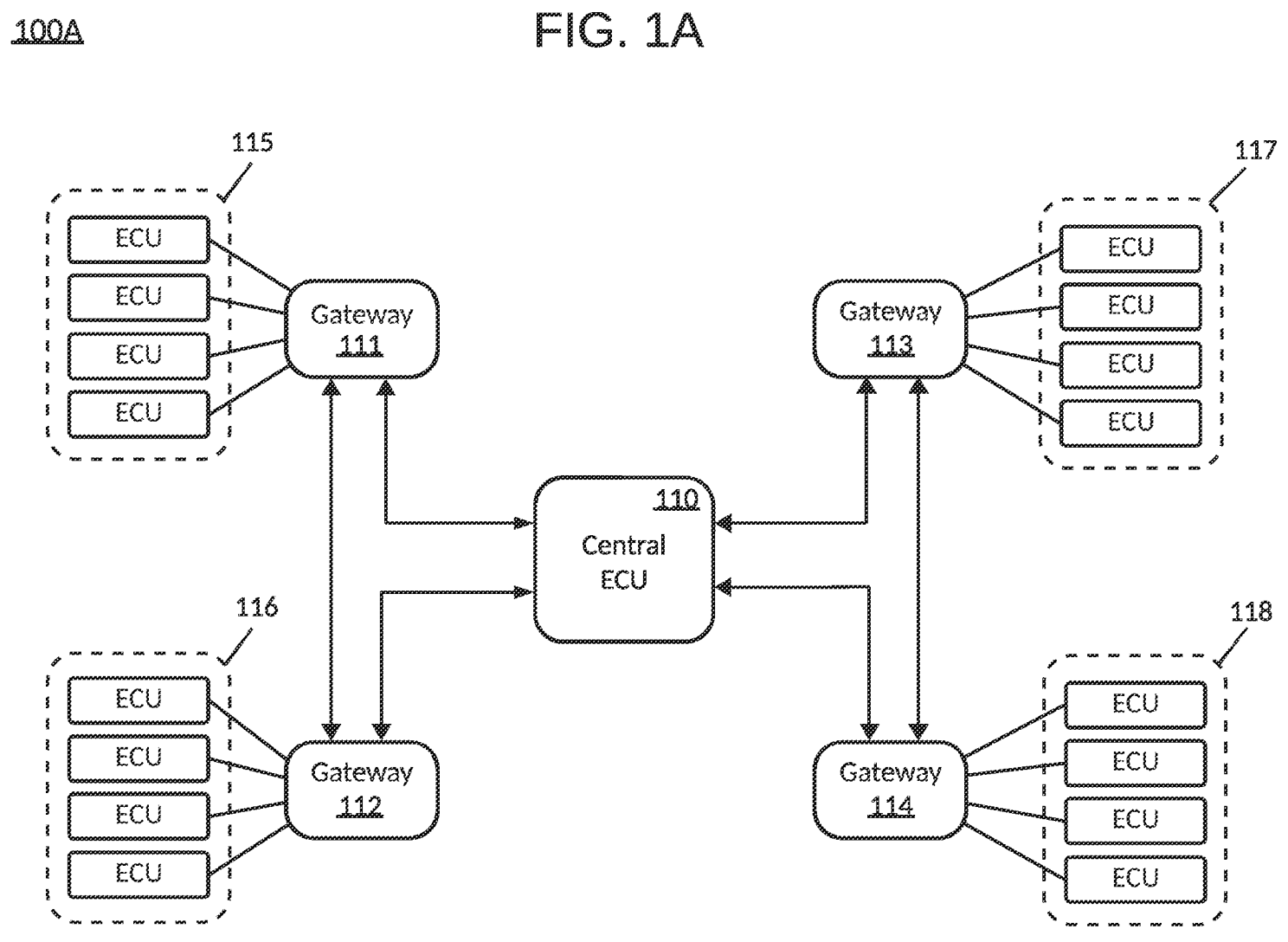

FIG. 1A is a diagram illustrating a zonal architecture of electronic control units (ECUs) within a vehicle according to example embodiments.

FIG. 1B is a diagram illustrating a process of a vehicle posting content to an online forum according to example embodiments.

FIG. 1D is a diagram illustrating a process of outputting an augmented reality (AR) view within a vehicle according to example embodiments.

FIG. 1F is a diagram illustrating a process of training an AI model according to example embodiments

FIG. 2D illustrates a further vehicle network diagram, according to example embodiments.

FIG. 2F illustrates another flow diagram, according to example embodiments.

FIG. 5F illustrates an example new data block, according to example embodiments.

FIGS. 7A-7C are diagrams illustrating a process of a zonal architecture performing vehicle actions according to example embodiments.

FIGS. 8A-8B are diagrams illustrating a process of a vehicle receiving repair instructions from a remote mechanic according to example embodiments.

FIGS. 9A-9C are diagrams illustrating processes of an AI assistant making recommendations to a vehicle based on an environment of the vehicle according to example embodiments.

FIG. 10A is a diagram illustrating a process of training an AI model to generate augmented reality images according to example embodiments.

FIG. 10B is a diagram illustrating a process of outputting an AR view to a vehicle in distress according to example embodiments.

FIGS. 11A-11B are diagrams illustrating a process of guarding a vehicle based on a driver condition according to example embodiments

DETAILED DESCRIPTION

Figure 1C:
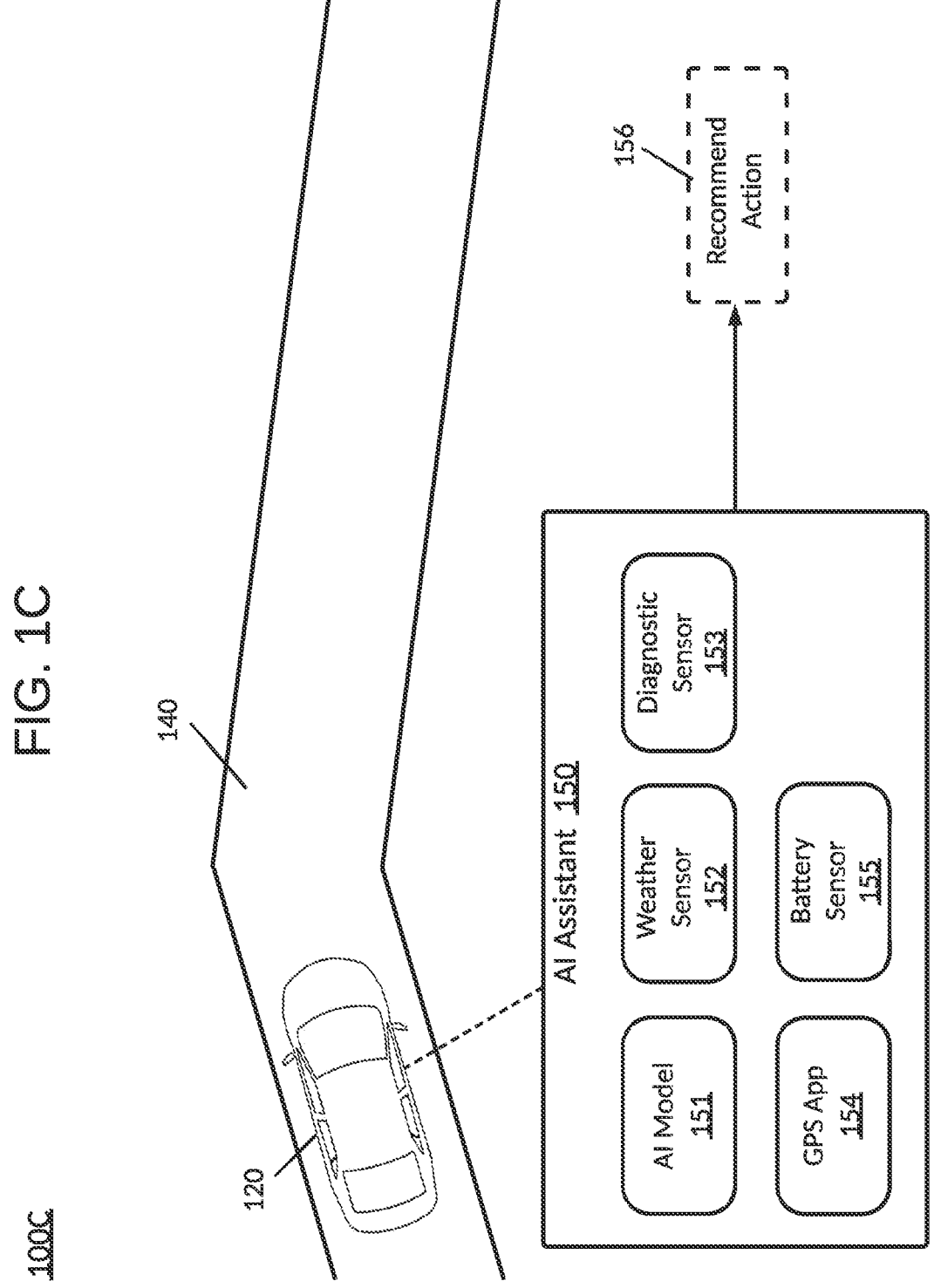
FIG. 1C is a diagram illustrating a process of an artificial intelligence (AI) assistant recommending a vehicle to take an action based on dynamic data of an environment of the vehicle according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable medium or a non-transitory computer readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments,", "a first embodiment", or other similar language throughout this specification refers to the fact that a particular feature, structure, or characteristic described in connection with the one or more embodiments may be included in one or more other embodiments described or depicted herein. Thus, the one or more embodiments, described or depicted throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusivity, unless expressly indicated otherwise herein. In the figures, any connection between elements can permit one-way and/or two-way communication, even if the depicted connection is a one-way or two-way connection, such as an arrow.

In the instant solution, a vehicle may include one or more of cars, trucks, Internal Combustion Engine (ICE) vehicles, battery electric vehicle (BEV), fuel cell vehicles, any vehicle utilizing renewable sources, hybrid vehicles, e-Palettes, buses, motorcycles, scooters, bicycles, boats, recreational vehicles, planes, drones, Unmanned Aerial Vehicle (UAV) and any object that may be used to transport people and/or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable medium, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries, and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach may not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors, and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

The example embodiments are directed to various artificial intelligence (AI) systems which can be integrated into a vehicle, and which can improve the safety of the occupants, the energy consumed by the vehicle, the life of the vehicle and its components, and the like.

In some embodiments, a vehicle architecture may be divided into zones, and each zone may be assigned a different subset of electronic control units (ECUs) within the vehicle. Vehicles may include hundreds of ECUs that are responsible for controlling one or more electrical systems, embedded systems, subsystems, etc. within a vehicle. For example, ECUs may be used to control wheel speed, braking power, ignition timing, idle speed, air/fuel mixture, and the like. Each ECU may include a dedicated processing chip that runs its own software and/or firmware, and include power and data connections to operate. In the example embodiments, the ECUs of a vehicle may be split into subsets. Each subset may be assigned to a different "zone" of the vehicle based on the functionality controlled by the ECU. Through this architecture, the functionality of each zone may be isolated thereby limiting which ECUs are operating fully and which are not operating at all or which are performing a different action. The result is less power consumption.

In some other embodiments, a vehicle may post data to an online forum which is accessible to mechanics and other vehicular repair specialists. For example, a vehicle may include sensors such as microphones, video, and other sensors which can capture sensor data of an issue that is currently happening on a vehicle. For example, a microphone may be used to capture audio of a sound being made by the engine of the vehicle. Here, the vehicle may connect to an online forum and "post" an audio file of the sound that is recorded. In response, a mechanic can remotely listen to the sound and then post a solution to the issue via the online forum. The solution can be returned to the vehicle enabling a driver or other occupant of the vehicle to quickly ascertain whether the issue is something serious that requires service, or whether the issue is something that is temporary or can otherwise be driven on. In some embodiments, an AI model may be used to select a mechanic from among a plurality of possible mechanics based on the type of issue, qualifications of the mechanic, and the like.

In some other embodiments, an AI assistant may be integrated into a vehicle and may evaluate road conditions, environmental conditions, vehicle conditions, weather conditions, and the like, and make recommendations to improve the overall life of the vehicle. For example, the AI assistant may identify a different travel route that the vehicle can take to improve the life of the vehicle over time including the tires, suspension, battery, wheel alignment, and the like. As another example, the AI assistant may identify changes to how a hybrid battery uses gasoline versus battery. As another example, the AI assistant may receive data from other vehicles and use the data from the other vehicles to make recommendations to the vehicle to improve the vehicle in some way.

In some other embodiments, an AI system may be used to provide a driver of a vehicle with an augmented reality (AR) view of the road when the vehicle is travelling through adverse conditions. The AR view may be generated by an AI model, such as a generative AI model, a neural network, and/or the like. As an example, the AR view of the road may include lane lines, objects in the road, traffic signs/lights, and the like, which may not be visible to the driver based on environmental factors such as weather conditions, fog, debris and other conditions within the road, real-time traffic, accidents, pedestrians, and the like. The AR view may be displayed on a windshield of the vehicle or another display area. The AR view can be generated based on data collected from the road when such adverse conditions were not present, thus providing the driver with a clean view of the road even during adverse conditions.

In some other embodiments, an AI system may be used to guard a driver against possible danger created by the driver's lack of confidence in various situations. For example, a driver may be unaware of real-time conditions on the road. As another example, the driver may be inexperienced, incapacitated, or otherwise unsure of the current situation. As another example, the road may be difficult or uncertain to understand such as a lack of visible lane lines, street signs, or the like. In such situations, the AI system may monitor the driver behavior and may remotely control the vehicle when it determines that a potential danger or other hazard is likely.

FIG. 1A illustrates a zonal architecture 100A of electronic control units (ECUs) within a vehicle according to example embodiments. Referring to FIG. 1A, a vehicle includes a plurality of ECUs including a central ECU 110, a first subset of ECUs 115, a second subset of ECUs 116, a third subset of ECUs 117, and a fourth subset of ECUS 118. In this example, the vehicle includes four zones connected to the central ECU 110 via gateways. For example, the first subset of ECUs 115 is connected to the central ECU 110 via a gateway node 111, the second subset of ECUs 116 is connected to the central ECU 110 via a gateway node 112, the third subset of ECUs 117 is connected to the central ECU 110 via a third gateway node 113, and the fourth subset of ECUS 118 is connected to the central ECU 110 via a fourth gateway node 114. In this example, the different subset of ECUs may be powered up, powered down, etc. independent of the other subsets of ECUs. Furthermore, the tasks performed by the different subsets of ECUs may be segregated enabling two different subsets to work on two different tasks at the same time, while at the same time reducing power consumption.

The zones within the vehicle may represent different exterior locations on the vehicle, such as a front, a rear, a left side, a right side, etc. In this example, the vehicle may create a hierarchy among the zones during operation. For example, if the first subset of ECUs 115 are performing a left turn, one or more other subsets of ECUs may be powered down or may otherwise be performing a different functionality. In some embodiments, the system may create a signal chain in which a first zone (i.e., a first subset of ECUs) captures data, and then shares it with another zone, in sequence. This process may be iteratively repeated until all zones within the vehicle have received the data. During startup of the vehicle, there may be no leading zones. In this case, the central ECU 110 may partially allocate activity among the different zones to perform the startup or the like. The zonal architecture provides an abstraction layer in terms of buckets of ECUs bundled into sub-ECUs of zones. The algorithm runs across the entire car's signal chain. Data from each zone may be used to train an AI model. By isolating the training data into zones, the vehicle can learn/perform better at lower costs because only necessary data is used for training.

FIG. 1B illustrates a process 100B of a vehicle 120 posting content to an online forum 134 according to example embodiments. Referring to FIG. 1B, the vehicle 120 may be travelling and an issue may be detected. In this example, the sensor 122 may sense data of the issue such as audio data, image data, diagnostic data, and the like. As an example, one or more sensors on the vehicle 120 such as sensor 122 may detect a noise that is coming from a subsystem 124 of the vehicle 120. In response, the sensor 122 may capture audio of the noise while the vehicle is running/powered on. In this case, the sensor 122 may include logic that causes the sensor to record for a predetermined amount of time (e.g., 20 seconds, 30 seconds, 1 minute, 2 minutes, etc.) and create an audio file (e.g., .MP3, .WAV, etc.) Here, the audio file may be stored within a storage device of the vehicle 120. In this example, the subsystem 124 may include an engine, a transmission, a suspension, brakes, tires, or the like.

According to various embodiments, the online forum 134 may be hosted by a host server 130 such as a web server, a cloud platform, or the like. Here, the vehicle 120 may establish a network connection with the host server 130, for example, through vehicle-to-infrastructure (V2X) communications, or the like. In some embodiments, the vehicle 120 may upload the sensor data captured of the issue with the subsystem 124 from the vehicle 120 to the online forum 134 via the established connection. The sensor data may be uploaded in the form of a post to the online forum 134. The post may include an identifier of the vehicle (such as VIN, make, model, and the like), one or more audio files, image files, diagnostic data files, etc.

Here, a remote terminal 132 of a mechanic may also connect to the online forum 134 and review the post from the vehicle 120. In this example, the mechanic may review the sensor data, for example, listen to the audio in the audio file and provide a repair instruction or other instruction in response to the post from the vehicle 120. For example, the repair instruction may include an explanation of the issue generated by the mechanic, a recommendation on how to fix/repair the issue, and the like. In some embodiments, the response may be downloaded to the vehicle 120 enabling a driver of the vehicle 120 to review the instructions from the mechanic. This can let the driver know if the issue is urgent, and needs immediate assistance, or if the issue is less urgent and can be handled at a more convenient time.

In this example, data from the vehicle can be used to seek solutions to issues occurring on the vehicle through an online forum. The best-perceived solutions may be voted to the top. Any of these solutions that are implemented with proper results may be solidified at the top, and those that are not move down. The system can verify that the solution fixes the issue (for example, based on factory settings).

Vehicles are smarter than before (e.g., microphones, etc.). In the example embodiments, the vehicle can enter into a silent diagnostic mode and capture data of the issue through a microphone, a camera, or other sensors, to monitor and record the issue. Mechanics often struggle to "recreate an issue" with a vehicle. The silent diagnostic mode listens for and records the sound that is problematic, and digitally uploads a file with actual sensor data of the issue. In addition, the vehicle 120 may also upload CAN logs, etc. and package it all together for the mechanic. In some embodiments, the online forum 134 may be a dedicated forum for the manufacturer of the vehicle 120. As another example, the online forum 134 may be an open forum where "experts" from different manufacturers can provide their respective instructions and the other users can vote on the instructions given. In some embodiments, the host server 130 and/or the vehicle 120 may execute an AI model based on the sensor data, the diagnostic data, the image data, and match the issue to a mechanic. Here, the AI model may also consider qualifications of the mechanics including success rates. Thus, the AI model can find a mechanic that is the expert for the particular issue and connect to a terminal of that mechanic.

FIG. 1C illustrates a process 100C of an artificial intelligence (AI) assistant recommending a vehicle to take an action based on dynamic data of an environment of the vehicle according to example embodiments. Referring to FIG. 1C, an AI assistant 150 may be embedded within a computer of the vehicle 120. The AI assistant may include an AI model 151 that can receive sensor data from one or more of a weather sensor 152, a diagnostic sensor 153, a Global Positioning System (GPS) application 154, a battery sensor 155, and the like. The sensors may sense data from one or more of the environment around the vehicle 120, subsystems of the vehicle, weather data, location data, and the like, and may recommend an action to take 156. As an example, the action to take 156 may include an action that can preserve the life of the vehicle 120, the life of a subsystem on the vehicle, and the like.

As an example, the sensors of the vehicle associated with the AI assistant 150 may capture sensor data of road conditions of a road 140 that the vehicle 120 is currently travelling. Over time, poor road conditions can cause vehicle degradation (tires, suspension, wheel alignment, increased battery use, etc.). As another example, the sensor data may include sensor data of conditions that affect battery performance. For example, the sensor data may include environmental conditions hot temperature that can affect battery performance, air conditioning at maximum settings, wind/ rolling resistance, visibility due to weather, rain, fog, smog, etc. visibility due to time of day (nighttime), etc. As another example, the sensor data may include traffic data, network connectivity, and the like.

The recommendations made by the AI model 151 may be based on the sensor data. For example, the sensor data may be input to the AI model 151. Prior to the sensor data being input, the sensor data may be converted into a format (e.g., vector, number, etc.) that can be processed by a computer processer when executing the AI model 151. Here, the output by the AI model 151 may include instructions to take to increase the life of a battery of the vehicle, instructions to increase a life of the various subsystems on the vehicle, and the like.

For example, an instruction may include an instruction to take a different route than the vehicle normally takes. Here, the different route may include a different road segment between a particular starting location and a destination that is causing damage to the vehicle over time. The AI model 151 may recommend a different road segment that does not create such damage to the vehicle 120.

As another example, if the temperature is below a threshold at or near the battery, gasoline can be used to start and maneuver the vehicle versus the battery, which may traditionally be used. Data from other proximate/similar vehicles can be provided to the AI model (for example, effects of using battery upon startup versus gasoline) as well as data from dissimilar vehicles (such as full-electric EVs and the effects of those batteries upon startup) can be used to assess the load and degradation of all the batteries (i.e., three different data points). This assessment can continue to be used after the vehicle is started.

The AI model 151 can receive all of this data, analyze it, and determine when to start the vehicle, or to balance between using gas or electric or battery. Additional sensor data can be captured by the vehicle 120 to monitor the degradation of the vehicle 120. The AI model 151 can help make smarter decisions such as how the vehicle should use power, energy, etc. In some embodiments, the AI assistant 150 may connect to and receive data from other vehicles. Here, the AI assistant 150 may use data from similar vehicles to generate the recommended action to take 156.

Figure 1D:
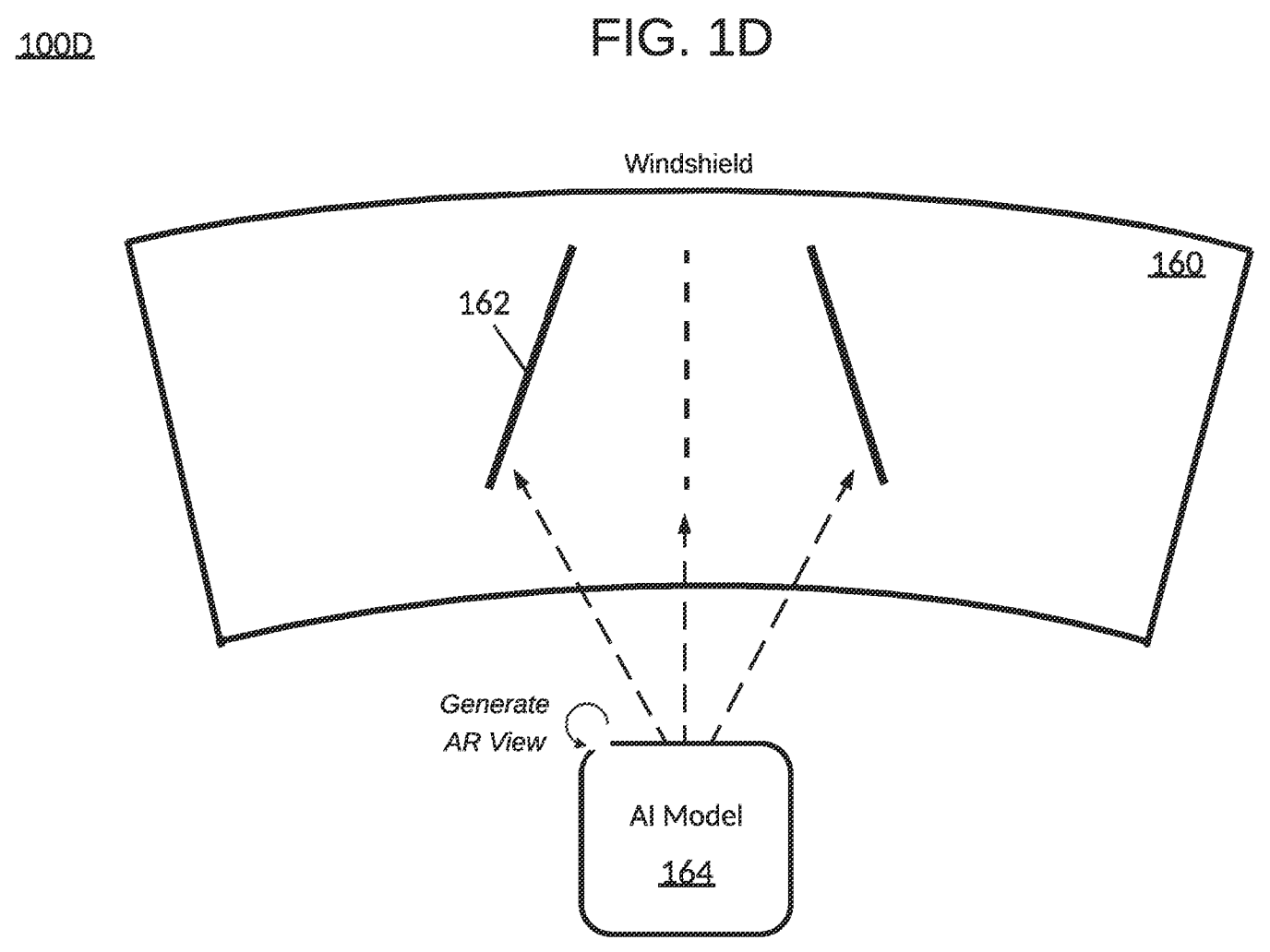

FIG. 1D illustrates a process 100D of outputting an augmented reality (AR) view within a vehicle according to example embodiments. Referring to FIG. 1D, an AI model 164 may create an augmented reality (AR) view of a road on which a vehicle is travelling and display the AR view inside an interior of the vehicle. In the example of FIG. 1D, the AR view includes lane lines 162 of a road currently being travelled by a vehicle. The AR view is displayed on a windshield 160 of the vehicle. It should also be appreciated that the AR view may include additional or different content such as objects on the road, street signs, potholes, trees, other vehicles, road construction, and the like. The AR view of the road may be triggered in response to environmental conditions around the vehicle. For example, if the vehicle is experiencing poor visibility due to bad weather, fog, or the like. The AR view can provide confidence to the driver when the driver is experiencing poor conditions and can help the driver maneuver the vehicle through such poor conditions.

According to various embodiments, the data used to generate the AR view can be collected while the poor conditions are not present. For example, the data may be collected from vehicles on the same road while the conditions are good such as good weather, etc. The images may show the road cleanly and may be stored ahead of time in a data lake, etc. The images may be used to create the AR view in a dynamic fashion when the environment is not good. For example, the clean data may be gathered from vehicles while the vehicles are on the road during good driving conditions (daytime, clear weather, etc.). The clean driving data may be the last known view that was considered (good) above a particular threshold level. The clean data may be referenced when real-time driving conditions are poor and may be "layered" to predict or otherwise augment a display of the driver (or autonomous vehicle) to provide a high level of confidence, along with any additional data related to objects that may have appeared after the clean data was collected, to create a holistic view of the road.

In some embodiments, the clean data may be used when the visual data to make driving decisions is not clear or is difficult to understand. In some embodiments, the clean data may be used for continuous real-time verification. For example, when the vehicle's external sensors cannot make out the roadway, the clean data can be used to "solve" what the sensors cannot make out. The external sensors can compare or verify the real-time data inputs about the roadway against the clean data. A continuous series of checkpoints in real-time, detecting the lane lines, detecting vehicles, and calculating its confidence (ex: 30% confidence) and comparing against the clean data set to determine the driving instructions to provide.

The AI model may take into consideration the risk level decisions when generating the augmented view of the roadway or when providing driving instructions to the driver or autonomous vehicle. The AI model 164 may be trained on training data that consider biases when assessing risk situations and determining what objects have greater importance (passengers or pedestrians; tree or cliff or vehicle; oncoming traffic or pedestrians; other objects to avoid, etc.) Road markings degrade over time. The AI model 164 may augment the lane lines if they are not clear, broken, worn away, etc. to ensure visibility of the lane lines above a threshold. An initial data set of the road and objects proximate to the road. Fill in the blanks or solve the problem, Use the AI model 164 to provide a view of what you may be able to see if the road conditions were perfect and if it was freshly painted lines, etc.

The AR view may be provided to the driver on a different display device other than the windshield 160, such as a heads-up display, or the like. The AI model 164 may paint the road view with light, and be able to indicate where lane lines are on the road. Here, the augmented reality view can enable the driver to visualize the road as the driver is navigating the road. In some embodiments, the vehicle may be remotely controlled by a remote terminal. Here, the remote terminal with the remote driver may be provided the augmented view. In some cases, the AR view may be output to both the display inside the vehicle and to the remote terminal at the same time. The remote driver could have superimposed layers and switch between the layers. The tele-operator will have access to more information, more capability. Thus, both the remote driver and driver can see the same AR view.

Figure 1E:
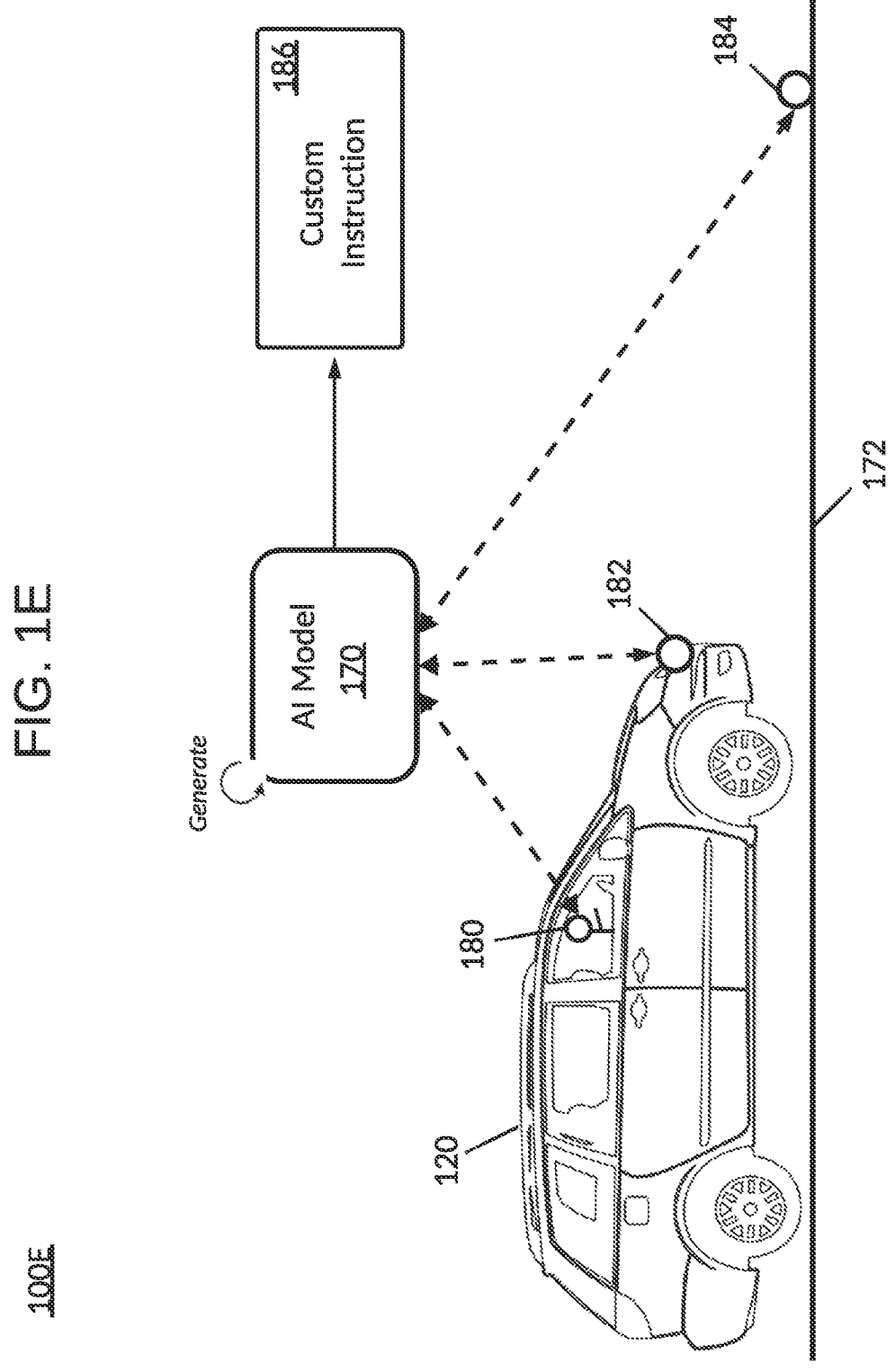
FIG. 1E is a diagram illustrating a process of analyzing driver behavior and protecting a driver during a trip according to example embodiments.

FIG. 1E illustrates a process 100E of analyzing driver behavior and protecting a driver during a trip according to example embodiments. Referring to FIG. 1E, an AI model 170 may collect data of a driver 180 via one or more sensors installed in a vehicle 120. For example, the sensor data may include image data of the driver 180 (e.g., a face, a posture position, a gaze direction with respect to the windshield, etc.). As another example, the sensor data may include seat pressure data, gas pedal data, brake pedal data, and the like. As another example, the sensor data may include audio data recorded from the interior of the vehicle 120, and the like. As another example, the AI model 170 may receive sensor data from the vehicle itself, such as from a sensor 182 installed at or near a subsystem of the vehicle 120 which can capture real-time driving behavior such as speed, acceleration, braking force, turning force, and the like. As another example, the AI model 170 may receive sensor data from one or more external sensors 184 which can provide sensed weather conditions including images of the road conditions, images of any debris in the road, images of fog, and the like.

According to various embodiments, the AI model 170 may analyze the sensor data and determine a confidence of the driver 180 with respect to the current driving conditions on a road 172 currently being travelled by the vehicle 120. The confidence may be based on whether the driver 180 is incapacitated, distracted, drowsy, or the like. As another example, the confidence may be based on the current conditions, the behavior of the vehicle as the driver 180 drives the vehicle 120 on the road 172, and the like. Based on the confidence value, the AI model 170 may generate a custom instruction 186 for the driver, for example, "please slow down", "please roll down a window", "please turn off the radio", "please pull the vehicle over", "please shut the vehicle down," etc. Furthermore, the AI model 170 may continue to monitor the sensor data from the sensors to determine whether the driver 180 has followed through with the custom instruction 186. In some embodiments, the AI model 170 may trigger a remote terminal to also perform an operation such as remotely controlling operation of the vehicle 120 to slow down, stop, pull over, etc.

In some embodiments, the AI model 170 may generate a dynamic driving instructions based on risk of the driving conditions and confidence of the operators of the vehicle (e.g., experience level, driving record, alertness of the driver, etc.). Supposition and real-time data may be received and analyzed by the AI model 170. If the conditions and confidence are below a threshold, the AI model 170 may recommend a best course of action for the vehicle and/or the operator (e.g., decreasing the driving speed, etc.). In some embodiments, after more real-time data is gathered, the system may recommend a different instruction for a different vehicle based on the monitored behavior of the vehicle 120. For example, the AI model 170 may determine that it wasn't necessary to decrease the speed for the vehicles driving this roadway, and it can safely raise the lowest speed for the subsequent cars driving through this uncertain area of the roadway. This notion of self-learning during real-time and the notion of supposition and prediction of what the world may look like using this supposed data because it was learning continuously (not just from the training data).

In some embodiments, the AI model 170 may ingest a user profile of the driver 180 to understand a confidence of the operator (e.g., experience level, driving record, condition, etc.) The user profile may be stored within a storage of the vehicle 120. The AI model 170 may assist the driver 180 by determining a best course of action based on a particular threshold and continue assessment. This can help the confidence level of the driver improve. Furthermore, the AI model 170 may continue to provide the same type of input and recommendations to the driver 180. In some embodiments, if the confidence of the driver 180 is below a threshold, the AI model 170 may enter into a babysitting mode or guardian mode which continuously monitors the performance of the driver/vehicle, and evaluate the risk to other vehicles on the road 172. This process may be helpful for new drivers or training older drivers with new controls.

Thus, the AI model 170 may monitor the confidence of the driver at an exact moment while traversing the road 172 using the sensor data. Here, the sensor data can be fed into the AI model 170, analyzed, and understood if both the condition and the confidence are below a particular threshold. Then, the best course of action for the vehicle is determined. As the confidence of the individual begins to increase, the AI model 170 may help the confidence level of the driver improve. As another example, the AI model 170 may trigger a remote terminal to remotely control the vehicle 120 if the AI model 170 determines that the driver 180 is not following the custom instruction 186 and/or is not exhibiting a more positive behavior.

FIG. 1F illustrates a process 100F of training the AI model 170 according to example embodiments. It should also be appreciated that the process 100F may be used to train any of the AI models described herein. Referring to FIG. 1F, a host platform 190 may host an IDE 192 (integrated development environment) where models may be developed, trained, retrained, and the like. In this example, the IDE 192 may include a software application with a user interface accessible by a user device (not shown) over a network or through a local connection. For example, the IDE 192 may be embodied as a web application that can be accessed at a network address, URL, etc by a device. As another example, the IDE 192 may be locally or remotely installed on a computing device where it is accessed and used locally.

The IDE 192 may be used to design the AI model 170 (via a user interface of the IDE 192) that can receive road conditions, sensor data from vehicles, and instructions that are best practices based on the road conditions and the sensor data, and generate a trained AI model. The model can be executed/trained based on the training data established via the user interface. For example, the user interface may be used to build a new model. The training data for training such a new model may be provided from training data stored in a database 194 which includes training samples (e.g., recommended instructions for certain contextual situations based on road conditions, vehicle conditions, traffic, debris in the road, driver behavior, weather, vehicle status, etc.). The training data may be generated by sensors that sense audio, video, diagnostic data, etc. and which is then converted into a vector format or other encoding that can be input/processed by a computer processor and the AI model 170. As another example, the training data may be pulled from one or more external data stores 198 such as publicly available sites, etc.

During training, the AI model 170 may be executed on training data via an AI engine 174 of the host platform 190. The AI model 170 may learn how to recommend custom instructions, based on sensor data, diagnostic data, contextual factors, and the like. When the model is fully trained, it may be stored within the model repository 176 via the IDE 192, or the like.

As another example, the IDE 192 may be used to retrain the AI model 170 after the model has already been deployed. The retraining process may use executional results that have already been generated/output by the AI model 170 in a live environment (including any user feedback, etc.) to retrain the AI model 170. For example, a user may receive a custom instruction output by the AI model 170 via a display device of a vehicle. The user may provide feedback through the display device which indicates whether the instruction was helpful, accurate, relevant, or not, etc. This data may be captured and stored within a runtime log 196 or other data store within the live environment.

In one embodiment, the system manages vehicle operations through a zonal architecture. The system first divides the vehicle into multiple zones based on the operations performed by the vehicle. Each zone is assigned a distinct subset of electronic control units (ECUs) from the numerous ECUs present in the vehicle based on the functions these ECUs perform concerning the respective zones. For instance, functions such as wheel speed control, braking power, ignition timing, and air/fuel mixture regulation may each be managed by dedicated subsets of ECUs. The allocation of ECUs to specific zones facilitates the isolation of functionality within each zone, thereby optimizing power consumption by enabling selective activation and deactivation of ECUs. Upon determining a specific operation to perform for the vehicle, a zone is identified from among the plurality of zones to control the operation. This identification process may involve evaluating the requirements of the operation and selecting the zone best suited to fulfill those requirements based on the functionalities of the ECUs assigned to that zone. Once the zone is determined, data input and output by the subset of ECUs included in that zone during the operation are pooled together. The pooled data, which may encompass sensor readings, control signals, and diagnostic information, is stored in a storage device for future reference and analysis. The subsets of ECUs communicate with a central ECU through gateways. Each subset of ECUs may be connected to the central ECU via gateway nodes, enabling independent power management and task segregation among different subsets. This architecture allows for concurrent operation of multiple tasks within distinct zones while minimizing power consumption by selectively activating only the necessary ECUs. Additionally, signal chains may be established within the vehicle, wherein data captured by one zone is sequentially shared with other zones.

In one embodiment, the system involves a vehicle equipped with various sensors and communication capabilities for diagnosing and addressing issues. Upon a subsystem of the vehicle encountering an issue, such as an abnormal noise from the engine, sensors within the vehicle, like microphones or diagnostic sensors, detect and capture relevant data, such as audio recordings or diagnostic logs. The sensor data is processed and stored within the vehicle's storage system. Simultaneously, the vehicle establishes a network connection, possibly through vehicle-to-infrastructure (V2X) communications, with a remote server hosting a software application, possibly a web server or cloud platform. Through this network connection, the vehicle uploads the captured sensor data to an online forum operated by the software application. Once the sensor data is posted on the online forum, mechanics or repair specialists operating remotely access the forum to review the posted data. They connect to the forum through a remote terminal connected to the internet. Mechanics analyze the sensor data, such as listening to the audio recordings of engine noises, and provide repair instructions or recommendations directly on the forum. The instructions include explanations of the detected issue, suggested fixes, and recommendations for further diagnostics. The repair instructions are transmitted to the vehicle through the established network connection. The online forum may incorporate a voting system where users can rank suggested solutions. The solutions perceived as the most effective may rise to the top of the forum thread, providing a ranking of potential fixes for the detected issue.

Additionally, the system can verify the effectiveness of implemented solutions, possibly based on factory settings or other criteria. This iterative process ensures that only reliable and effective solutions are recommended and implemented for resolving vehicle issues.

In one embodiment, a system for vehicle maintenance and optimization is disclosed. The system comprises various components integrated within a vehicle, including but not limited to sensors such as a weather sensor, a diagnostic sensor, a GPS application, and a battery sensor. The sensors collect real-time data related to the vehicle's environment, subsystems, weather conditions, location, and battery performance. The collected data is then processed by an artificial intelligence (AI) assistant, which includes an AI model capable of analyzing the sensor data. The AI model is designed to identify attributes of the vehicle that are degrading while the vehicle is in operation along a particular route. Based on this analysis, the AI model determines appropriate actions to mitigate the degradation of these attributes. Once the AI model has determined the necessary actions, it communicates with a display device within the vehicle to provide notifications to the vehicle occupants. These notifications contain instructions regarding the recommended actions to reduce the degradation of the identified vehicle attributes. For instance, if the sensor data indicates poor road conditions, the AI model may recommend an alternative route that is less damaging to the vehicle's tires, suspension, and overall performance. Additionally, if the battery sensor detects environmental conditions such as hot temperatures that could affect battery performance, the AI model may suggest using gasoline instead of relying solely on the battery for vehicle startup and maneuvering. The AI assistant communicates with other vehicles in proximity, exchanging data with similar vehicles to enhance its analysis and recommendations. For example, it may incorporate data from other vehicles experiencing similar conditions to refine its optimal vehicle maintenance and performance recommendations.

In one embodiment, the system enhances driver visibility in poor environmental conditions using augmented reality (AR) technology. The system comprises a vehicle equipped with various sensors capable of collecting real-time data as the vehicle traverses along a road. The sensors include cameras, LIDAR, radar, and other environmental sensors. Upon detecting deteriorating environmental conditions, such as poor visibility due to weather or other factors, the system activates an AI model installed within the vehicle's computing system. The AI model is trained to analyze sensor data and make informed decisions regarding presenting an AR view to the driver. Additionally, the system is configured to access previously captured sensor data of the road from a centralized repository, which may include data collected by other vehicles during optimal driving conditions. This historical data is a reference point for generating an augmented view of the road when real-time conditions degrade. The AI model processes the historical sensor data to create a comprehensive view of the road, including lane markings, objects, road signs, and other relevant information. The augmented view is displayed within the vehicle via AR technology, typically projected onto the windshield or a heads-up display (HUD). The AR view assists the driver in navigating through challenging conditions by providing enhanced visibility of the road ahead. In some embodiments, the system may augment lane markings or other road features that have degraded over time, ensuring their visibility above a predefined threshold. The system supports communication between the vehicle's onboard components and external devices, such as remote terminals operated by tele-operators or remote drivers. This communication allows for transmitting the AR view generated by the AI model to remote terminals, enabling remote drivers to assist in navigating the vehicle during challenging conditions. The onboard and remote drivers can view the same AR representation of the road, facilitating coordinated navigation efforts.

In one embodiment, the system enhances vehicle safety through AI-assisted driver monitoring and control. The system involves training an artificial intelligence (AI) model utilizing sensor data from a plurality of vehicles and actions those vehicles perform while traveling along predefined routes. The sensor data encompasses various parameters, including but not limited to image data of the driver captured through sensors installed in the vehicle, such as facial recognition, posture positioning, and gaze direction relative to the windshield. Additionally, sensor data includes seat pressure, gas pedal, brake pedal data, and audio recordings from the vehicle interior. Moreover, external sensors contribute data related to weather conditions and road hazards. The AI model, trained on this diverse dataset, assesses the driver's confidence level in prevailing driving conditions based on analyzed sensor data. Confidence is evaluated concerning factors like driver incapacitation, distraction, or drowsiness, as well as current road and vehicle behaviors. Upon detecting uncertain conditions, the AI model generates customized instructions tailored to the specific situation, such as advising the driver to slow down, roll down a window, or pull over. These instructions are dynamically adjusted based on real-time risk assessment and driver confidence levels, potentially reducing the likelihood of accidents. Furthermore, the AI model incorporates user profiles to better understand individual drivers' experience levels and driving records and conditions, allowing for personalized assistance. If a driver's confidence falls below a predefined threshold, the AI model enters a guardian mode, continuously monitoring the driver's performance and vehicle operation to mitigate risks to other road users. The AI model's training and retraining processes occur within a host platform equipped with an integrated development environment (IDE). The IDE facilitates model development, training, and deployment, with user-friendly interfaces accessible over networks or locally. Training data, sourced from vehicle sensors and external data stores, includes samples of recommended instructions for various contextual situations based on diverse parameters. During training, the AI model learns to recommend custom instructions by processing sensor data, contextual factors, and past driving behaviors.

Flow diagrams depicted herein, such as FIG. 2C, FIG. 2D, FIG. 2E, and FIG. 2F, are separate examples but may be the same or different embodiments. Any of the operations in one flow diagram may be adopted and shared with another flow diagram. No example operation is intended to limit the subject matter of any embodiment or corresponding claim.

It is important to note that all the flow diagrams and corresponding processes derived from FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
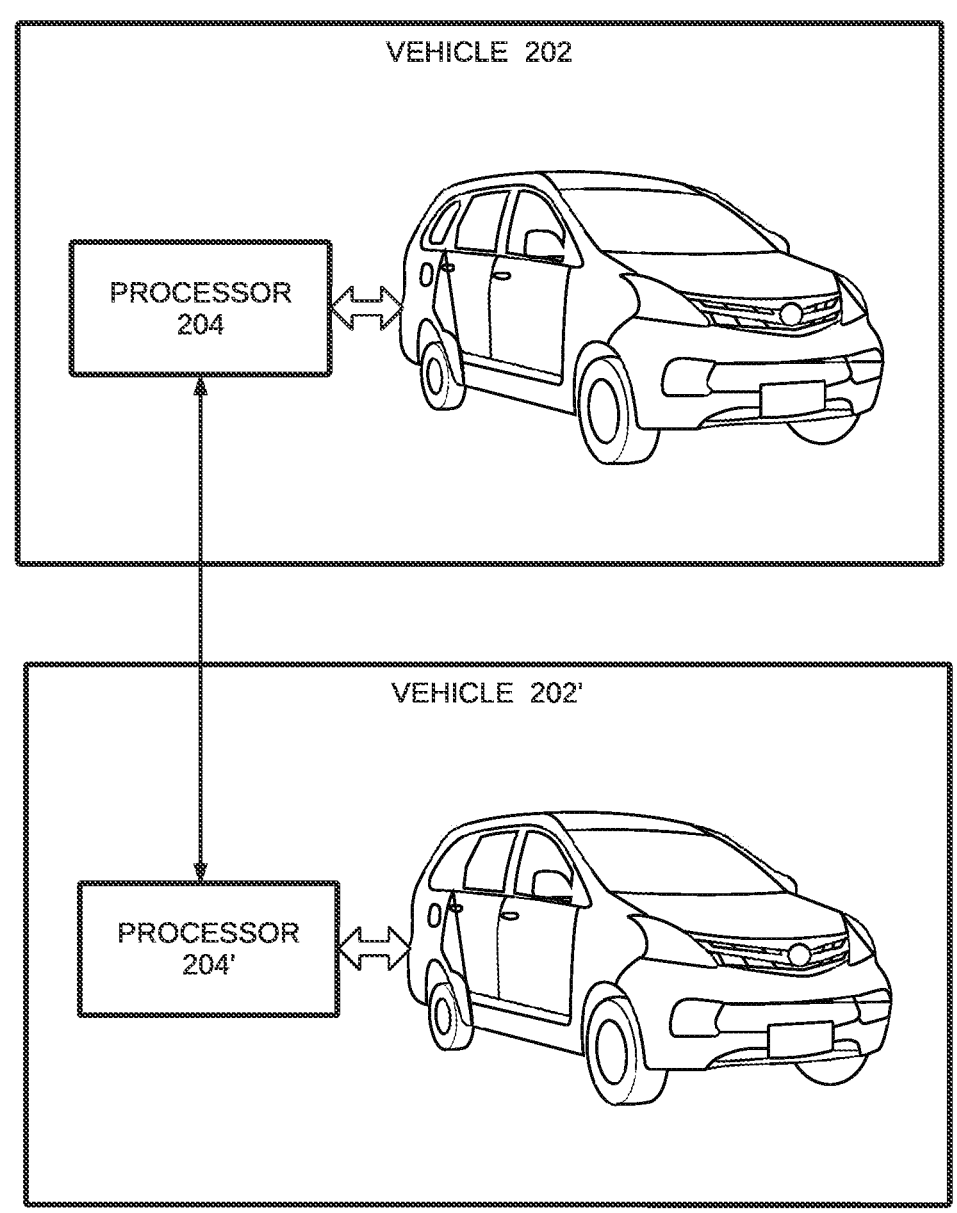
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
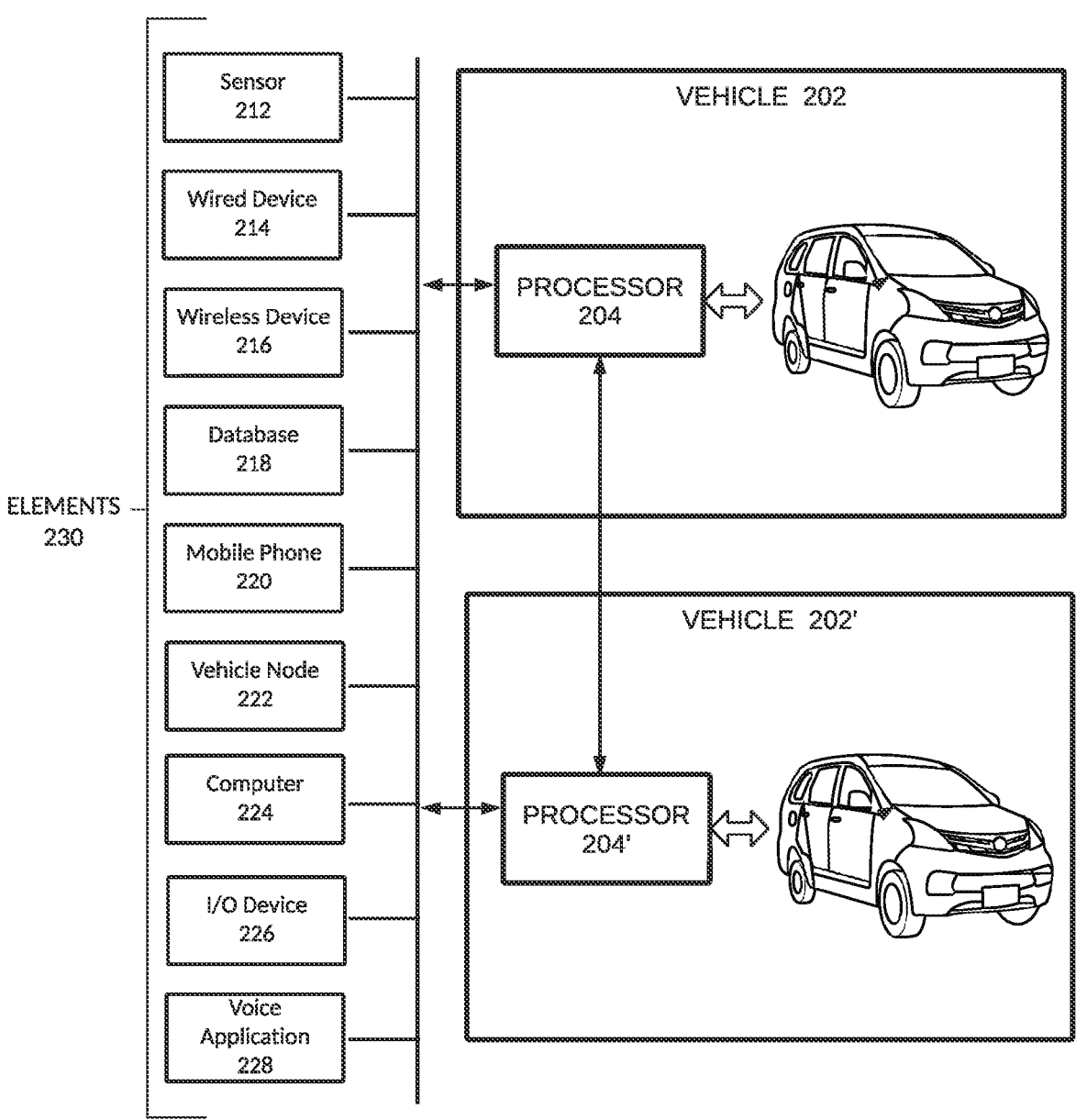
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, input/output (I/O) device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
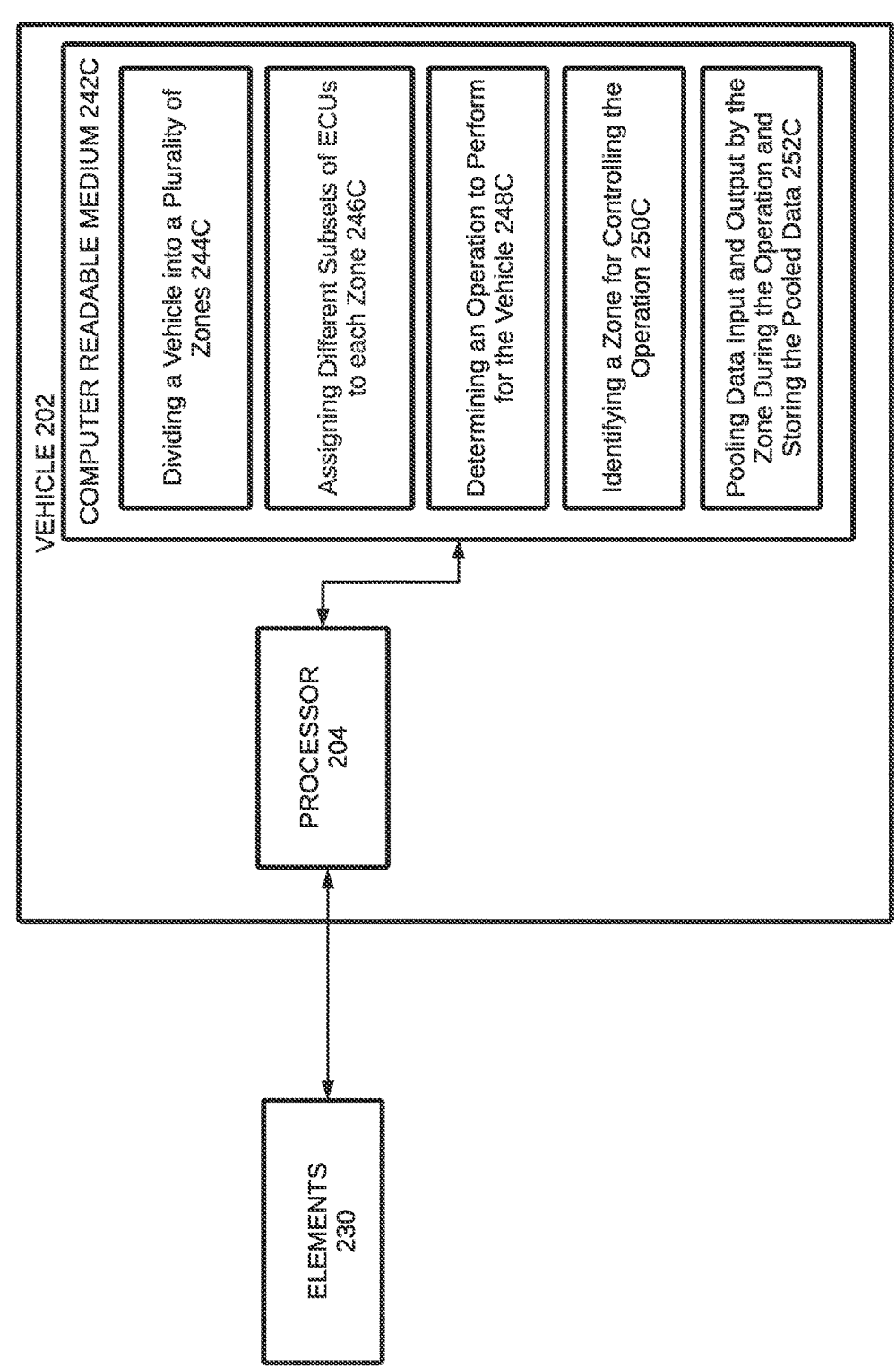
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer readable medium 242C. The processor 204 is communicably coupled to the computer readable medium 242C and elements 230 (which were depicted in FIG. 2B). The vehicle 202 may be a vehicle, server, or any device with a processor and memory.

The processor 204 performs one or more of dividing a vehicle into a plurality of zones based on operations performed by vehicle in 244C, assigning a different subset of electronic control units (ECUs) from among a plurality of ECUs of the vehicle to each zone based on functions performed by the plurality of ECUs with respect to the plurality of zones in 246C, determining an operation to perform for the vehicle in 248C, identifying a zone from among the plurality of zones for controlling the operation in 250C, and pooling data input by and output by a subset of ECUs included in the zone during the operation and storing the pooled data in a storage device in 252C.

FIG. 2D illustrates a further vehicle network diagram 250, according to example embodiments. The network comprises elements including a vehicle 202 a processor 204, and a non-transitory computer readable medium 242D. The processor 204 is communicably coupled to the computer readable medium 242D and elements 230 (which were depicted in FIG. 2B). The vehicle 202 may be a vehicle, server or any device with a processor and memory.

The processor 204 performs one or more of capturing sensor data from one or more of an exterior of the vehicle and an interior of the vehicle, via a different subset of ECUs of the vehicle assigned to a different zone from among the plurality of zones, while simultaneously controlling the operation with the subset of ECUs assigned to the zone in 244D, transferring the pooled data from the subset of ECUs assigned to the zone to a different subset of ECUs assigned to a different zone among the plurality of zones based on a hierarchy among the zone and the different zone in 245D, determining to perform a vehicle maneuver with respect to a side of the vehicle, and performing the vehicle maneuver with a subset of ECUs assigned to the side of the ECU while isolating operation of a different subset of ECUs assigned to a different side of the vehicle from the vehicle maneuver in 246D, performing the operation via execution of the subset of ECUs included in the zone, and reducing activity of one or more other subsets of ECUs assigned to one or more other zones from among the plurality of zones while performing the operation to reduce power consumed by the one or more other zones in 247D, performing the operation via execution of the subset of ECUs included in the zone, and capturing sensor data from one or more other subsets of ECUs assigned to one or more other zones from among the plurality of zones while performing the operation via the subset of ECUs included in the zone in 248D, and training an artificial intelligence (AI) model based on execution of the AI model on the pooled data stored in the storage device and storing the trained AI model within the storage device in 249D.

While this example describes in detail only one vehicle 202, multiple such nodes may be connected to the blockchain. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processor 204 performs one or more of receiving a confirmation of an event from one or more elements described or depicted herein, wherein the confirmation comprises a blockchain consensus between peers represented by any of the elements and executing a smart contract to record the confirmation on the blockchain consensus. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable medium may fully or partially reside in the interior or exterior of the vehicles. The steps or features stored in the computer readable medium may be fully or partially performed by any of the processors and/or elements in any order. Additionally, one or more steps or features may be added, omitted, combined, performed at a later time, etc.

Figure 2E:
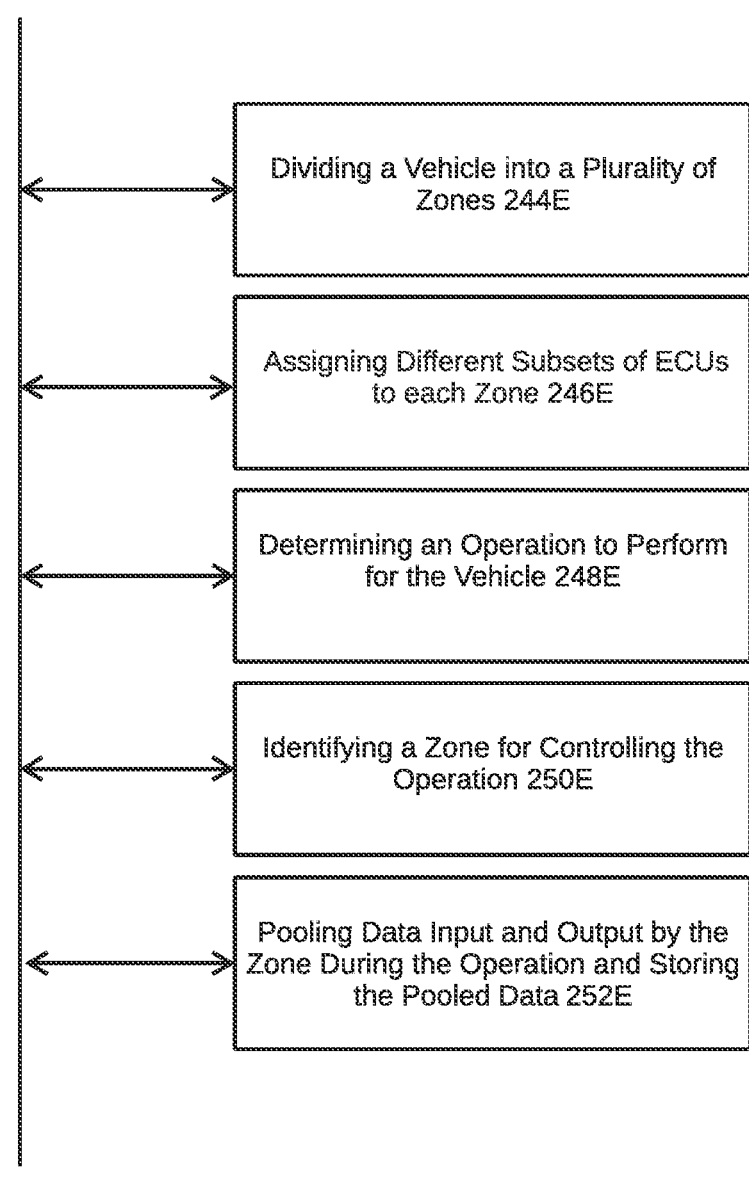
FIG. 2E illustrates a flow diagram, according to example embodiments.

FIG. 2E illustrates a flow diagram 260, according to example embodiments. Referring to FIG. 2E, the instant solution includes one or more of dividing a vehicle into a plurality of zones based on operations performed by vehicle in 244E, assigning a different subset of electronic control units (ECUs) from among a plurality of ECUs of the vehicle to each zone based on functions performed by the plurality of ECUs with respect to the plurality of zones in 246E, determining an operation to perform for the vehicle in 248E, identifying a zone from among the plurality of zones for controlling the operation in 250E, and pooling data input by and output by a subset of ECUs included in the zone during the operation and storing the pooled data in a storage device in 252E.

FIG. 2F illustrates another flow diagram 270, according to example embodiments. Referring to FIG. 2F, the instant solution includes one or more of capturing sensor data from one or more of an exterior of the vehicle and an interior of the vehicle, via a different subset of ECUs of the vehicle assigned to a different zone from among the plurality of zones, while simultaneously controlling the operation with the subset of ECUs assigned to the zone in 244F, transferring the pooled data from the subset of ECUs assigned to the zone to a different subset of ECUs assigned to a different zone among the plurality of zones based on a hierarchy among the zone and the different zone in 245F, determining to perform a vehicle maneuver with respect to a side of the vehicle, and performing the vehicle maneuver with a subset of ECUs assigned to the side of the ECU while isolating operation of a different subset of ECUs assigned to a different side of the vehicle from the vehicle maneuver in 246F, performing the operation via execution of the subset of ECUs included in the zone, and reducing activity of one or more other subsets of ECUs assigned to one or more other zones from among the plurality of zones while performing the operation to reduce power consumed by the one or more other zones in 247F, performing the operation via execution of the subset of ECUs included in the zone, and capturing sensor data from one or more other subsets of ECUs assigned to one or more other zones from among the plurality of zones while performing the operation via the subset of ECUs included in the zone in 248F, and training an artificial intelligence (AI) model based on execution of the AI model on the pooled data stored in the storage device and storing the trained AI model within the storage device in 249F.

Technological advancements typically build upon the fundamentals of predecessor technologies; such is the case with Artificial Intelligence (AI) models. An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence"), and reaching the AI classification "Self-Aware" (also known as "Artificial Superintelligence"). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing characteristics of Limited Memory Machines. Generative AI models combine Limited Memory Machine technologies, incorporating ML and DL, forming the foundational building blocks of future AI models. For example, Theory of Mind is the next progression of AI that may be able to perceive, connect, and react by generating appropriate reactions in response to an entity with which the AI model is interacting; all of these capabilities rely on the fundamentals of Generative AI. Furthermore, in an evolution into the Self-Aware classification, AI models will be able to understand and evoke emotions in the entities they interact with, as well as possessing their own emotions, beliefs, and needs, all of which rely on Generative AI fundamentals of learning from experiences to generate and draw conclusions about itself and its surroundings. Generative AI models are integral and core to future artificial intelligence models. As described herein, Generative AI refers to present-day Generative AI models and future AI models.

Figure 3A:
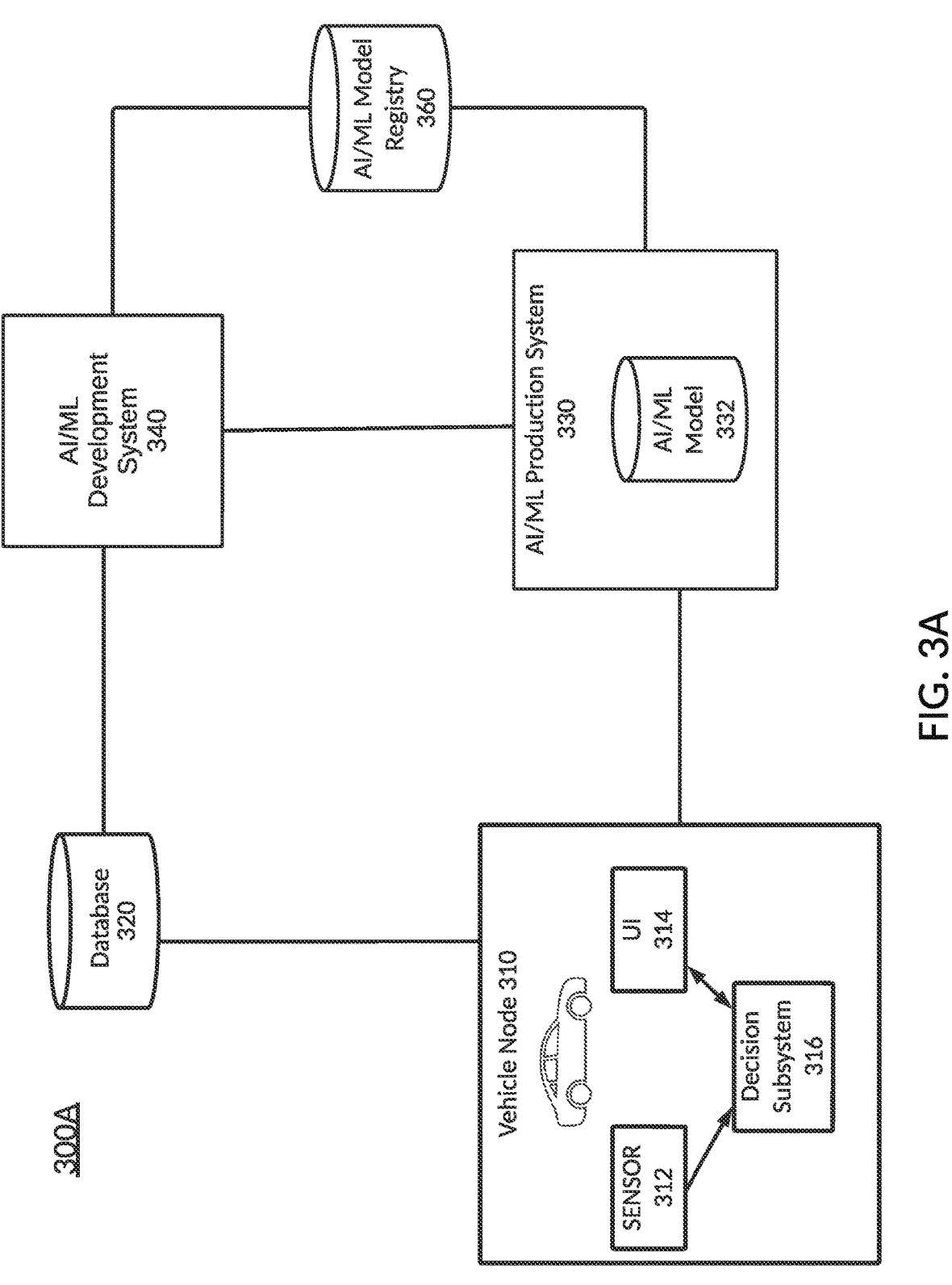
FIG. 3A illustrates an Artificial Intelligence (AI)/Machine Learning (ML) network diagram for integrating an artificial intelligence (AI) model into any decision point in the example embodiments.

FIG. 3A illustrates an AI/ML network diagram 300A that supports AI-assisted vehicle or occupant decision points. Other branches of AI, such as, but not limited to, computer vision, fuzzy logic, expert systems, neural networks/deep learning, generative AI, and natural language processing, may all be employed in developing the AI model shown in these embodiments. Further, the AI model included in these embodiments is not limited to particular AI algorithms. Any algorithm or combination of algorithms related to supervised, unsupervised, and reinforcement learning algorithms may be employed.

In one embodiment, Generative AI (GenAI) may be used by the instant solution in the transformation of data. Vehicles are equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI executes data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation is then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters. A critical step in the use of GenAI, given the safety-critical nature of vehicles, is validation. This validation might include the output data being compared with real-world datasets or using specialized tools like a GAN discriminator to gauge the realism of the crafted samples.

Vehicle node 310 may include a plurality of sensors 312 that may include but are not limited to, light sensors, weight sensors, cameras, lidar, and radar. In some embodiments, these sensors 312 send data to a database 320 that stores data about the vehicle and occupants of the vehicle. In some embodiments, these sensors 312 send data to one or more decision subsystems 316 in vehicle node 310 to assist in decision-making.

Vehicle node 310 may include one or more user interfaces (UIs) 314, such as a steering wheel, navigation controls, audio/video controls, temperature controls, etc. In some embodiments, these UIs 314 send data to a database 320 that stores event data about the UIs 314 that includes but is not limited to selection, state, and display data. In some embodiments, these UIs 314 send data to one or more decision subsystems 316 in vehicle node 310 to assist decision-making.

Vehicle node 310 may include one or more decision subsystems 316 that drive a decision-making process around, but are not limited to, vehicle control, temperature control, charging control, etc. In some embodiments, the decision subsystems 316 gather data from one or more sensors 312 to aid in the decision-making process. In some embodiments, a decision subsystem 316 may gather data from one or more UIs 314 to aid in the decision-making process. In some embodiments, a decision subsystem 316 may provide feedback to a UI 314.

An AI/ML production system 330 may be used by a decision subsystem 316 in a vehicle node 310 to assist in its decision-making process. The AI/ML production system 330 includes one or more AI/ML models 332 that are executed to retrieve the needed data, such as, but not limited to, a prediction, a categorization, a UI prompt, etc. In some embodiments, an AI/ML production system 330 is hosted on a server. In some embodiments, the AI/ML production system 330 is cloud-hosted. In some embodiments, the AI/ML production system 330 is deployed in a distributed multi-node architecture. In some embodiments, the AI production system resides in vehicle node 310.

An AI/ML development system 340 creates one or more AI/ML models 332. In some embodiments, the AI/ML development system 340 utilizes data in the database 320 to develop and train one or more AI models 332. In some embodiments, the AI/ML development system 340 utilizes feedback data from one or more AI/ML production systems 330 for new model development and/or existing model re-training. In an embodiment, the AI/ML development system 340 resides and executes on a server. In another embodiment, the AI/ML development system 340 is cloud hosted. In a further embodiment, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one embodiment. In some embodiments, the AI/ML model registry 360 is cloud-hosted. The AI/ML model registry 360 is a distributed database in other embodiments. In further embodiments, the AI/ML model registry 360 resides in the AI/ML production system 330.

Figure 3B:
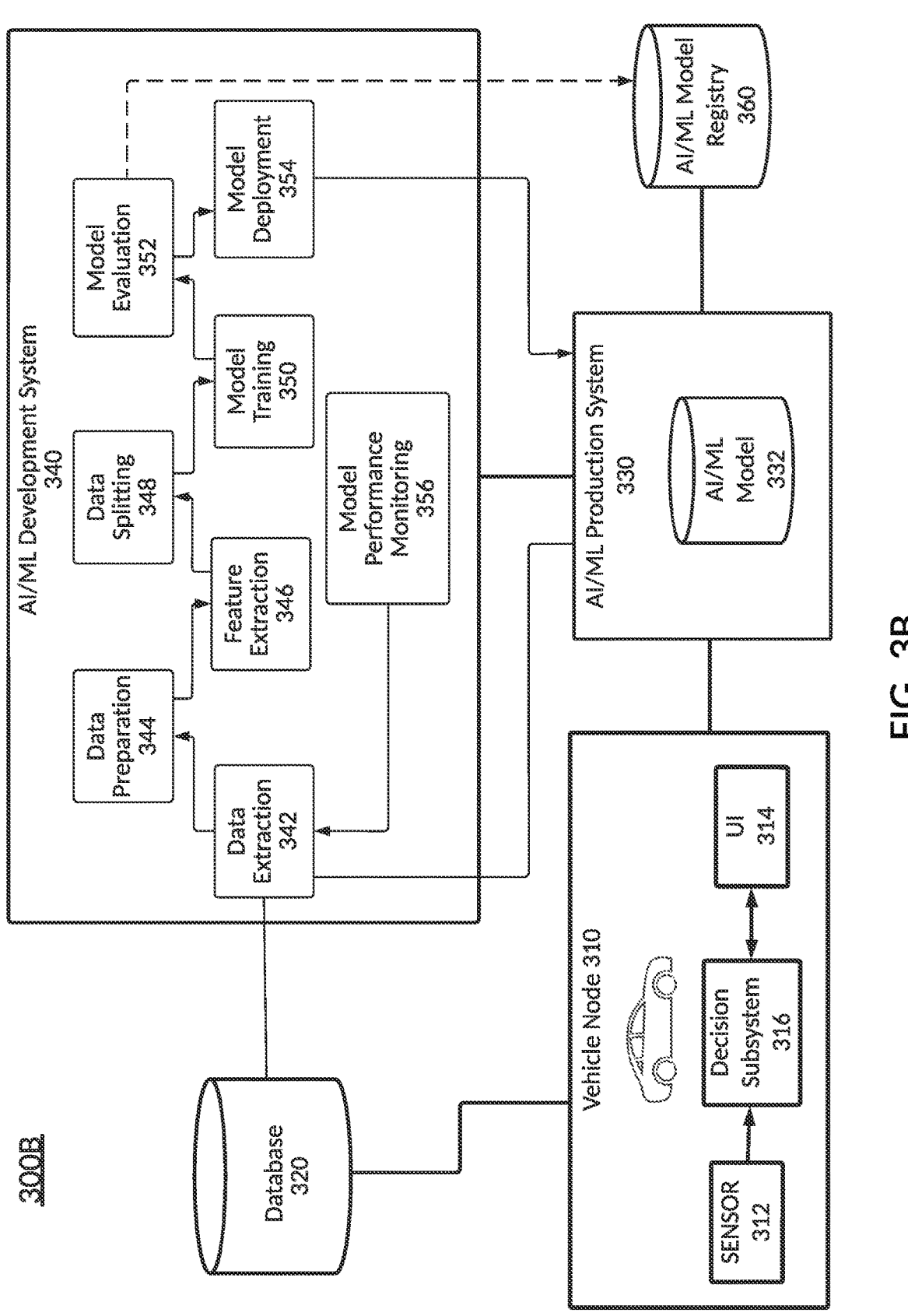
FIG. 3B illustrates a process for developing an Artificial Intelligence (AI)/Machine Learning (ML) model that supports AI-assisted vehicle or occupant decision points.

FIG. 3B illustrates a process 300B for developing one or more AI/ML models that support AI-assisted vehicle or occupant decision points. An AI/ML development system 340 executes steps to develop an AI/ML model 332 that begins with data extraction 342, in which data is loaded and ingested from one or more data sources. In some embodiments, vehicle and user data is extracted from a database 320. In some embodiments, model feedback data is extracted from one or more AI/ML production systems 330.

Once the required data has been extracted 342, it must be prepared 344 for model training. In some embodiments, this step involves statistical testing of the data to see how well it reflects real-world events, its distribution, the variety of data in the dataset, etc. In some embodiments, the results of this statistical testing may lead to one or more data transformations being employed to normalize one or more values in the dataset. In some embodiments, this step includes cleaning data deemed to be noisy. A noisy dataset includes values that do not contribute to the training, such as but are not limited to, null and long string values. Data preparation 344 may be a manual process or an automated process using one or more of the elements, functions described or depicted herein.

Features of the data are identified and extracted 346. In some embodiments, a feature of the data is internal to the prepared data from step 344. In other embodiments, a feature of the data requires a piece of prepared data from step 344 to be enriched by data from another data source to be useful in developing an AI/ML model 332. In some embodiments, identifying features is a manual process or an automated process using one or more of the elements, functions described or depicted herein. Once the features have been identified, the values of the features are collected into a dataset that will be used to develop the AI/ML model 332.

The dataset output from feature extraction step 346 is split 348 into a training and validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm and an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some embodiments, the validation dataset from step 348 is used. In other embodiments, one or more unseen validation datasets are used. In some embodiments, the staging environment is part of the AI/ML development system 340. In other embodiments, the staging environment is managed separately from the AI/ML development system 340. Once the AI/ML model 332 has been validated, it is stored in an AI/ML model registry 360, which can be retrieved for deployment and future updates. As before, in some embodiments, the model evaluation step 352 is a manual process or an automated process using one or more of the elements, functions described or depicted herein.

Once an AI/ML model 332 has been validated and published to an AI/ML model registry 360, it may be deployed 354 to one or more AI/ML production systems 330. In some embodiments, the performance of deployed AI/ML models 332 is monitored 356 by the AI/ML development system 340. In some embodiments, AI/ML model 332 feedback data is provided by the AI/ML production system 330 to enable model performance monitoring 356. In some embodiments, the AI/ML development system 340 periodically requests feedback data for model performance monitoring 356. In some embodiments, model performance monitoring includes one or more triggers that result in the AI/ML model 332 being updated by repeating steps 342-354 with updated data from one or more data sources.

Figure 3C:
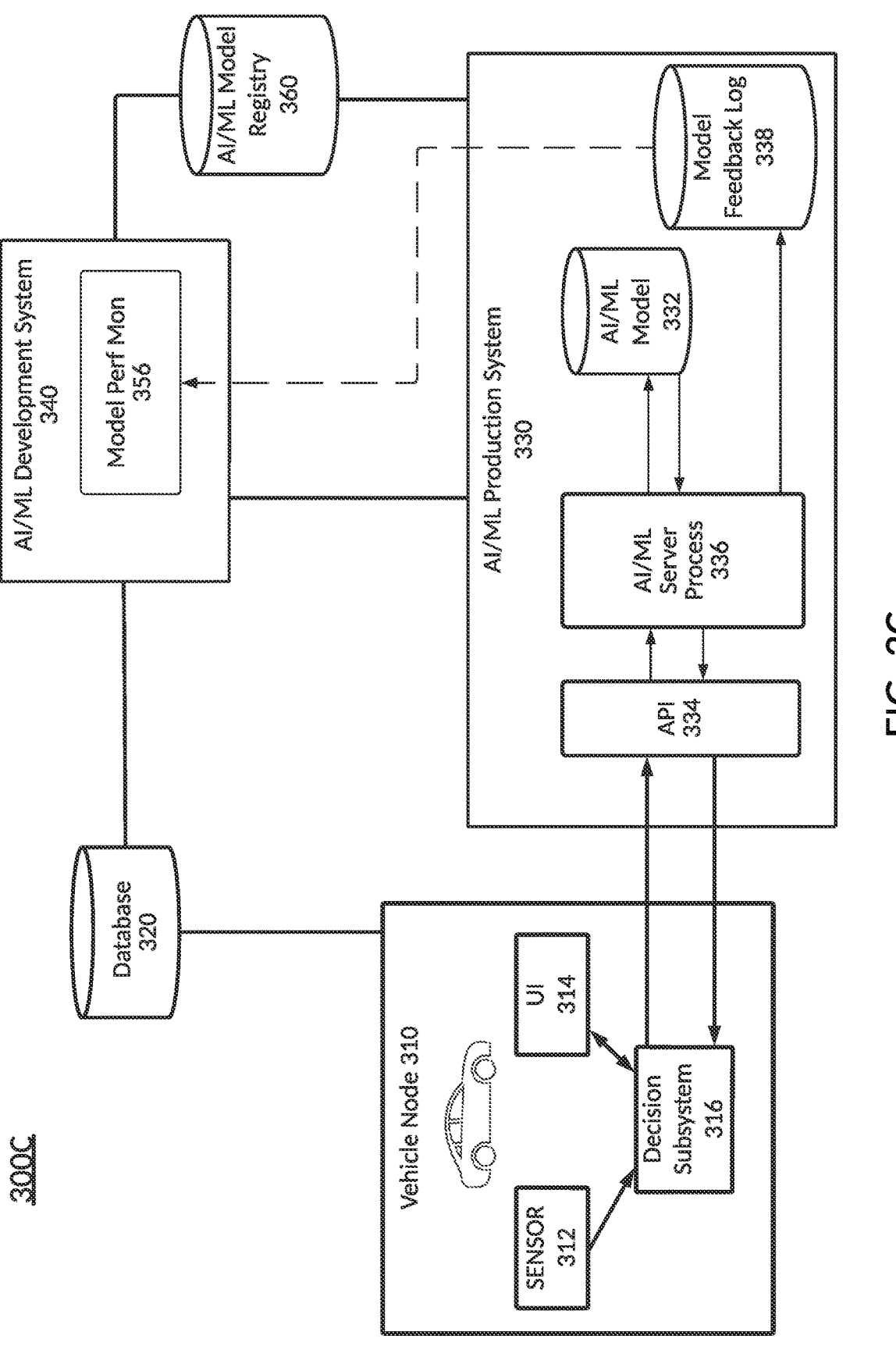
FIG. 3C illustrates a process for utilizing an Artificial Intelligence (AI)/Machine Learning (ML) model that supports AI-assisted vehicle or occupant decision points.

FIG. 3C illustrates a process 300C for utilizing an AI/ML model that supports AI-assisted vehicle or occupant decision points. As stated previously, the AI model utilization process depicted herein reflects ML, which is a particular branch of AI, but the instant solution is not limited to ML and is not limited to any AI algorithm or combination of algorithms.

Referring to FIG. 3C, an AI/ML production system 330 may be used by a decision subsystem 316 in vehicle node 310 to assist in its decision-making process. The AI/ML production system 330 provides an application programming interface (API) 334, executed by an AI/ML server process 336 through which requests can be made. In some embodiments, a request may include an AI/ML model 332 identifier to be executed. In some embodiments, the AI/ML model 332 to be executed is implicit based on the type of request. In some embodiments, a data payload (e.g., to be input to the model during execution) is included in the request. In some embodiments, the data payload includes sensor 312 data from vehicle node 310. In some embodiments, the data payload includes UI 314 data from vehicle node 310. In some embodiments, the data payload includes data from other vehicle node 310 subsystems (not shown), including but not limited to, occupant data subsystems. In an embodiment, one or more elements or nodes 320, 330, 340, or 360 may be located in the vehicle 310.

Upon receiving the API 334 request, the AI/ML server process 336 may need to transform the data payload or portions of the data payload to be valid feature values into an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of vehicle node 310. In some embodiments, the response may result in an update to a UI 314 in vehicle node 310. In some embodiments, the response includes a request identifier that can be used later by the decision subsystem 316 to provide feedback on the AI/ML model 332 performance. Further, in some embodiments, immediate performance feedback may be recorded into a model feedback log 338 by the AI/ML server process 336. In some embodiments, execution model failure is a reason for immediate feedback.

In some embodiments, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. For example, if the AI/ML model 332 provided an estimated time of arrival of 20 minutes, but the actual travel time was 24 minutes, that may be indicated. In some embodiments, the feedback interface includes the identifier of the initial request so that it can be used to associate the feedback with the request. Upon receiving a call into the feedback interface of API 334, the AI/ML server process 336 records the feedback in the model feedback log 338. In some embodiments, the data in this model feedback log 338 is provided to model performance monitoring 356 in the AI/ML development system 340. This log data is streamed to the AI/ML development system 340 in one embodiment. In some embodiments, the log data is provided upon request.

A number of the steps/features that may utilize the AI/ML process described herein include one or more of: dividing a vehicle into a plurality of zones based on operations performed by vehicle, assigning a different subset of electronic control units (ECUs) from among a plurality of ECUs of the vehicle to each zone based on functions performed by the plurality of ECUs with respect to the plurality of zones, determining an operation to perform for the vehicle, identifying a zone from among the plurality of zones for controlling the operation, and pooling data input by and output by a subset of ECUs included in the zone during the operation and storing the pooled data in a storage device, capturing sensor data from one or more of an exterior of the vehicle and an interior of the vehicle, via a different subset of ECUs of the vehicle assigned to a different zone from among the plurality of zones, while simultaneously controlling the operation with the subset of ECUs assigned to the zone, transferring the pooled data from the subset of ECUs assigned to the zone to a different subset of ECUs assigned to a different zone among the plurality of zones based on a hierarchy among the zone and the different zone, determining to perform a vehicle maneuver with respect to a side of the vehicle, and performing the vehicle maneuver with a subset of ECUs assigned to the side of the ECU while isolating operation of a different subset of ECUs assigned to a different side of the vehicle from the vehicle maneuver, performing the operation via execution of the subset of ECUs included in the zone, and reducing activity of one or more other subsets of ECUs assigned to one or more other zones from among the plurality of zones while performing the operation to reduce power consumed by the one or more other zones, performing the operation via execution of the subset of ECUs included in the zone, and capturing sensor data from one or more other subsets of ECUs assigned to one or more other zones from among the plurality of zones while performing the operation via the subset of ECUs included in the zone, and training an artificial intelligence (AI) model based on execution of the AI model on the pooled data stored in the storage device and storing the trained AI model within the storage device.

Data associated with any of these steps/features, as well as any other features or functionality described or depicted herein, the AI/ML production system 330, as well as one or more of the other elements depicted in FIG. 3C may be used to process this data in a pre-transformation and/or post-transformation process. Data related to this process can be used by the vehicle node 310. In one embodiment, data related to this process may be used with a charging station/charging point, a server, a wireless device, and/or any of the processors described or depicted herein.

Figure 3D:
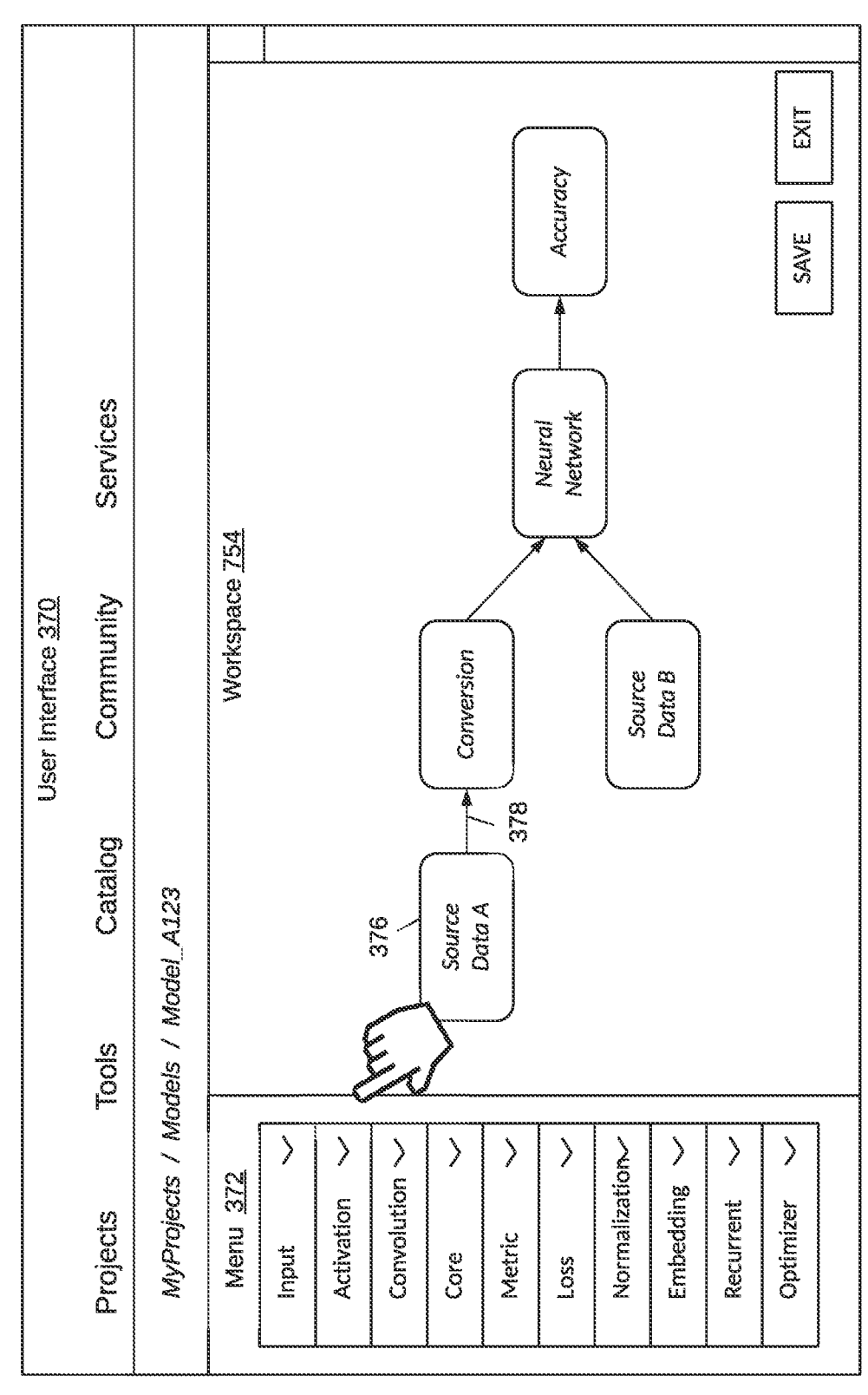
FIG. 3D illustrates a machine learning network diagram, according to example embodiments.

FIG. 3D illustrates a process 300D of designing a new machine learning model via a user interface 370 of the system according to example embodiments. As an example, a model may be output as part of the AI/ML Development System 340. Referring to FIG. 3D, a user can use an input mechanism from a menu 372 of a user interface 370 to add pieces/components to a model being developed within a workspace 374 of the user interface 370.

The menu 372 includes a plurality of graphical user interface (GUI) menu options which can be selected to reveal additional components that can be added to the model design shown in the workspace 374. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other means to create a flow within the workspace 374. For example, the user may add a node 376 to a flow of a new model within the workspace 374. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace 374 on the user device. A pop-up within the browser or the workspace 374 can be overlayed where the object is visible, which includes an option to navigate to the identified web page corresponding to the alternative object via a rule set.

Figure 3E:
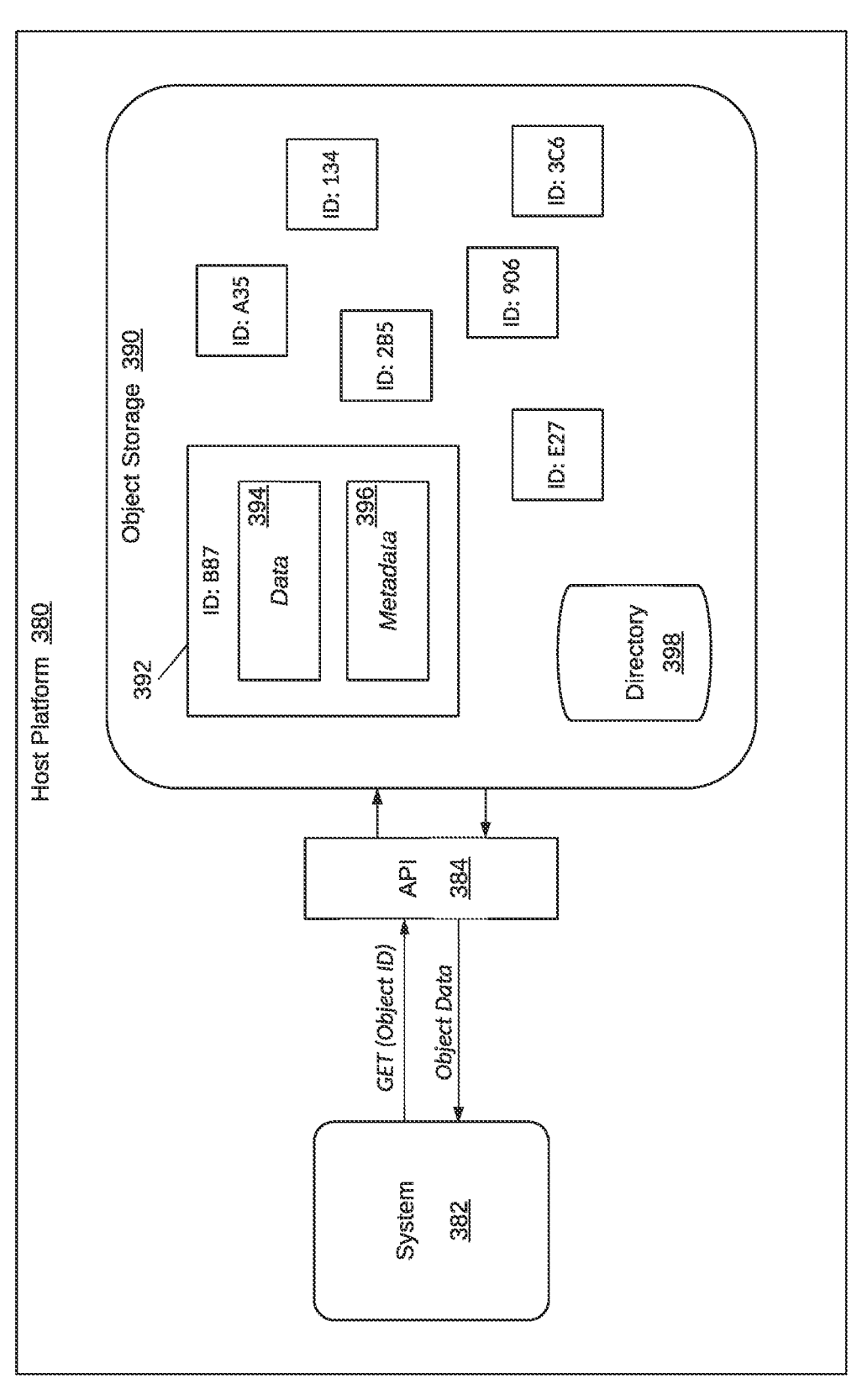
FIG. 3E illustrates a machine learning network diagram, according to example embodiments.

FIG. 3E illustrates a process 300E of accessing an object 392 from an object storage 390 of the host platform 380 according to example embodiments. For example, the object storage 390 may store data that is used by the AI models and machine learning (ML) models, training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application to query an object's metadata to locate the desired object (data) via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation above a predetermined threshold.

Figure 4A:
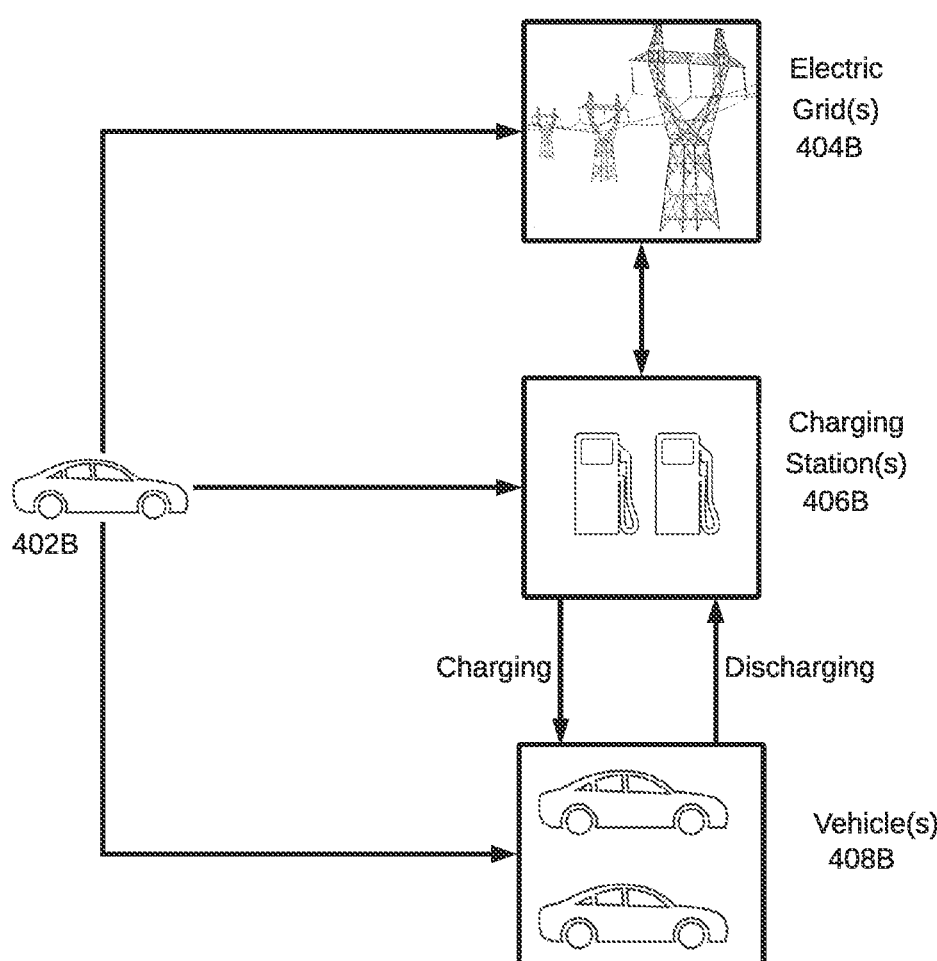
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via V2V technology, communication over cellular, Wi-Fi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/408B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can transfer energy from the vehicle to the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charging station 406B. The energy stored in the vehicle's batteries may be sent in an opposite direction back to the grid. The energy is converted from DC to AC through a converter usually located in the charging station 406B, otherwise referred to as a bidirectional charger. Further, the instant solution as described and depicted with respect to FIG. 4B can be utilized in this and other networks and/or systems.

Figure 4B:
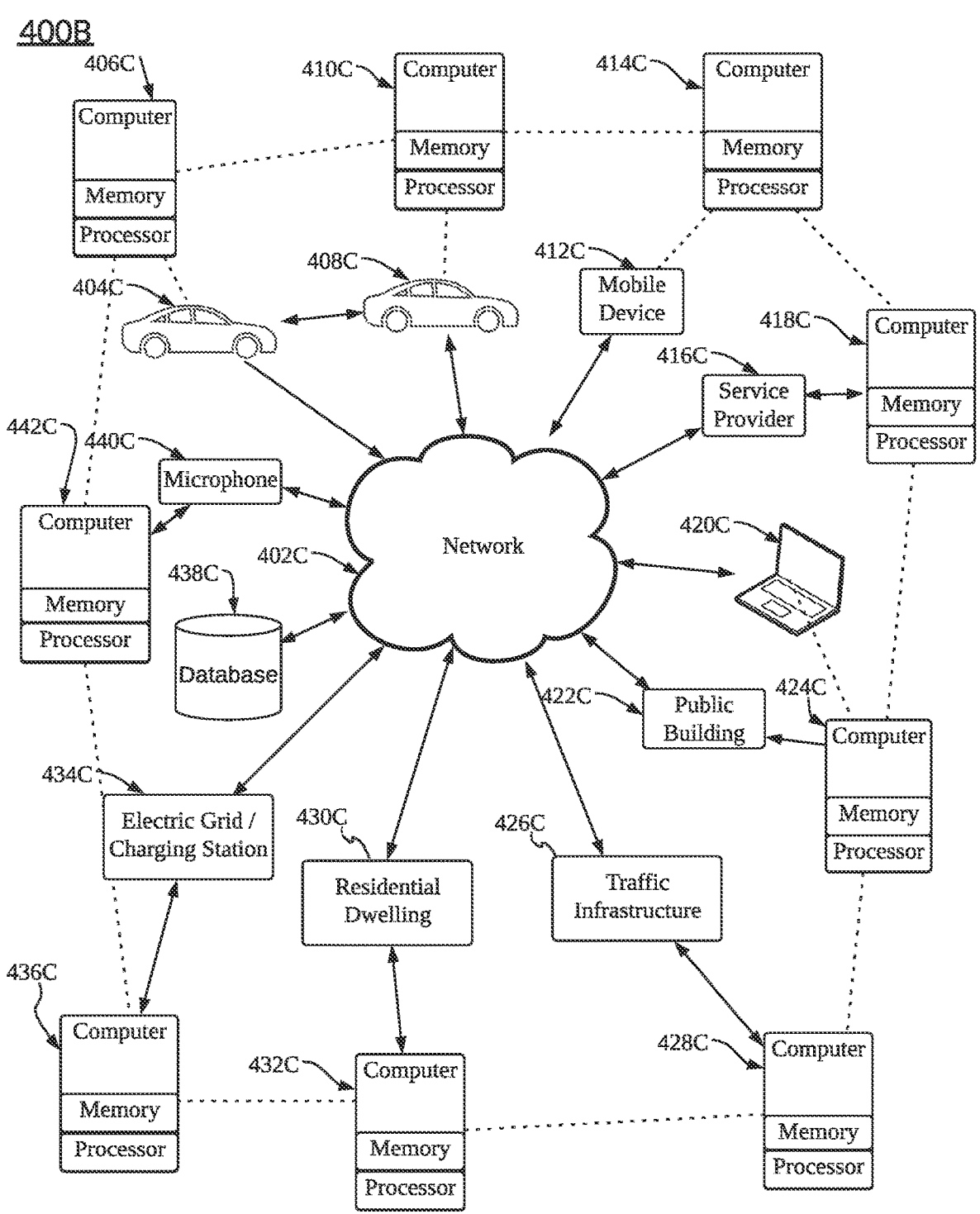
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C and 410C associated with various entities, all communicably coupled and in communication with a network 402C. A database 438C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, and 410C. The one or more public buildings 422C may include various agencies. The one or more public buildings 422C may utilize a computing device 424C. The one or more service provider 416C may include a dealership, a tow truck service, a collision center, or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
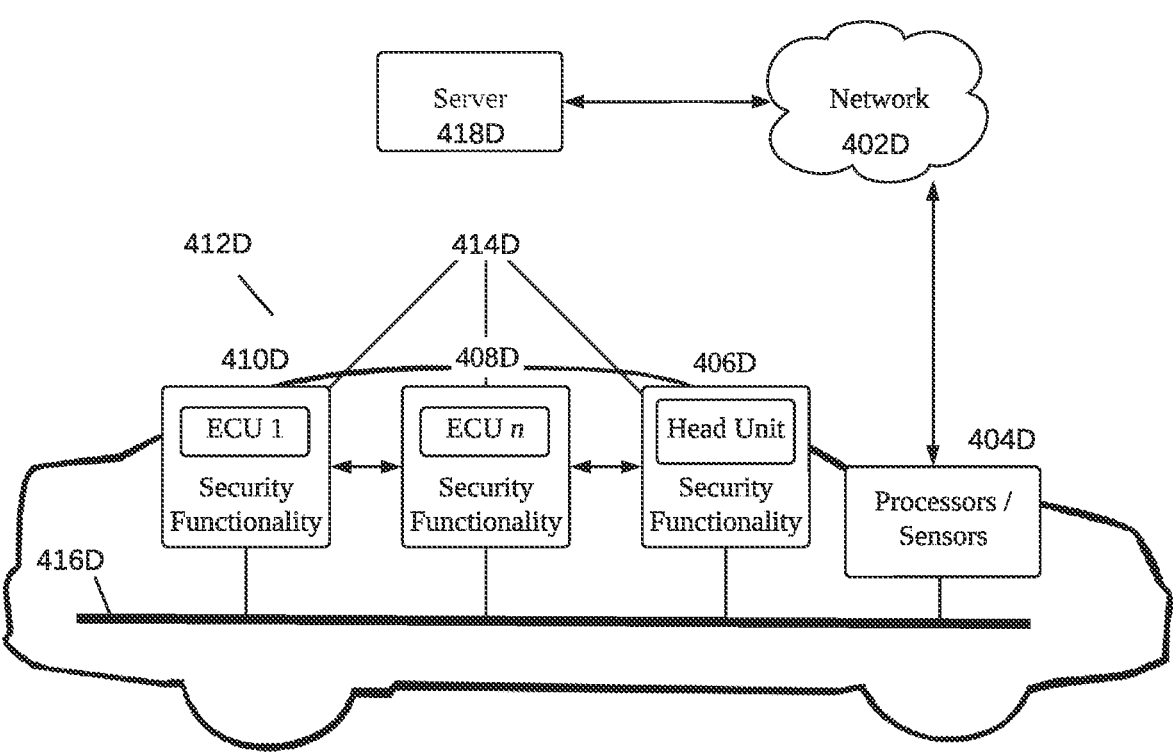
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An ECU is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's CAN Bus. When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
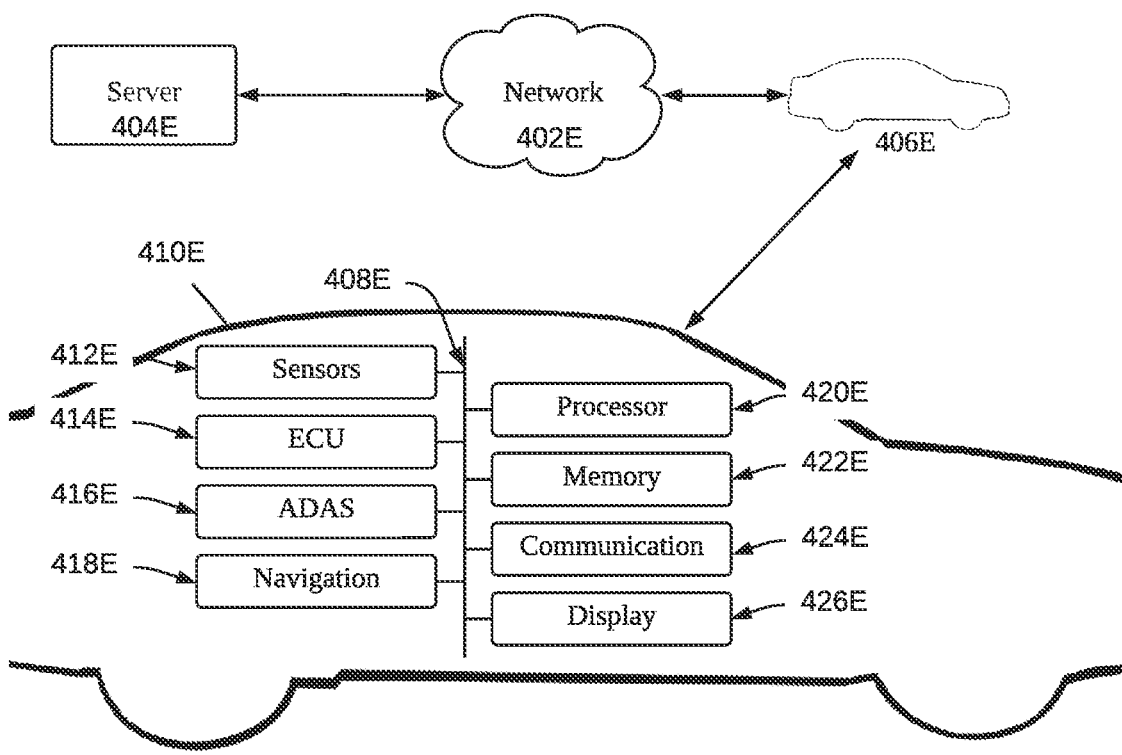
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a CAN bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422E may be reserved for use as a buffer or virtual random-access memory (virtual RAM).

The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Light Detection and Ranging (Lidar) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418E may store the sensor data in the memory 422E.

The communication unit 424E transmits and receives data to and from the network 402E or to another communication channel. In some embodiments, the communication unit 424E may include a dedicated short-range communication (DSRC) transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

ECUs are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as ADAS, sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of ECUs, which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
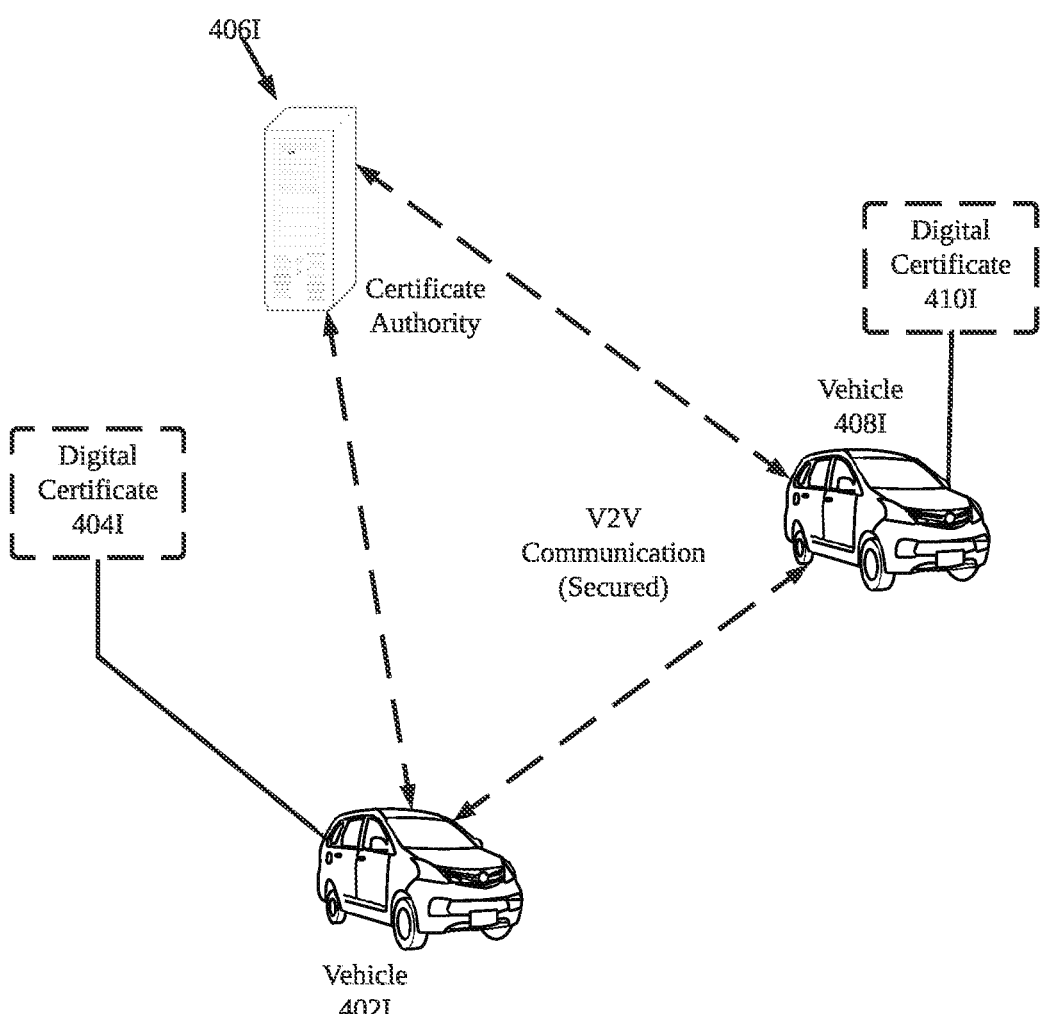
FIG. 4E illustrates yet a further diagram depicting an example of vehicles performing secured Vehicle-to-Vehicle (V2V) communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
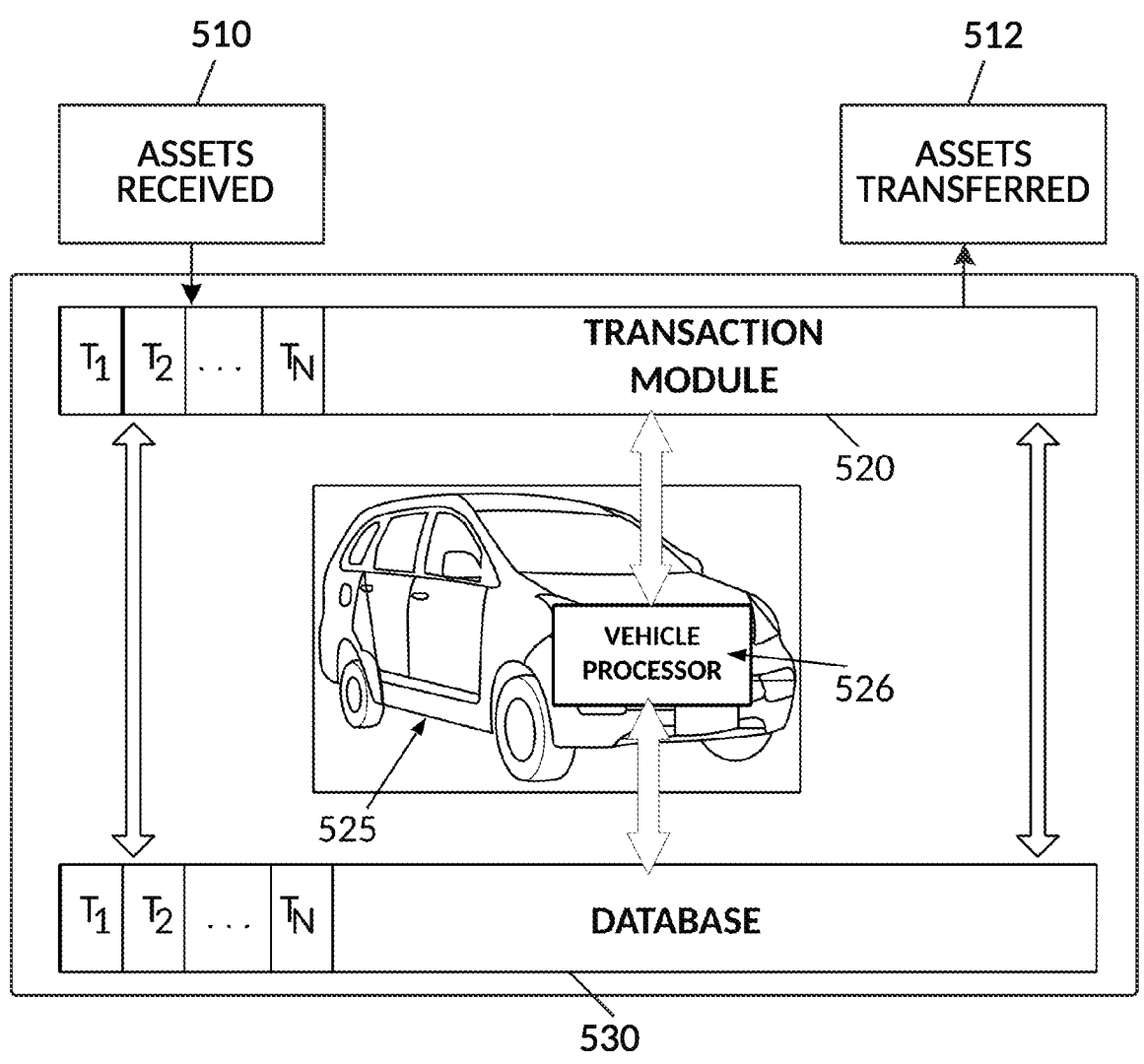
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in another vehicle and communication exists between the vehicle processor, a second database, the vehicle processor, and a transaction module. The another vehicle may then receive the information via a wireless communication request to perform the package pickup from the vehicle and/or from a server (not shown). The transactions are logged in the transaction modules and of both vehicles. The credits are transferred from the vehicle to the other vehicle and the record of the transferred service is logged in the first database, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
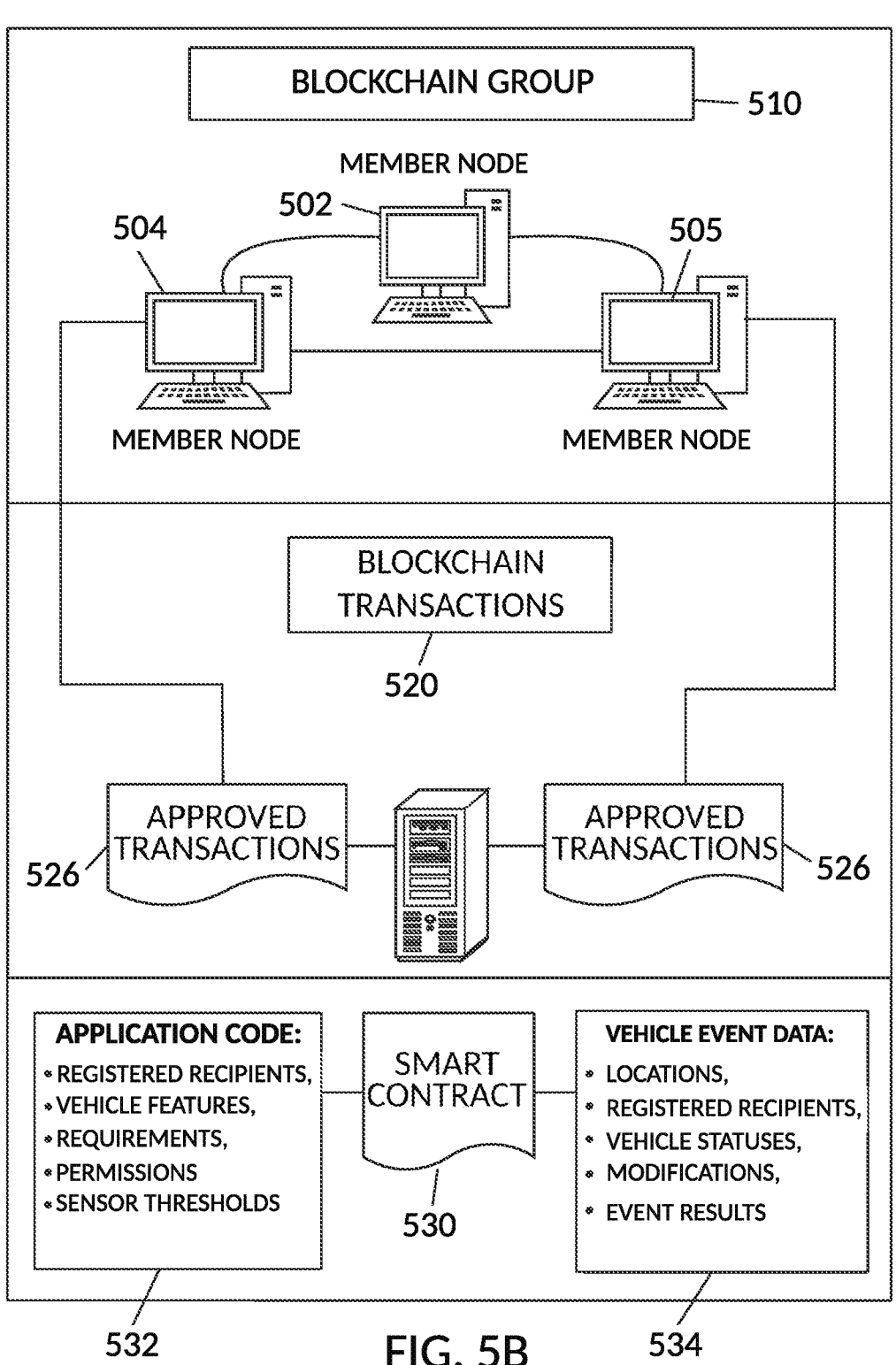
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-505 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
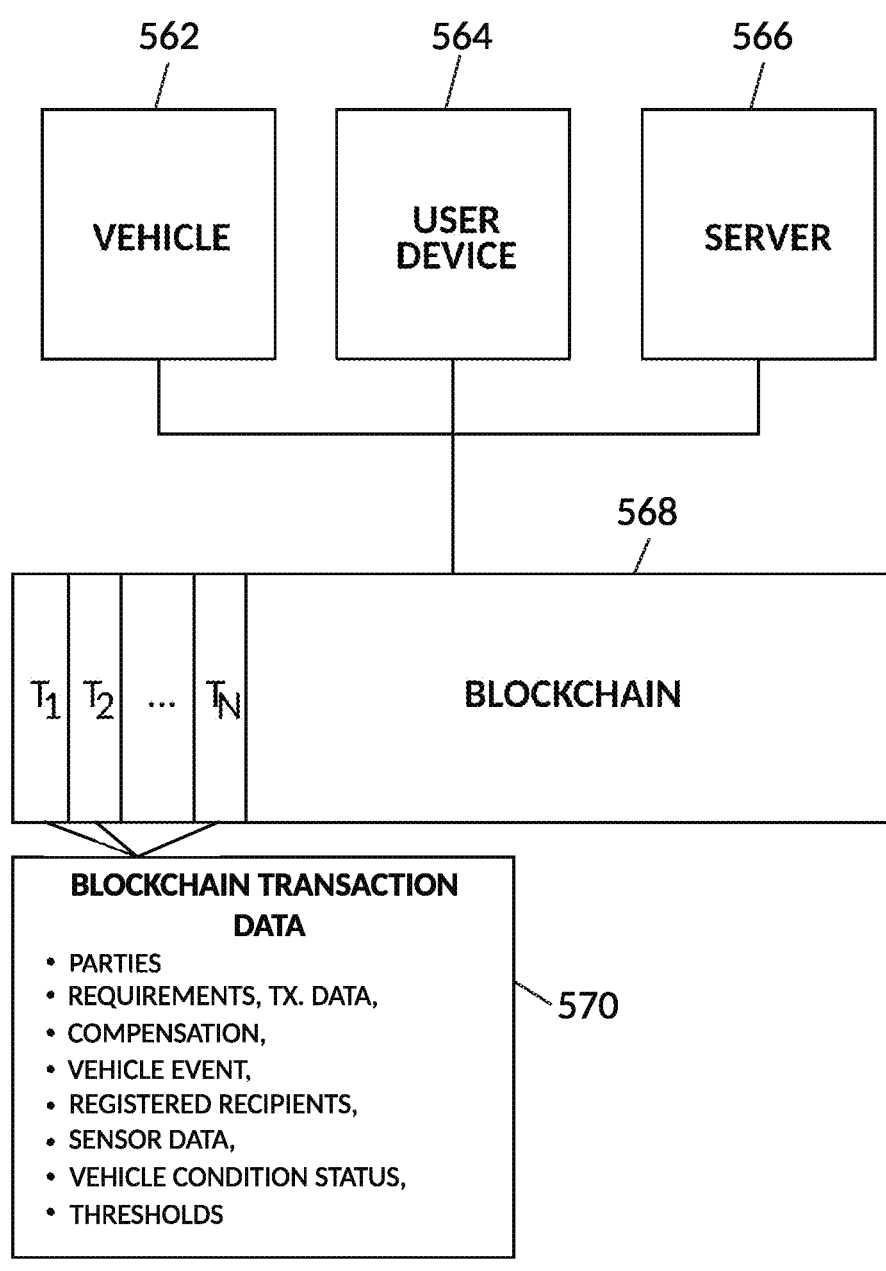
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
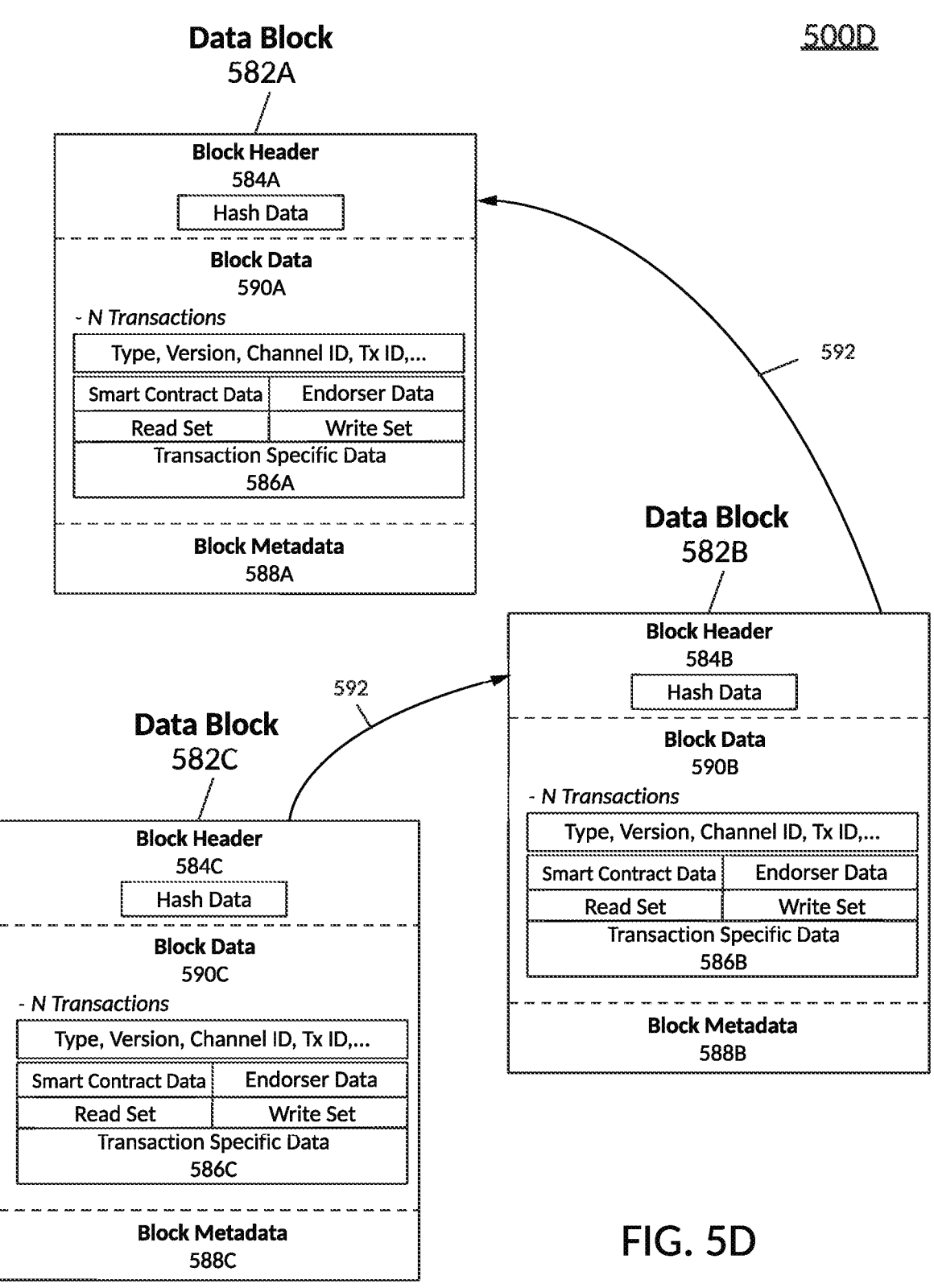
FIG. 5D illustrates an example data block interaction, according to example embodiments.

FIG. 5D illustrates blockchain blocks that can be added to a distributed ledger, according to example embodiments, and contents of block structures 582A to 582n. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the block-chain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' becomes a pluggable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584n, transaction-specific data 586A to 586n, and block metadata 588A to 588n. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590n. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582n in the blockchain also have headers, files, and values. However, unlike the first block 582A, each of the headers 584A to 584n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
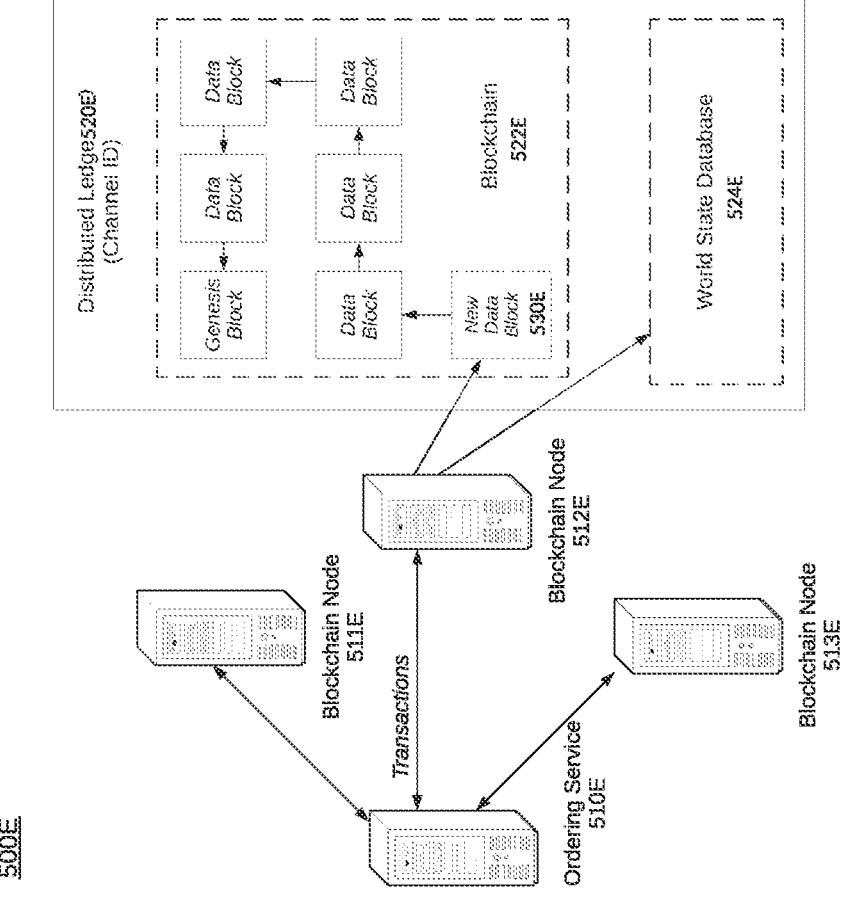
FIG. 5E illustrates a blockchain network diagram, according to example embodiments.

FIG. 5E illustrates a process 500E of a new block being added to a distributed ledger 520E, according to example embodiments, and FIG. 5D illustrates the contents of FIG. 5E's new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520E. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 520E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, and it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forwarded by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 522E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents shown in FIG. 5F, are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one embodiment of the instant solution, the block data 564 may include data comprising one or more of receiving a request from a display device associated with a vehicle, wherein the request comprises a request to view content on the display device, determining content consuming attributes of a user of the display device based on content that has been consumed by the display device, determining that a different user of a different vehicle has similar content consuming attributes as the user based on content that has been consumed by a display device associated with the different vehicle, and outputting a content-sharing session to the display device associated with the vehicle and the display device associate with the different vehicle.

Although in FIG. 5F the blockchain data 563 is depicted in the block data 550 but may also be located in the block header 540 or the block metadata 560. In some embodiments, the an identifier of the paused content, a timestamp associated with the content at the time of the pause, etc. may be written to the blockchain data 563 and committed to a blockchain ledger.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
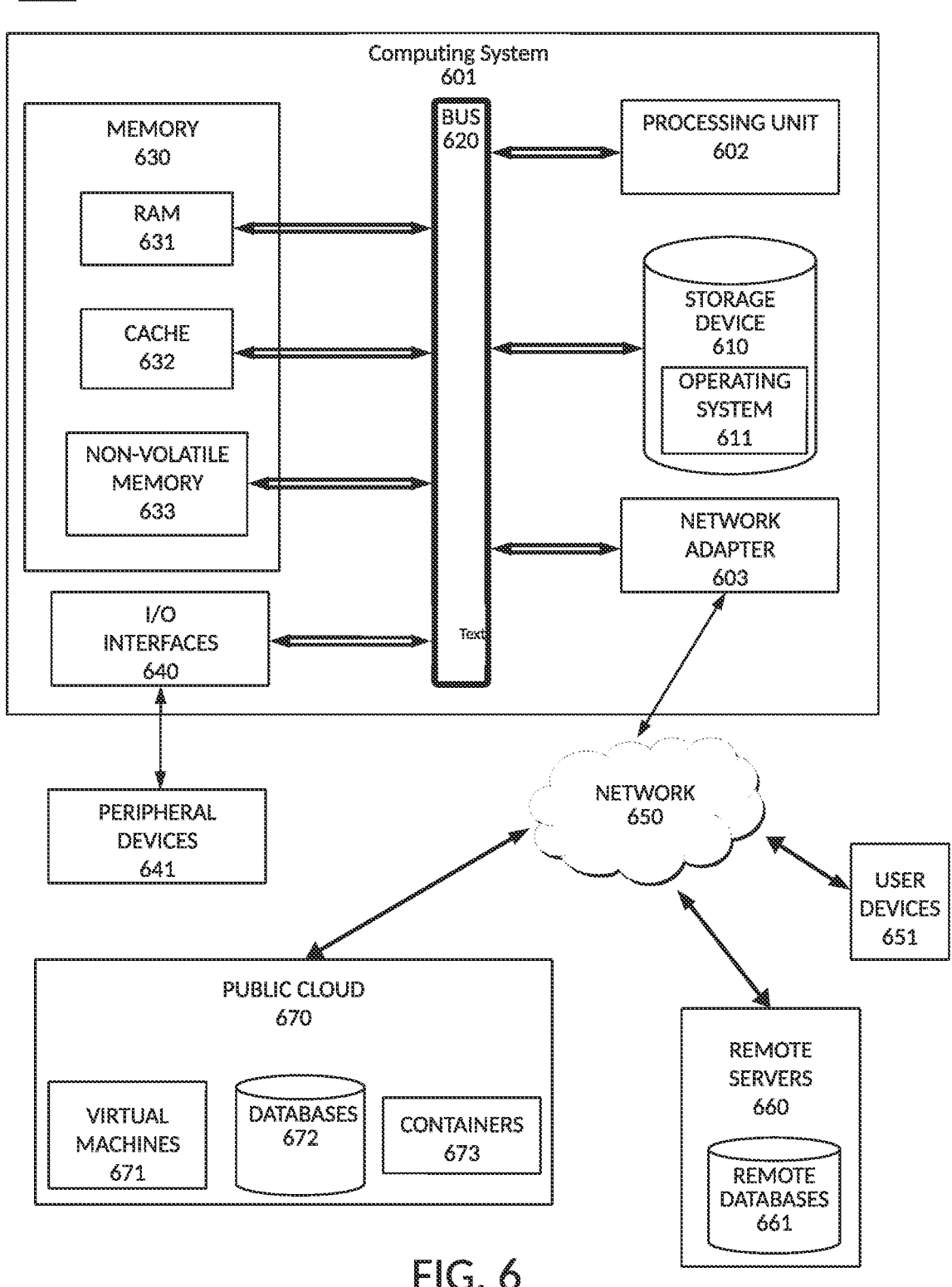
FIG. 6 illustrates an example system that supports one or more of the example embodiments.

FIG. 6 illustrates a computing environment according to example embodiments. FIG. 6 is not intended to suggest any limitation as to the scope of use or functionality of embodiments of the application described herein. Regardless, the computing environment 600 can be implemented to perform any of the functionalities described herein. In computer environment 600, computer system 601 is operational within numerous other general-purpose or special-purpose computing system environments or configurations.

Computer system 601 may take the form of a desktop computer, laptop computer, tablet computer, smartphone, smartwatch or other wearable computer, server computer system, thin client, thick client, network PC, minicomputer system, mainframe computer, quantum computer, and distributed cloud computing environment that include any of the described systems or devices, and the like or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computer system 601, to keep the presentation as simple as possible.

Computer system 601 may be located in a cloud, even though it is not shown in a cloud in FIG. 6. On the other hand, computer system 601 is not required to be in a cloud except to any extent as may be affirmatively indicated. Computer system 601 may be described in the general context of computer system-executable instructions, such as program modules, executed by a computer system 601. Generally, program modules may include routines, programs, objects, components, logic, data structures, and so on that perform tasks or implement certain abstract data types. As shown in FIG. 6, computer system 601 in computing environment 600 is shown in the form of a general-purpose computing device. The components of computer system 601 may include but are not limited to, one or more processors or processing units 602, a system memory 630, and a bus 620 that couples various system components, including system memory 630 to processor 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computer system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Computer system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In embodiments where computer system 601 is required to have a large amount of storage (for example, where computer system 601 locally stores and manages a large database), then this storage may be provided by peripheral storage devices 610 designed for storing very large amounts of data, such as a storage area network (SAN) that is shared by multiple, geographically distributed computers.

The operating system 611 is software that manages computer system 601 hardware resources and provides common services for computer programs. Operating system 611 may take several forms, such as various known proprietary operating systems or open-source Portable Operating System Interface type operating systems that employ a kernel.

The Bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnects (PCI) bus. The bus 620 is the signal conduction paths that allow the various components of computer system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated.

In computer system 601, memory 630 is in a single package and is internal to computer system 601, but alternatively or additionally, the volatile memory may be distributed over multiple packages and/or located externally with respect to computer system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computer system 601 may include cache 632, a specialized volatile memory generally faster than RAM 631 and generally located closer to the processing unit 602. Cache 632 stores frequently accessed data and instructions accessed by the processing unit 602 to speed up processing time. The computer system 601 may include non-volatile memory 633 in ROM, PROM, EEPROM, and flash memory. Non-volatile memory 633 often contains programming instructions for starting the computer, including the BIOS and information required to start the operating system 611.

Computer system 601 may also communicate with one or more peripheral devices 641 via an I/O interface 640. Such devices may include a keyboard, a pointing device, a display, etc.; one or more devices that enable a user to interact with computer system 601; and/or any devices (e.g., network card, modem, etc.) that enable computer system 601 to communicate with one or more other computing devices. Such communication can occur via input/output (I/O) interfaces 640. As depicted, IO interface 640 communicates with the other components of computer system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some embodiments, a network 650 may be replaced and/or supplemented by LANs designed to communicate data between devices located in a local area, such as a Wi-Fi network. The network 650 typically includes computer hardware such as copper transmission cables, optical transmission fibers, wireless transmission, routers, firewalls, switches, gateway computers, and edge servers. Computer system 601 connects to network 650 via network adapter 603 and bus 620.

User devices 651 are any computer systems used and controlled by an end user in connection with computer system 601. For example, in a hypothetical case where computer system 601 is designed to provide a recommendation to an end user, this recommendation may typically be communicated from network adapter 603 of computer system 601 through network 650 to a user device 651, allowing user device 651 to display, or otherwise present, the recommendation to an end user. User devices can be a wide array of devices, including PCs, laptops, tablet, hand-held, mobile phones, etc.

Remote Servers 660 are any computers that serve at least some data and/or functionality over a network 650, for example, WAN, a virtual private network (VPN), a private cloud, or via the Internet to computer system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions, such as Microsoft RDP (Remote Desktop Protocol) or Citrix ICA (Independent Computing Architecture). Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computer system 601 across a network 650.

A Public Cloud 670 is an on-demand availability of computer system resources, including data storage and computing power, without direct active management by the user. Public clouds 670 are often distributed, with data centers in multiple locations for availability and performance. Computing resources on public clouds (670) are shared across multiple tenants through virtual computing environments comprising virtual machines 671, databases 672, containers 673, and other resources. A Container 673 is an isolated, lightweight software for running an application on the host operating system 611. Containers 673 are built on top of the host operating system's kernel and contain only apps and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein.

Figure 7A:
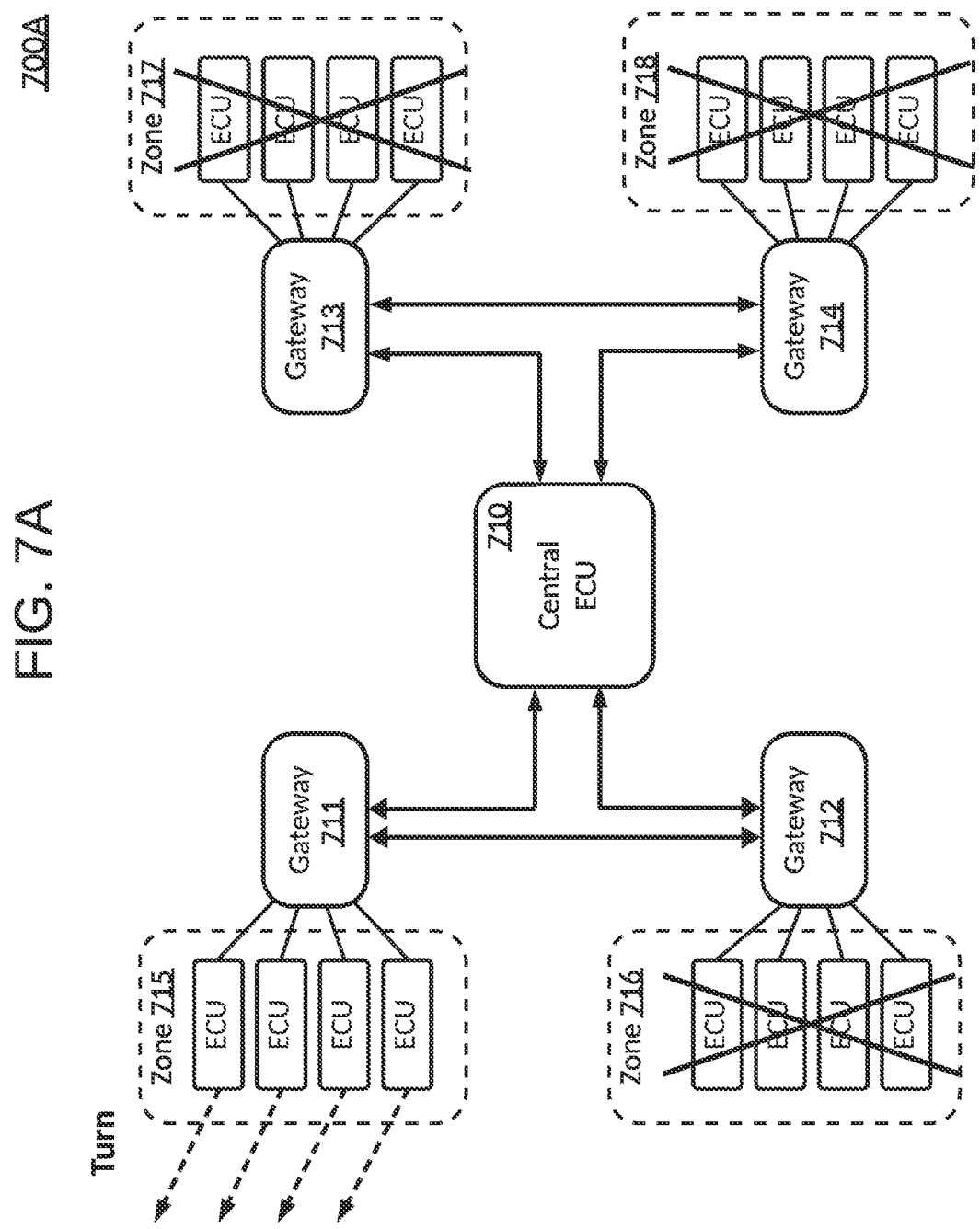
Figure 7B:
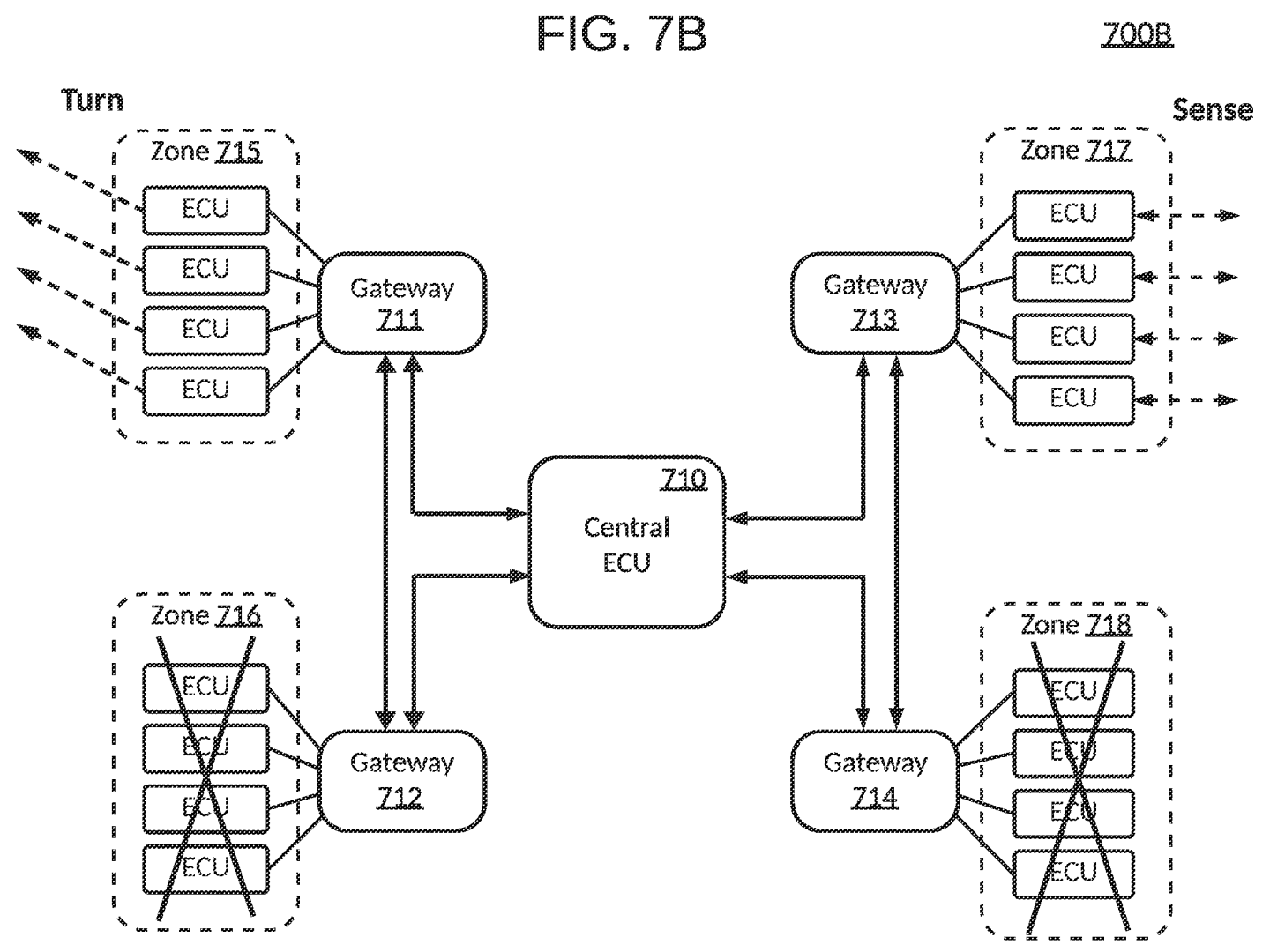
Figure 7C:
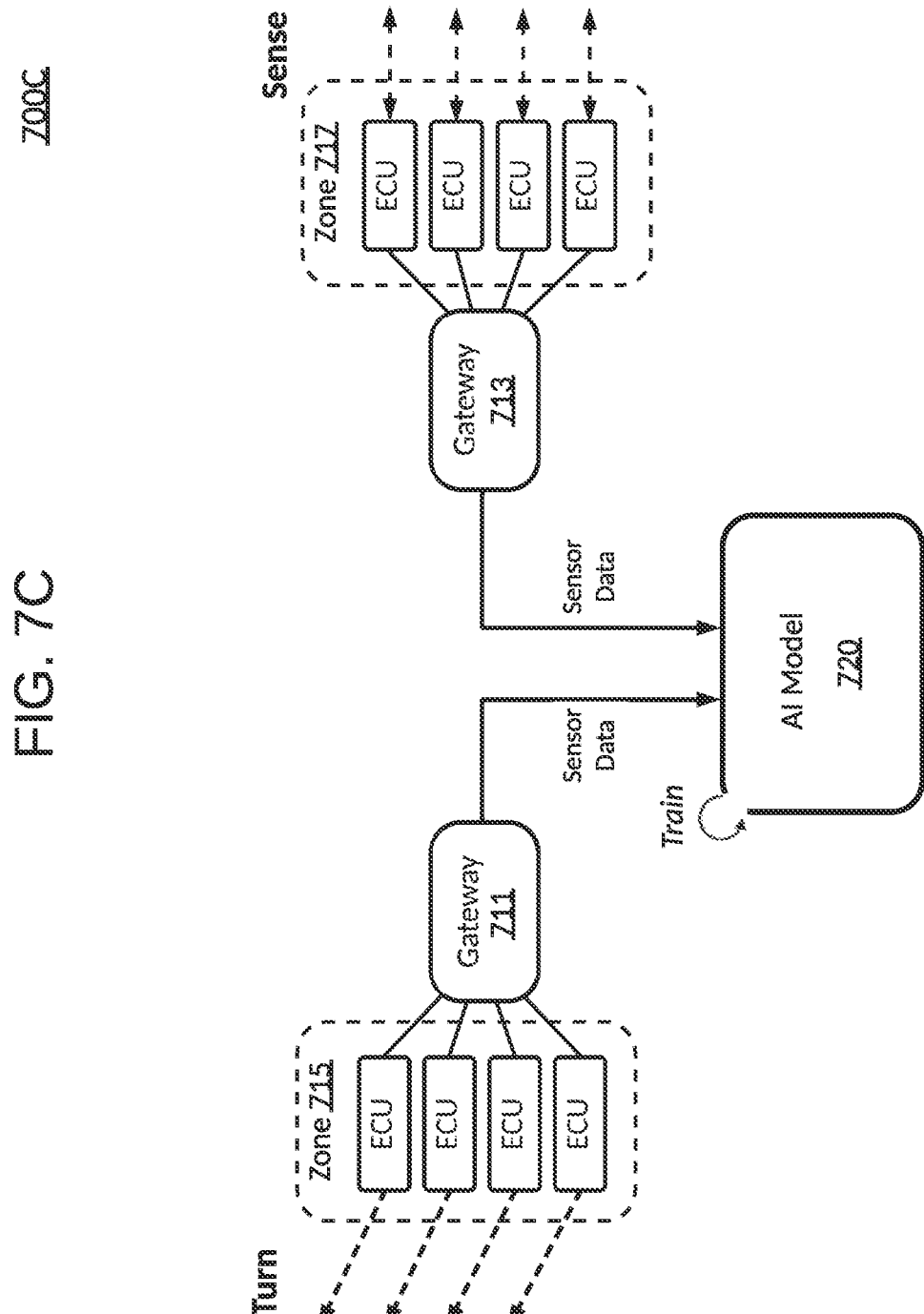

FIGS. 7A-7C illustrate processes performed by a zonal architecture within a vehicle to reduce power consumption and simply AI training according to example embodiments. Traditionally, automotive electronics have been organized into a centralized architecture, with a single group of electronic control unit (ECUs) handling all of the various functions and subsystems within the vehicle. This approach has several drawbacks, including a high degree of complexity, difficulty in diagnosing and repairing faults, and limited flexibility in adapting to changing requirements. Meanwhile, the example embodiments are directed to a zonal architecture that breaks up vehicle electronics into smaller, more manageable zones. Each zone has its own subset of ECUs, which are responsible for controlling a specific set of functions and subsystems (often related) within the vehicle. The zones are connected via a high-speed communication network (gateway nodes and a central ECU), allowing them to communicate and collaborate with each other as needed.

For example, FIG. 7A illustrates a process 700A of a zone 715 of a vehicle performing a turn maneuver in response to a control signal from a central ECU 710. Here, the zone 715 is assigned a subset of ECUs of the vehicle independently from other ECUs within the vehicle including a zone 716, a zone 717, and a zone 718. In this example, the subset of ECUs within the zone 715 communicate with the central ECU 710 via a gateway 711. Meanwhile, a subset of ECUs within the zone 716 communicate with the central ECU 710 via a gateway 712, a subset of ECUs within the zone 717 communicate with the central ECU 710 via a gateway 713, and a subset of ECUs within the zone 718 communicate with the central ECU 710 via a gateway 714.

According to various embodiments, by splitting the ECU architecture into zones, the central ECU 710 may reduce power consumed by the ECUs as a whole, when performing a maneuver such as a turn, an ignition, a braking operation, an acceleration operation, and the like. Here, the central ECU 710 may trigger the subsets of ECUs in the zone 716 to reduce power via a signal transmitted via the gateway 712. Likewise, the central ECU 710 may trigger the subset of ECUs in the zone 717 to reduce power via a signal transmitted via the gateway 713, and may trigger the subset of ECUs in the zone 718 to reduce power via a signal transmitted via the gateway 714.

It should also be appreciated that the subset of ECUs may communicate with one another to form a signal chain. For example, while performing the turn, the subset of ECUs within the zone 715 may capture sensor data, diagnostic data, etc. for other parts of the vehicle that are controlled by one of the other zones. Here, the data may be transferred from the subsets of ECUs within the zone 715 to the subset of ECUs in the zone 716 via a transmission from the gateway 711 to the gateway 712. Likewise, the data may be transferred from the subsets of ECUs within the zone 715 to the subset of ECUs in the zone 717 via a transmission from the gateway 711 to the gateway 713, and transferred from the subsets of ECUs within the zone 715 to the subset of ECUs in the zone 718 via a transmission from the gateway 711 to the gateway 714, thus creating a chain of communication among the ECUs based on the zonal architecture.

FIG. 7B illustrates a process 700B of performing a turning operation based on execution of the subset of ECUs in the zone 715 and simultaneously performing a sensing operation with the subset of ECUs in the zone 717. Here, the central ECU 710 may detect the turn maneuver and initiate the subset of ECUs within the zone 715 to perform the operation via a signal transmitted to the gateway 711. Furthermore, the central ECU 710 may also initiate the subset of ECUs within the zone 717 to sense data from an external environment of the vehicle such as sound, images, diagnostic data, road conditions, etc. Meanwhile, the subset of ECUs within the zone 716 and the subset of ECUs within the zone 718 may operate based on low power or no power based on signals transmitted from the central ECU 710 to the gateway 712 and the gateway 714.

In this example, the sensor data sensed by the subset of ECUs in the zone 717 may be used to analyze the performance of the vehicle during the turning operation performed by the subset of ECUs in the zone 715. The sensor data captured by the subset of ECUs in the zone 717 may be shared with the other subsets of ECUs in the other zones including the subset of ECUs in the zone 715, the subset of ECUs in the zone 716, and the subset of ECUs in the zone 718, based on signals transmitted from the gateway 713 to the gateways 711, 712, and 714, respectively.

FIG. 7C illustrates a process 700C of training an AI model 720 based on data acquired by different zones of the vehicle. Here, the AI model 720 may receive the diagnostic data, sensor data, etc. of the turning operation performed by the subset of ECUs in the zone 715. In addition, the AI model 720 may also receive any sensor data, diagnostic data, image data, etc. that is captured at the same time (temporally) as the turning operation data from the subset of ECUs in the zone 717. Thus, the AI model 720 can train on different types of sensor data captured at the same time by different subsets of ECUs. The different types of sensor data may temporally overlap due to the zonal architecture. As an example, the AI model 720 may be trained to perform an autonomous driving function, a remote driving function, a predictive function, and the like, based on the collaborative sensor data.

Figure 8B:
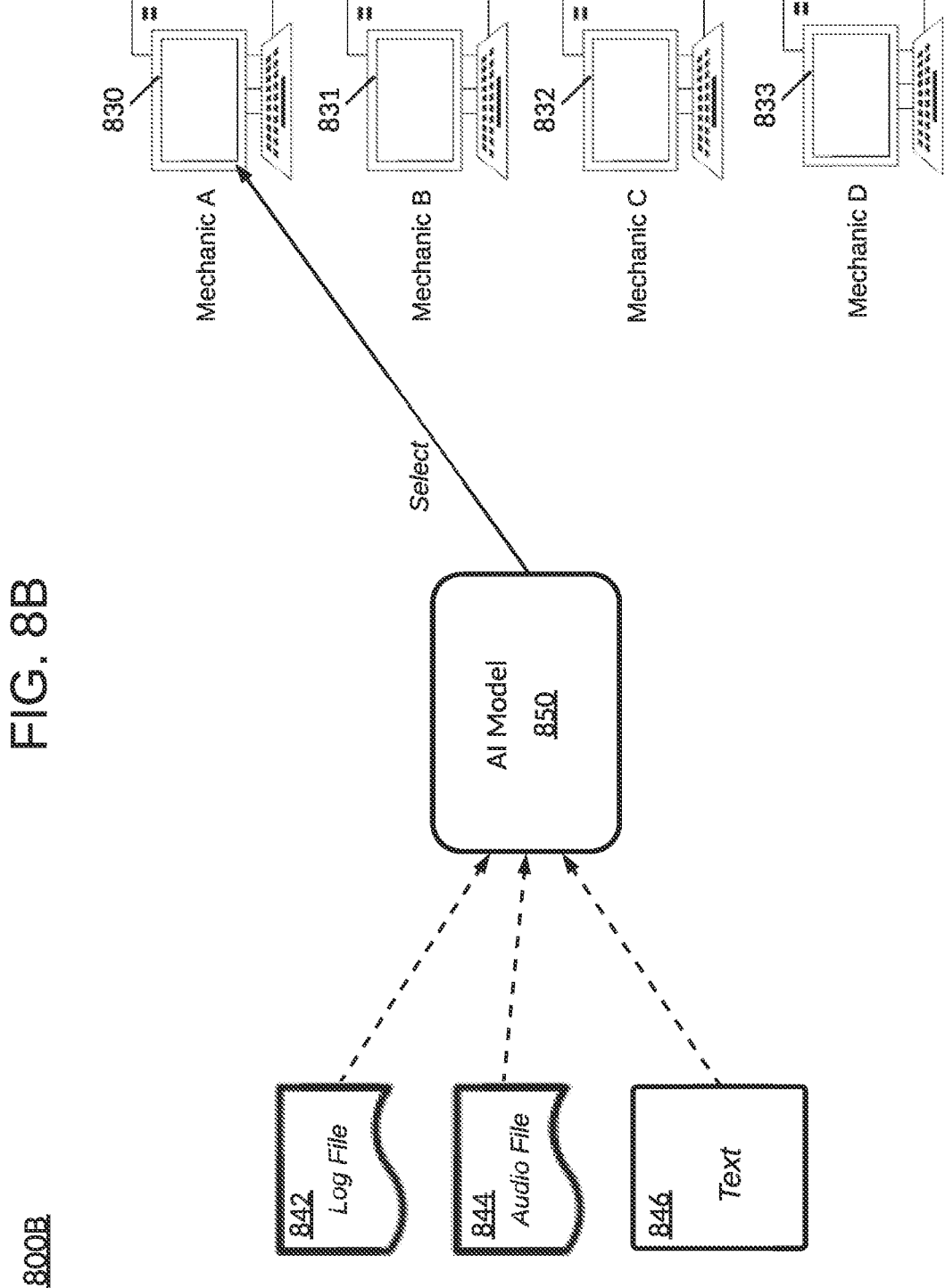

FIGS. 8A-8B illustrate processes that enable a remote mechanic to provide repair instructions to a vehicle. For example, FIG. 8A illustrates a process 800A of a vehicle 810 receiving repair instructions 832 from a mechanic at a remote terminal 830 according to example embodiments. According to various embodiments, the vehicle 810 may include one or more sensors 812 configured to capture one or more of audio, video, diagnostic data, and the like, of an issue that is occurring with the vehicle 810, such as an issue with a subsystem 814. Here, the issue may be detectable by sight and imagery can be acquired. As another example, the issue may be "heard" and a microphone can record audio of the noise coming from the subsystem 814. Also, diagnostic data may be captured from the subsystem 814, such as log data, etc.

According to various embodiments, a computer within the vehicle 810 may host a web browser, mobile application, or the like, which can access the Internet and post content to an online forum 820 which is hosted by an external server, cloud platform, or the like. Here, the computer may generate files such as audio files, image files, data files, log files, and the like, which include the sensor data, diagnostic data, etc. captured of the issue with the subsystem 814. In this example, the computer generates an audio file 824 with an audio recording of the issue. The audio file 824 may include a recording that is captured for a predetermined amount of time such as 2 minutes, 3 minutes, etc. by a microphone or other audio sensor such as the sensor 812. In addition, the vehicle also retrieves a log file 826 from the subsystem 814 and posts audio file 824 and the log file 826 via a post 822 on the online forum. In addition to the audio file 824 and the log data 826, the post 822 may also include identifying information about the vehicle 810 such as a make, a model, a VIN number, a number of miles, a type of transmission, and the like.

Here, a remote mechanic may access the online forum 820 via a remote terminal 830. The mechanic may use the remote terminal 830 to listen to the audio file 824/play the audio file 824, and also read over the log file 826. In response, the remote mechanic may use the remote terminal 830 to post a response 832 to the post 822 with repair instructions or other instructions for the driver of the vehicle 810. In this case, the repair instructions may indicate whether the issue with the vehicle 810 is urgent or not, whether it requires service or not, a description of the issue, a description of how to repair the issue, and the like. In response, the computer of the vehicle 810 may display the repair instructions on a user interface within the vehicle 810. For example, the computer within the vehicle 810 may detect the repair instructions and display the repair instructions via a center console of the vehicle 810. Thus, a driver of the vehicle 810 can receive immediate assistance from a remote technician with regard to an issue on the vehicle 810 while the vehicle is travelling, without having to take the vehicle 810 to a service center or take the vehicle 810 off the road.

FIG. 8B illustrates a process 800B of an AI model 850 being used to select a remote technician for handling an issue based on one or more of a log file 842 of the issue, an audio file 844 with a recording of the issue (sounds created by the issue), and a text file 846 with text input by a user which describes the issue. Here, the AI model 850 may also ingest the qualifications of a number of mechanics and use the input data to identify a most relevant mechanic for such an issue. The AI model 850 may select the mechanic associated with the remote terminal 830.

As another example, the online forum 820 may be a publicly available website with many different mechanics allowed to access and post responses. In this case, users of the online forum 820 may vote on the responses/repair instructions causing the instructions to be ranked up or down. This enables the driver of the vehicle to view the most recommended repair instruction.

Figure 9A:
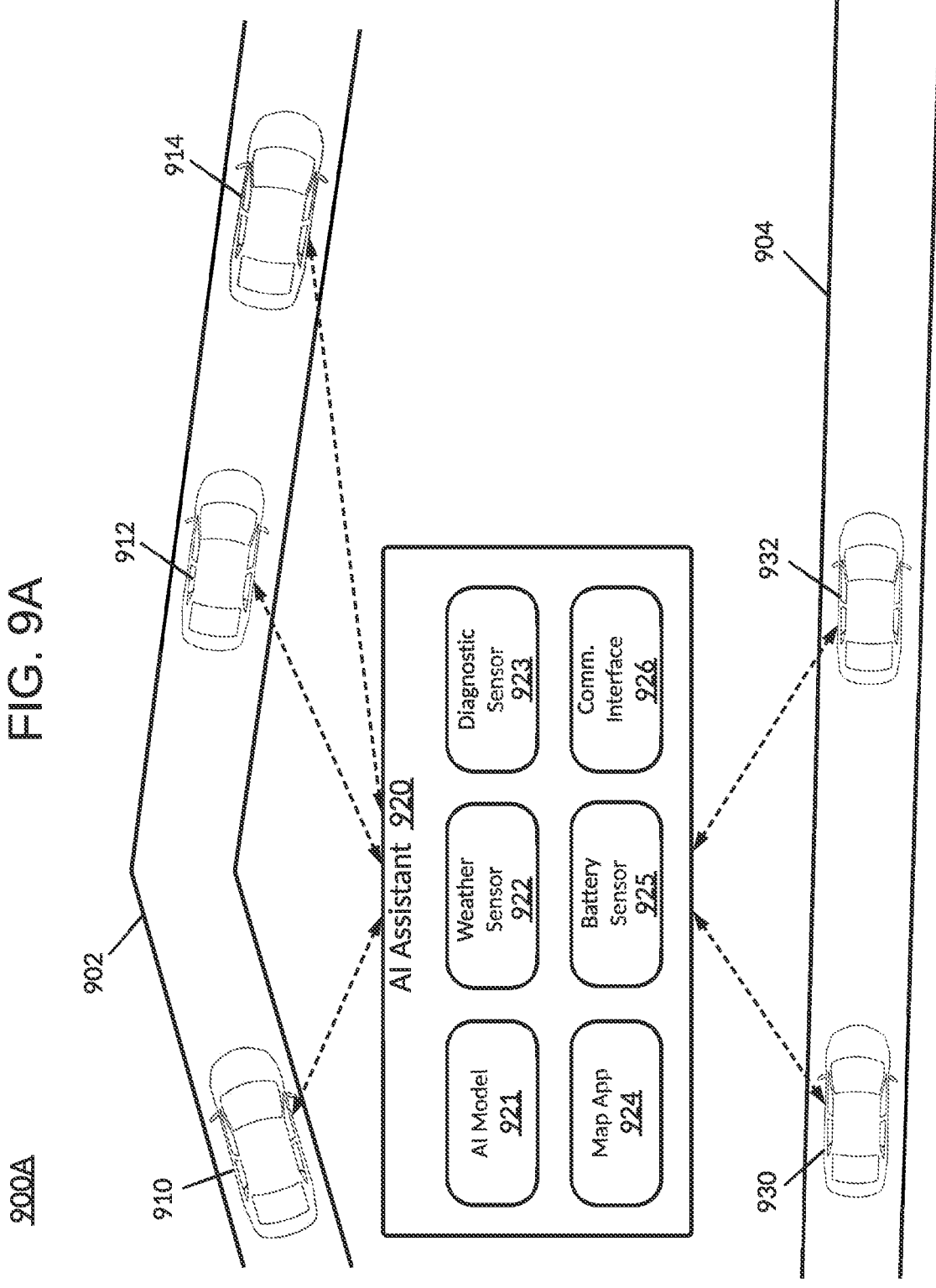
Figure 9C:
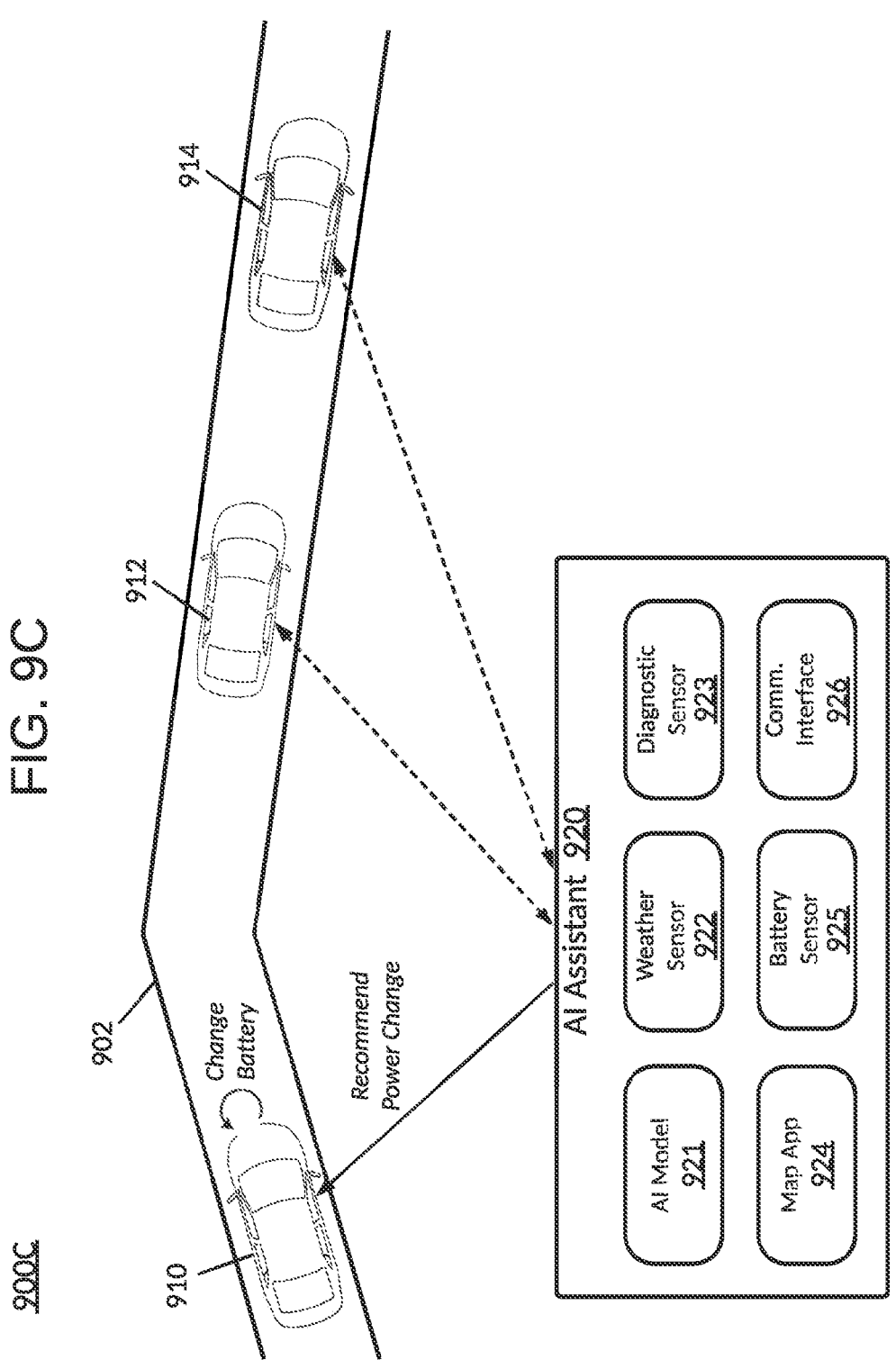

FIGS. 9A-9C illustrate processes of an AI assistant making recommendations to a vehicle based on an environment of the vehicle according to example embodiments. For example, FIG. 9A illustrates a process 900A of an AI assistant 920 collecting sensor data from a plurality of vehicles travelling on different travel routes. In this example, the AI assistant 920 may be integrated into a navigation system or other software tool of the vehicles. The AI assistant may also connect to a server (not shown) and to other vehicles to share sensor data with the other vehicles. In this example, the AI assistant 920 is integrated into a vehicle 910 that is travelling along a route 902. Here, a vehicle 912 and a vehicle 914 are also travelling along the route 902. The AI assistant 920 may connect to the vehicle and the vehicle 914 via V2V communications and share sensor data with the vehicles. For example, the vehicle 912 and the vehicle 914 may provide sensor data from a portion of the route 902 that is up ahead of a current location of the vehicle 910. In addition, the AI assistant 920 may collect sensor data from a vehicle 930 and a vehicle 932 travelling on an alternate route 904 with respect to the route 902.

The AI assistant 920 may include an AI model 921, a weather sensor 922, a diagnostic sensor 923, a mapping application 924, a battery sensor, and a communication interface 926. In this example, the weather sensor 922 may sense environmental data from around the vehicle 910 including temperature, pressure, humidity, precipitation, road conditions, and the like. The weather sensor 922 may refer to multiple sensors that sense for these different attributes in the environment. The diagnostic sensor 923 may capture diagnostic data of one or more subsystems within the vehicle 910 such as an engine, a transmission, a braking system, tires, suspension, and the like.

The mapping application 924 may maintain GPS coordinates of the vehicle 910 in real-time, traffic data of the route 902, and the like. The mapping application 924 may also maintain previous trip information (e.g., GPS coordinates, mobility data, timing data, battery usage data, etc.) of the vehicle 910 including previous occurrences of the vehicle 910 travelling the route 902 and/or the alternate route 904. The battery sensor 925 may sense a power consumption ratio of a battery installed within the vehicle 910, a temperature of the battery, and the like. The communication interface 926 may connect to any of the other vehicles and share/receive sensor data captured by the other vehicles about the other vehicle and the environment of the other vehicles including weather data, road conditions, GPS data, diagnostic data, battery usage data, and the like.

According to various embodiments, the AI model 921 may make recommendations to the vehicle 910 to improve some aspect of the vehicle such as to prolong a life of one or more subsystems of the vehicle 910, based on the collected sensor data. The sensor data may be converted into vector form or other numerical form before being executed by the AI model 921 to ensure that the sensor data can be processed using a computer processor.

FIG. 9B illustrates a process 900B of the AI model 921 of the AI assistant 920 making a recommendation (custom instruction) for the vehicle 910 based on the sensor data and the diagnostic data from the vehicle 910 traveling along the route 902 and the other vehicles including the vehicle 912 and the vehicle 914 that are farther up ahead on the route 902. In some embodiments, the AI model 921 may also make a recommendation for the vehicle 910 based on data from vehicles travelling along other routes including the vehicle 930 and the vehicle 932 travelling along the alternate route 904.

According to various embodiments, the AI model 921 may make a recommendation to the vehicle 910 which will preserve the life of the vehicle 910 in some way such as preventing damage to the vehicle over time from rough road conditions, weather, traffic, etc. As another example, the recommendation made by the AI model 921 may preserve battery life of the vehicle 910. As another example, the recommendation made by the AI model 921 may reduce the wear and tear on the vehicle over time. The decision made by the AI model 921 may be displayed on a user interface within a display device within the vehicle 910. For example, the AI model 921 may determine that the alternate route 904 may prolong the life of one or more of a suspension of the vehicle 910, joints, rubber seals, and the like. As another example, the AI model 921 may determine that the alternate route 904 may preserve an engine, a battery, brakes, a transmission, or the like, of the vehicle 910.

In the example of FIG. 9B, the AI model 921 makes a recommendation to the vehicle 910 to travel the alternate route 904 instead of the route 902, to reduce the wear and tear (and prolong the life of) on one or more subsystems of the vehicle 910 over time. This decision may be based on the road conditions, the traffic, the battery usage, the debris, etc. caused by the route 902 to the vehicle 910 in comparison to the same attributes cause by the alternate route 904 to other vehicles, etc. The alternate route may be displayed within a navigation system console of the vehicle 910, via a mobile device of an occupant of the vehicle 910, or the like.

FIG. 9C illustrates a process 900C of the AI Model 921 recommending a change in the battery usage of the vehicle 910. For example, the AI model 921 may recommend a different use of energy with a hybrid battery such as a different amount of use of gasoline versus electric. This recommendation may be made to preserve the life of the hybrid battery. Here, the AI model 921 can determine an appropriate balance between gas and electric to prolong the life of the hybrid battery over a long period of time. The recommendation may be transmitted from the AI assistant 920 (e.g., via the communication interface 926) to a display console inside the vehicle 910 where it is displayed. As another example, the AI assistant 920 may automatically/remotely command the vehicle 910 to change the battery power consumption without a need for human involvement. In this case, the AI assistant 920 may transmit a remote command which triggers the battery within the vehicle 910 to consume oil and electricity differently.

FIG. 10A a process 1000A of training an AI model 1010 to generate augmented reality images according to example embodiments. Referring to FIG. 10A, the AI model 1010 may be a generative AI model such as a large language model (LLM), a multi-modal LLM, a transformative neural network, or the like, which is capable of creating custom images of a road such as a road 1020 based on image data captured by vehicles that travel along the road 1020. Here, the AI model 1010 receives image data from a vehicle 1021, a vehicle 1022, a vehicle 1023, and a vehicle 1024. The image data includes images of lane lines (traffic lanes), road signs, objects in and around the road 1020, trees, GPS coordinates of the location of the vehicles when capturing the images, and the like. The image data may be captured of the road 1020 when the conditions of the road are clean/good such as when the weather is nice and sunny, daytime, no debris, etc.

In addition, the AI model 1010 may receive augmented reality images from one or more sources such as a data store 1012 which may be a public data source such as a website, host database, or the like, which is accessible via the Internet, or the like. The augmented reality images may be generic images or stock images of other roads or structures. Based on the images of the road 1020 and the augmented reality images from the data store 1012, the AI model 1010 may be trained to generate augmented reality images of the road 1020. Here, the training process may cause the AI model 1010 to understand a correlation between the features of the road 1020 and augmented reality imagery. While the process is performed with respect to the road 1020 in this example, it should be appreciated that the same training process may be performed for many different roads.

Figure 10B:
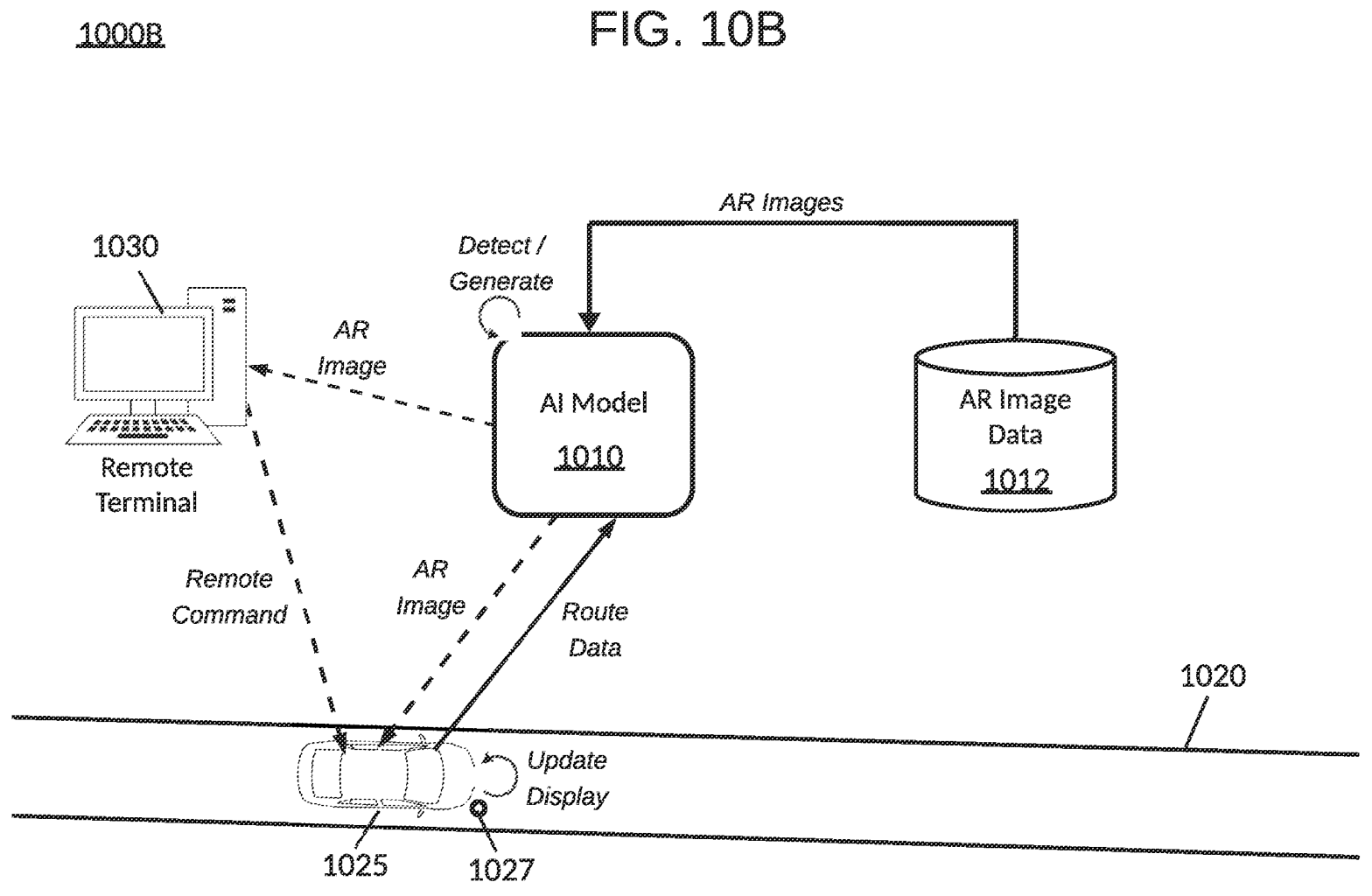

FIG. 10B illustrates a process 1000B of outputting an augmented reality (AR) view of a road currently being travelled by a vehicle to a display associated with vehicle according to example embodiments. Here, a vehicle 1025 may be travelling along the road 1020 and may be in poor driving conditions such as bad weather, fog, darkness, smoke, traffic, or the like, which is causing the driver of the vehicle 1025 to lack a full understanding of the road location. According to various embodiments, the vehicle 1025 may receive an input on a display console thereof such as an infotainment system, a navigation system, or the like, and in response, generate an AR view of the road in front of the vehicle 1025 based on a current location 1027 of the vehicle on the road 1020. For example, the vehicle 1025 may activate the AI model 1010 in response to the input on the console. As another example, the vehicle 1025 may automatically activate the AI model 1010 when visibility drops below a threshold. For example, if the sensors cannot identify a lane line, or cannot identify a lane line a predetermined threshold distance away (e.g., at least 100 feet away, etc.), the vehicle 1025 may automatically activate the AI model 1010.

Here, the AI model 1010 may receive a current location of the vehicle 1025, such as the GPS coordinates of the vehicle 1025, a direction the vehicle is travelling, etc., and generate an augmented reality (AR) image of the road in front of the vehicle 1025 based on the training, the GPS coordinates, the direction of travel, etc. The AR image of the road may include lane lines, objects in and around the road, potholes, street signs, streetlights, and the like. The AR image may be displayed on a display device associated with the vehicle 1025 such as a pair of goggles being worn by the driver, a dashboard within the vehicle 1025, a mobile application on a mobile device of an occupant of the vehicle, and the like.

In some embodiments, the AI model 1010 may also trigger a remote terminal 1030 to take control of the vehicle 1025 based on the sensor data. Here, the AI model 1010 may create an AR view of the road 1020 in front of the vehicle 1025 in the direction of travel and display the AR view on a display screen of the remote terminal 1030. The remote terminal 1030 may submit a command to the vehicle 1025 which triggers the vehicle to take an action such as to slow down, pull over to a shoulder, take an alternate route, or the like.

Figure 11A:
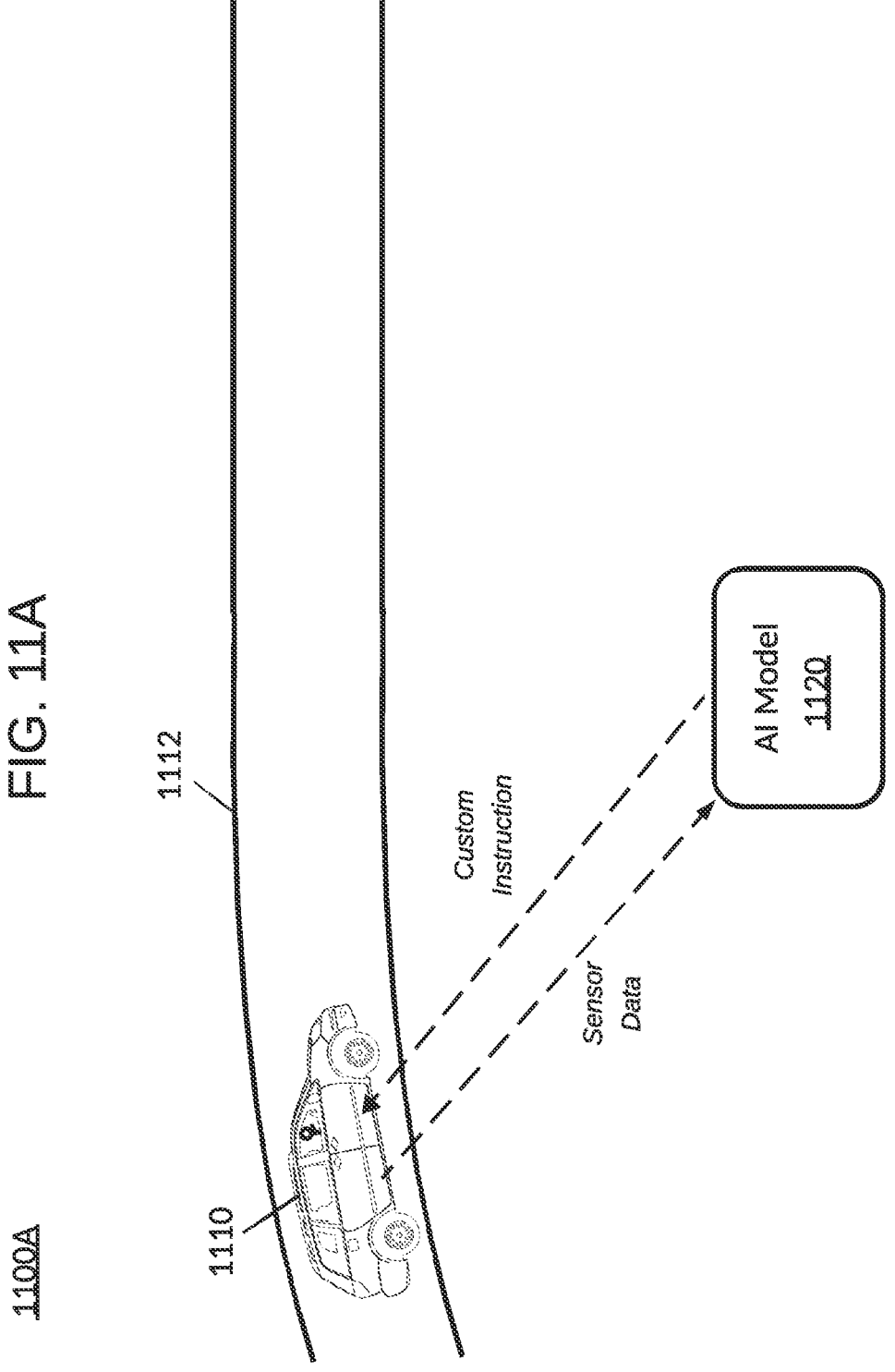

FIGS. 11A-11B illustrate a process of guarding a vehicle based on a driver condition according to example embodiments. For example, FIG. 11A illustrates a process of generating a custom instruction for a vehicle 1110 based on contextual attributes of the vehicle including a confidence of a driver of the vehicle 1110. For example, as described previously with respect to FIG. 1E, an AI model 1120 may collect data of a driver (not shown) of the vehicle 1110 via one or more sensors installed in the vehicle 1110. For example, the sensor data may include image data of the driver (e.g., a face, a posture position, a gaze direction with respect to the windshield, etc.). As another example, the sensor data may include seat pressure data, gas pedal data, brake pedal data, and the like. As another example, the sensor data may include audio data recorded from the interior of the vehicle 1110, and the like. As another example, the AI model 1120 may receive sensor data from the vehicle itself, such as from a sensor installed at or near a subsystem of the vehicle which can capture real-time driving behavior such as speed, acceleration, braking force, turning force, and the like. As another example, the AI model 1120 may receive sensor data from one or more external sensors which can provide sensed weather conditions including images of the road conditions, images of any debris in the road, images of fog, and the like.

According to various embodiments, the AI model 1120 may analyze the sensor data and determine a confidence of the driver of the vehicle 1110 with respect to current driving conditions on a road 1112 currently being travelled by the vehicle 1110. The confidence may be based on whether the driver is incapacitated, distracted, drowsy, or the like. As another example, the confidence may be based on the current conditions, the behavior of the vehicle as the driver drives the vehicle 1110 on the road 1112, and the like. Based on the confidence value, the AI model 1120 may generate a custom instruction for the driver, for example, "please slow down", "please roll down a window", "please turn off the radio", "please pull the vehicle over", "please shut the vehicle down," etc. The custom instructions may be displayed via a display system inside the vehicle 1110 such as a navigation system, an infotainment system, a mobile device of an occupant, or the like.

FIG. 11B illustrates a process 1100B of monitoring the vehicle 1110 to determine whether the custom instruction has been received and implemented according to example embodiments. Referring to FIG. 11B, the AI model 1120 may be part of a software application 1122 installed within the vehicle 1110 or an external server in communication with the vehicle 1110 which continues to monitor the vehicle 1110 after the custom instruction has been sent to the vehicle 1110. Here, the software application 1122 monitors the vehicle from a point 1114 of the road 1112 where the custom instructions was sent. In this example, the software application 1122 may enter into a guardian mode or "babysitting mode" to ensure that the driver follows the custom instruction.

The monitoring process may include receiving additional sensor data from the vehicle 1110 while the vehicle 1110 is travelling along the road 1112, and after the custom instruction has been sent to the vehicle 1110. If the software application 1112 detects that the driver has not followed the instruction, for example, based on the additional sensor data, the AI model software application 1122 may trigger a remote terminal 1130 to overtake control of the vehicle 1110. In this case, the software application 1122 may transmit an instruction which identifies the vehicle 1110, and the custom instruction. In response, the remote terminal 1130 may remotely control the vehicle 1110 to follow the custom instruction.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
dividing a vehicle into a plurality of zones based on operations performed by vehicle;
assigning a different subset of electronic control units (ECUs) from among a plurality of ECUs of the vehicle to each zone based on functions performed by the plurality of ECUs with respect to the plurality of zones;
determining an operation to perform for the vehicle;
identifying a zone from among the plurality of zones for controlling the operation;
pooling data input by and output by a subset of ECUs included in the zone during the operation and storing the pooled data in a storage device; and
transferring the pooled data from the subset of ECUs assigned to the zone to the different subset of ECUs assigned to a different zone among the plurality of zones based on a hierarchy among the zone and the different zone.

2. The method of claim 1, wherein the method further comprises capturing sensor data from one or more of an exterior of the vehicle and an interior of the vehicle, via the different subset of ECUs of the vehicle assigned to a different zone from among the plurality of zones, while simultaneously controlling the operation with the subset of ECUs assigned to the zone.

3. The method of claim 1, wherein the method further comprises determining to perform a vehicle maneuver with respect to a side of the vehicle, and performing the vehicle maneuver with the subset of ECUs assigned to the side of the vehicle while isolating operation of the different subset of ECUs assigned to a different side of the vehicle from the vehicle maneuver.

4. The method of claim 1, wherein the method further comprises performing the operation via execution of the subset of ECUs included in the zone, and reducing activity of one or more other subsets of ECUs assigned to one or more other zones from among the plurality of zones while performing the operation to reduce power consumed by the one or more other zones.

5. The method of claim 1, wherein the method further comprises performing the operation via execution of the subset of ECUs included in the zone, and capturing sensor data of the operation via one or more other subsets of ECUs assigned to one or more other zones from among the plurality of zones while performing the operation via the subset of ECUs included in the zone.

6. The method of claim 1, wherein the method further comprises training an artificial intelligence (AI) model based on execution of the AI model on the pooled data stored in the storage device and storing the trained AI model within the storage device.

7. An apparatus comprising:

a memory; and a processor coupled to the memory, the processor configured to:

divide a vehicle into a plurality of zones based on operations performed by vehicle, assign a different subset of electronic control units (ECUs) from among a plurality of ECUs of the vehicle to each zone based on functions performed by the plurality of ECUs with respect to the plurality of zones, determine an operation to perform for the vehicle, identify a zone from among the plurality of zones for controlling the operation, pool data input by and output by a subset of ECUs included in the zone during the operation and storing the pooled data in a storage device; and transfer the pooled data from the subset of ECUs assigned to the zone to the different subset of ECUs assigned to a different zone among the plurality of zones based on a hierarchy among the zone and the different zone.

8. The apparatus of claim 7, wherein the processor is further configured to capture sensor data from one or more of an exterior of the vehicle and an interior of the vehicle, via the different subset of ECUs of the vehicle assigned to a different zone from among the plurality of zones, and simultaneously control the operation with the subset of ECUs assigned to the zone.

9. The apparatus of claim 7, wherein the processor is further configured to perform a vehicle maneuver with respect to a side of the vehicle, and perform the vehicle maneuver with the subset of ECUs assigned to the side of the vehicle while isolating operation of the different subset of ECUs assigned to a different side of the vehicle from the vehicle maneuver.

10. The apparatus of claim 7, wherein the processor is further configured to perform the operation via execution of the subset of ECUs included in the zone, and reduce activity of one or more other subsets of ECUs assigned to one or more other zones from among the plurality of zones while performing the operation to reduce power consumed by the one or more other zones.

11. The apparatus of claim 7, wherein the processor is configured to perform the operation via execution of the subset of ECUs included in the zone, and capture sensor data of the operation from one or more other subsets of ECUs assigned to one or more other zones from among the plurality of zones while performing the operation via the subset of ECUs included in the zone.

12. The apparatus of claim 7, wherein the processor is further configured to train an artificial intelligence (AI) model based on execution of the AI model on the pooled data stored in a storage device and store the trained AI model within the storage device.

13. A computer-readable storage medium comprising instructions stored therein which when executed by a processor cause the processor to perform:

dividing a vehicle into a plurality of zones based on operations performed by vehicle;

assigning a different subset of electronic control units (ECUs) from among a plurality of ECUs of the vehicle to each zone based on functions performed by the plurality of ECUs with respect to the plurality of zones;

determining an operation to perform for the vehicle;

identifying a zone from among the plurality of zones for controlling the operation; and pooling data input by and output by a subset of ECUs included in the zone during the operation and storing the pooled data in a storage device; and transferring the pooled data from the subset of ECUs assigned to the zone to the different subset of ECUs assigned to a different zone among the plurality of zones based on a hierarchy among the zone and the different zone.

14. The computer-readable storage medium of claim 13, wherein the processor is further configured to perform capturing sensor data from one or more of an exterior of the vehicle and an interior of the vehicle, via the different subset of ECUs of the vehicle assigned to a different zone from among the plurality of zones, while simultaneously controlling the operation with the subset of ECUs assigned to the zone.

15. The computer-readable storage medium of claim 13, wherein the processor is further configured to perform determining to perform a vehicle maneuver with respect to a side of the vehicle, and performing the operation with the subset of ECUs assigned to the side of the vehicle while isolating operation of the different subset of ECUs assigned to a different side of the vehicle from the vehicle maneuver.

16. The computer-readable storage medium of claim 13, wherein the processor is further configured to perform the operation via execution of the subset of ECUs included in the zone, and reducing activity of one or more other subsets of ECUs assigned to one or more other zones from among the plurality of zones while performing the operation to reduce power consumed by the one or more other zones.

17. The computer-readable storage medium of claim 13, wherein the processor is further configured to perform the operation via execution of the subset of ECUs included in the zone, and capturing sensor data of the operation from one or more other subsets of ECUs assigned to one or more other zones from among the plurality of zones while performing the operation via the subset of ECUs included in the zone.

* * * * *